US009671257B2

(12) United States Patent
Held et al.

(10) Patent No.: US 9,671,257 B2
(45) Date of Patent: Jun. 6, 2017

(54) CORRECTING AND/OR PREVENTING ERRORS DURING THE MEASUREMENT OF COORDINATES OF A WORKPIECE

(75) Inventors: Tobias Held, Noerdlingen (DE); Rainer Sagemueller, Aalen (DE); Dominik Seitz, Schwaebisch Gmuend (DE); Tobias Woletz, Essingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 552 days.

(21) Appl. No.: 14/131,605

(22) PCT Filed: Jul. 8, 2011

(86) PCT No.: PCT/EP2011/061681
§ 371 (c)(1),
(2), (4) Date: Mar. 3, 2014

(87) PCT Pub. No.: WO2013/007285
PCT Pub. Date: Jan. 17, 2013

(65) Prior Publication Data
US 2014/0167745 A1    Jun. 19, 2014

(51) Int. Cl.
*G01B 7/00* (2006.01)
*G01R 33/025* (2006.01)
(Continued)

(52) U.S. Cl.
CPC .............. *G01D 18/00* (2013.01); *G01B 7/004* (2013.01); *G01B 7/012* (2013.01); *G01B 21/045* (2013.01)

(58) Field of Classification Search
CPC ...... G01D 18/00; G01D 5/145; G01D 5/2488; G01B 7/004; G01B 7/012; G01B 7/023; G01B 7/14; G01B 7/003; G01B 21/045
(Continued)

(56) References Cited

U.S. PATENT DOCUMENTS 3,993,519 A * 11/1976 Birkhold ............. B29C 65/0672
156/308.2
4,575,947 A * 3/1986 Stauber .................. G01B 7/008
33/558
(Continued)

FOREIGN PATENT DOCUMENTS

CN        1051786            5/1991
DE     29823884 U1 *    2/2000    ......... G01B 11/007
(Continued)

OTHER PUBLICATIONS

Advanced Spindle Error Analyzer, Instruction Manual, 2009, pages(s), Software Version: 8.4 Manual Version: 005, Lion Precision, St. Paul, Minnesota.
(Continued)

*Primary Examiner* — Jermele M Hollington
*Assistant Examiner* — Sean Curtis
(74) *Attorney, Agent, or Firm* — Laurence A. Greenberg; Werner H. Stemer; Ralph E. Locher

(57) ABSTRACT

An arrangement measures coordinates of a workpiece and/or machines the workpiece. The arrangement has a first part and a second part that can be moved relative to the first part. The relative mobility of the first and second parts is specified in addition to a possible mobility of a probe that is optionally additionally fixed to the arrangement. The mobility of the probe is specified by a deflection of the probe from a neutral position during a mechanical probing of the workpiece for the purpose of measuring the coordinates. A measuring body is arranged on the first or second part, and at least one sensor is arranged on the other part, i.e. on the second or first part. The sensor generates a measurement signal corresponding to a position of the measuring body and thus corresponding to the relative position of the first and second part.

20 Claims, 22 Drawing Sheets

(51) Int. Cl.
*G01D 18/00* (2006.01)
*G01B 21/04* (2006.01)
*G01B 7/012* (2006.01)
*G01B 7/004* (2006.01)

(58) Field of Classification Search
USPC ......... 324/202, 207.11–207.26, 261; 33/503, 33/559, 561, 558; 702/95, 150; 73/1.79
See application file for complete search history.

(56) References Cited

U.S. PATENT DOCUMENTS

| | | | | |
|---|---|---|---|---|
| 4,782,598 A * | 11/1988 | Guarini | ............... | G01B 21/045 33/1 M |
| 4,819,195 A * | 4/1989 | Bell | .................. | G01B 21/045 318/632 |
| 4,888,877 A * | 12/1989 | Enderle | ................. | G01B 5/012 33/503 |
| 4,945,501 A * | 7/1990 | Bell | .................. | G01B 21/045 318/632 |
| 4,972,597 A * | 11/1990 | Kadosaki | ............ | G01B 11/007 33/556 |
| 5,008,555 A * | 4/1991 | Mundy | ................. | G01B 11/00 250/559.22 |
| 5,138,563 A * | 8/1992 | Debitsch | ............. | G01B 21/045 702/95 |
| 5,209,131 A | 5/1993 | Baxter | | |
| 5,326,982 A * | 7/1994 | Wiklund | ............... | G01B 7/012 250/559.19 |
| 5,471,406 A * | 11/1995 | Breyer | ................. | G05B 19/401 33/503 |
| 5,550,635 A * | 8/1996 | Saitoh | ................. | G03F 7/70616 250/548 |
| 5,610,846 A * | 3/1997 | Trapet | ................. | G01B 21/045 702/41 |
| 5,651,351 A | 7/1997 | Matsumoto et al. | | |
| 5,825,666 A * | 10/1998 | Freifeld | .............. | G01B 11/005 279/128 |
| 6,410,910 B1 * | 6/2002 | Feichtinger | ......... | G01D 5/3473 250/231.13 |
| 6,546,643 B2 * | 4/2003 | Lotze | .................. | G01B 21/045 33/503 |
| 6,591,208 B2 | 7/2003 | Lotze | | |
| 6,651,351 B1 * | 11/2003 | Christoph | ........... | G01B 11/007 33/503 |
| 6,854,195 B2 * | 2/2005 | Jordil | .................. | G01B 5/012 33/556 |
| 6,874,243 B2 * | 4/2005 | Hama | .................. | G01B 5/28 33/551 |
| 6,907,673 B2 * | 6/2005 | Zanier | ................. | G01B 5/012 33/558 |
| 6,935,036 B2 * | 8/2005 | Raab | .................... | B23Q 35/04 33/1 N |
| 6,938,353 B2 * | 9/2005 | Rouge | ................. | G01B 5/012 33/558 |
| 6,971,183 B2 * | 12/2005 | Brenner | ............... | G01B 5/0016 33/503 |
| 7,036,239 B2 * | 5/2006 | Jordil | .................. | G01B 21/047 33/561 |
| 7,245,982 B2 * | 7/2007 | Morfino | ............. | G05B 19/4015 318/632 |
| 7,254,506 B2 * | 8/2007 | McMurtry | ........... | G01B 21/045 33/502 |
| 7,281,433 B2 * | 10/2007 | Jordil | .................. | G01B 21/045 33/556 |
| 7,415,775 B2 * | 8/2008 | Jordil | .................. | G01B 5/012 33/556 |
| 7,503,125 B2 * | 3/2009 | Jordil | .................. | G01B 5/008 33/503 |
| 7,647,706 B2 * | 1/2010 | Jordil | .................. | G01B 21/045 33/503 |
| 7,685,733 B2 * | 3/2010 | Ohmori | ................ | G01B 3/008 33/559 |
| 7,797,981 B2 | 9/2010 | Vasiloiu | | |
| 7,918,033 B2 * | 4/2011 | Held | .................... | G01B 21/042 33/502 |
| 8,006,398 B2 * | 8/2011 | McFarland | .......... | G01B 21/045 33/503 |
| 8,031,334 B2 | 10/2011 | Lippuner | | |
| D685,275 S * | 7/2013 | Matuschek | .................... | D10/74 |
| 8,537,372 B2 * | 9/2013 | Pettersson | ............ | G01B 21/045 33/503 |
| 8,607,466 B2 * | 12/2013 | Pettersson | ............ | G01B 21/045 33/503 |
| 8,756,973 B2 * | 6/2014 | Wallace | ............... | G01B 21/045 73/1.79 |
| 8,825,427 B2 * | 9/2014 | Kunzmann | .......... | G01B 21/042 702/85 |
| 2001/0025427 A1 * | 10/2001 | Lotze | .................. | G01B 21/045 33/559 |
| 2002/0029119 A1 * | 3/2002 | Lotze | .................. | G01B 21/045 702/95 |
| 2005/0055839 A1 * | 3/2005 | Brenner | ............... | G01B 5/0016 33/559 |
| 2005/0259271 A1 | 11/2005 | Christoph | | |
| 2005/0275399 A1 * | 12/2005 | Kitanaka | ................ | G01D 5/145 324/207.12 |
| 2008/0148808 A1 * | 6/2008 | Vasiloiu | ............... | G01D 5/2449 73/1.79 |
| 2009/0172962 A1 * | 7/2009 | Aubele | .................. | G01B 5/008 33/556 |
| 2010/0039656 A1 | 2/2010 | Lippuner | | |
| 2011/0191060 A1 * | 8/2011 | Lotze | .................. | G01B 21/042 702/150 |
| 2011/0202308 A1 * | 8/2011 | Kishida | ................ | G01B 7/30 702/151 |
| 2012/0079731 A1 * | 4/2012 | Ruck | ...................... | G01B 5/012 33/503 |
| 2012/0283978 A1 * | 11/2012 | Watanabe | .......... | G01D 5/24452 702/94 |
| 2014/0053423 A1 * | 2/2014 | Brenner | ................ | G01B 5/008 33/503 |
| 2014/0167745 A1 * | 6/2014 | Held | .................... | G01B 21/045 324/207.12 |
| 2014/0236520 A1 * | 8/2014 | Engel | .................. | G01D 5/24452 702/95 |
| 2015/0052767 A1 * | 2/2015 | Sagemueller | ........ | G01B 21/045 33/503 |
| 2015/0061170 A1 * | 3/2015 | Engel | .................. | B29C 67/0077 264/40.1 |
| 2015/0219451 A1 * | 8/2015 | Pettersson | ............. | G01B 5/008 33/503 |
| 2015/0345937 A1 * | 12/2015 | Seitz | .................... | G01B 21/042 250/231.13 |
| 2015/0345940 A1 * | 12/2015 | Sagemueller | .......... | G01B 21/04 33/503 |
| 2016/0018207 A1 * | 1/2016 | Fuchs | .................. | G01B 21/045 702/95 |
| 2016/0040987 A1 * | 2/2016 | Bernhardt | ............. | G01B 21/04 33/503 |

FOREIGN PATENT DOCUMENTS

| | | | | |
|---|---|---|---|---|
| DE | 19907326 A1 | 8/2000 | | |
| DE | 10006753 A1 | 8/2001 | | |
| DE | WO 0225206 A1 * | 3/2002 | ............ | G01B 5/012 |
| DE | EP 1279918 A2 * | 1/2003 | ............ | G01B 7/012 |
| DE | EP 1498691 A1 * | 1/2005 | ........... | G01B 21/045 |
| DE | 202008005154 U1 | 7/2008 | | |
| DE | 102008058198 A1 | 5/2010 | | |
| EP | 0123835 A1 | 11/1984 | | |
| EP | 0123835 B1 * | 9/1988 | ............ | G01B 5/008 |
| EP | 0373644 A1 | 6/1990 | | |
| EP | 1279918 A2 | 1/2003 | | |
| EP | 1498691 A1 | 1/2005 | | |
| EP | 1793197 | 6/2007 | | |
| EP | 1923670 A1 | 5/2008 | | |
| EP | 1944582 A1 | 7/2008 | | |
| EP | 2449341 A1 | 5/2012 | | |

(56) References Cited

FOREIGN PATENT DOCUMENTS

| JP | EP 0373644 A1 * | 6/1990 | ............ G01B 11/007 |
|---|---|---|---|
| JP | EP 1793197 A2 * | 6/2007 | ............. G01B 3/008 |
| WO | 0225206 A1 | 3/2002 | |
| WO | 03069266 A2 | 8/2003 | |

OTHER PUBLICATIONS

Ralf Geckeler, Andreas Fricke, and Clemens Elster, Calibration of angle encoders using transfer functions, IOPscience, Sep. 20, 2006, Institute of Physics Publishing, United Kingdom.

* cited by examiner

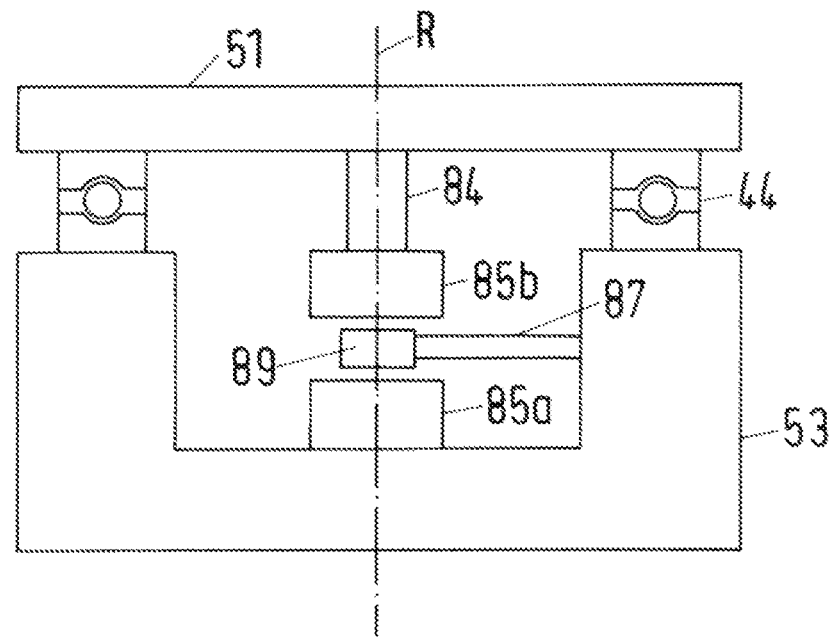
FIG. 15
FIG. 16
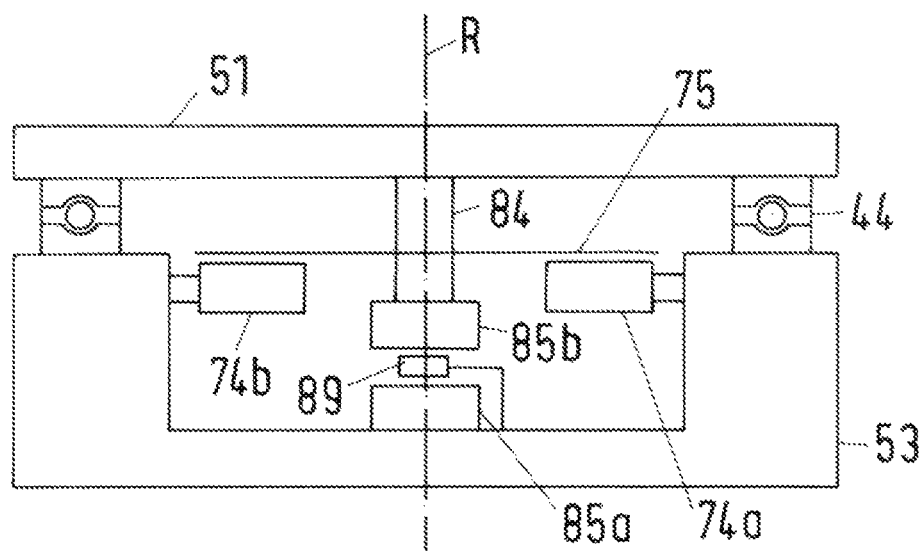

CORRECTING AND/OR PREVENTING ERRORS DURING THE MEASUREMENT OF COORDINATES OF A WORKPIECE

BACKGROUND OF THE INVENTION

Field of the Invention

The invention relates to correcting and/or preventing errors during the measurement of coordinates of a work piece. In particular, the invention relates to an arrangement for measuring coordinates of a work piece, a method for producing such an arrangement and a method for operating such an arrangement.

Coordinates of a work piece can be specified and measured in different ways. By way of example, the coordinates relate to a reference system, for example what is known as the laboratory system or the coordinate system relating to the work piece or a work piece holder. However, it is also possible, for example, that dimensions of the work piece are registered and specified, which dimensions relate to at least two reference points of the work piece, e.g. a length, a width or a diameter. In order to determine the coordinates, coordinate measuring machines (also abbreviated CMM in the following) or the users of the coordinate measuring machines are dependent on knowing the position and, often, also the alignment of a probe for sensing the work piece, and also the position and alignment of the work piece itself, or at least knowing a possible change in the position and alignment. A change in the position and alignment can occur, in particular, if work piece and probe are moved relative to one another in order to be able to undertake further measurements of the coordinates. Therefore, if different parts of an arrangement for measuring coordinates of a work piece are mobile relative to one another, corresponding movements can lead to errors when measuring the coordinates of the work piece. Examples of such relative movements are rotational movements of a rotational device (this is the subject matter of a first aspect of the present invention), movements when setting the position and/or alignment of a probe or probe head (which has a sensor system) for sensing the work piece for the purposes of determining the coordinates (this is the subject matter of a second aspect of the present invention) and the mechanical bending due to mechanical forces and/or the thermal expansion or thermal contraction of the material of an arrangement for measuring coordinates or of a machine tool (this is the subject matter of a third aspect of the present invention).

All this mobility is given in addition to the movement of an optionally present probe, which movement the probe performs during the measurement of the coordinates of a work piece by mechanical sensing (i.e. while the probe contacts the work piece). In particular, such probes which are deflected from a neutral position during mechanical sensing of the work piece due to the mechanical forces acting between work piece and probe, wherein the deflection is established and evaluated for the purposes of determining the coordinates of the contact point, are known. The additional mobility therefore leads to errors when measuring the coordinates.

BRIEF SUMMARY OF THE INVENTION

It is an object of the present invention to specify an arrangement and a method of the type mentioned at the outset, by means of which errors when measuring coordinates of a work piece can be corrected and/or prevented.

Proposed is an arrangement for measuring coordinates of a work piece and/or for machining the work piece, wherein the arrangement has a first part and a second part, which has mobility relative to the first part, wherein the relative mobility between the parts is given in addition to a possible mobility of an optional probe additionally attached to the arrangement, which mobility is given during mechanical sensing of the work piece for the purposes of measuring the coordinates by a deflection of the probe from a neutral position, wherein a measuring body is arranged on the first or second part and at least one sensor is arranged on the other part, i.e. on the second or first part, wherein the sensor is configured to generate a measurement signal corresponding to a position of the measuring body and hence corresponding to the relative position between the first and second part.

The at least one sensor and the at least one measuring body assigned to the sensor are elements which are permanently present on the arrangement. In contrast to measurement systems which are arranged on an arrangement for the purposes of a single or repeated calibration, measured values can therefore be obtained during running operation of the arrangement, in particular during the operation of the coordinate measuring machine or the machine tool, and deviations from an ideal and/or predetermined movement of the parts and/or an unwanted movement during the operation of the arrangement can be established. It follows that it is possible that the design of the arrangement is simplified and therefore larger deviations from the ideal or predetermined movement occur, or larger movements occur than is desired. Measuring these movements or deviations can be taken into account during operation, in particular during the measurement of the coordinates of the work piece. One option for taking this into account lies in correcting the movement by calculation, in particular by means of a mathematical model. The measured values of the at least one sensor are preferably registered and taken into account repeatedly.

In accordance with a corresponding method for producing such an arrangement, a first part of the arrangement and a second part of the arrangement are provided and the first and second part are configured to be mobile relative to one another. Here, the relative motion of the parts is/will be made possible in addition to a possible mobility of an optional probe additionally attached to the arrangement, which mobility is given during mechanical sensing of the work piece for the purposes of measuring the coordinates by a deflection of the probe from a neutral position. A measuring body is arranged on the first or second part and at least one sensor is arranged on the other part, i.e. on the second or first part. The sensor is configured to generate a measurement signal during the operation of the arrangement, which measurement signal corresponds to a position of the measuring body and hence corresponds to the relative position of the first and second part.

In accordance with a corresponding method for operating such an arrangement, a first part of the arrangement and a second part of the arrangement are moved relative to one another, wherein the relative motion of the parts is made possible in addition to a possible mobility of an optional probe additionally attached to the arrangement, which mobility is given during mechanical sensing of the work piece for the purposes of measuring the coordinates by a deflection of the probe from a neutral position. A measuring body is arranged on the first or second part and at least one sensor is arranged on the other part, i.e. on the second or first part, wherein the sensor is configured to generate a measurement signal during the operation of the arrangement, which measurement signal corresponds to a position of the measuring body and hence corresponds to the relative position of the first and second part.

In particular, the probe can be arranged on a measuring head or probe head, which enables the mobility of the probe and, in particular, also registers the deflection by at least one sensor.

By way of example, the sensor can be a magnetoresistive sensor, a Hall sensor which operates in accordance with the electromagnetic Hall Effect, an optical sensor, a sensor which operates in accordance with the piezoelectric effect, a capacitive sensor, an Eddy current sensor embodied to measure the distance and/or relative position, or a sensor which operates in accordance with at least one of the aforementioned functionalities and/or in accordance with at least one functionality which has not been mentioned. In particular, a multiplicity of magnetoresistive sensors and Hall sensors can also be arranged on a common support, for example a micro-support similar to a microchip. Each sensor on the common support then registers, in particular, a different degree of freedom of the movement. By way of example, using two such supports, which each carry three sensors for registering three linearly independent degrees of freedom and are arranged at different axial positions, it is possible to register all degrees of freedom of the movement. As a result of the plurality of sensors on one support, it is also possible to measure the direction of a magnetic field prevailing at the location of the support. By way of example, optical sensors register one of a plurality of markings, formed on the measuring body, when the marking is, from the view of the sensor, moving past. In a different type of optical sensors, e.g., a laser triangulation is performed and/or, like in the case of an interferometer, a comparison is performed with a comparison light beam which is not influenced by the measuring body. In a further type of optical sensors, patterns projected onto the measuring body are registered.

The measuring body is, in particular, configured in accordance with the measurement principle of the sensor. By way of example, the measuring body can have a permanently magnetic material in order to be able to measure in accordance with the Hall Effect or the magnetoresistive measurement principle. Alternatively, or in addition thereto, the measuring body (e.g. a cylinder or a spherical measuring body) can have an electrically conductive surface for a capacitive or inductive sensor and/or a mirroring surface for reflecting measurement radiation for an optical sensor. A mirroring or partially reflecting surface can be formed on e.g. a cylindrical, spherical or toroidal measuring body. In any case, the sensor generates a measurement signal, which contains information relating to the position of the measuring body and hence relating to the relative position of the first and second part. In the case of some measurement principles, such as e.g. in the case of a grating disk as measuring body, which carries a plurality of line-shaped markings in the style of a line grating, a single measurement signal of the sensor may not yet be sufficient to be able to evaluate information relating to the position or relative position. By way of example, a meter reading, which corresponds to the number of markings already registered in advance, and/or an initial position of the first and second part may additionally be required. If a plurality of at least three rotational position sensors are arranged distributed about the rotational axis of a rotational device and if in each case a rotational position of the two parts of the rotational device which can be rotated relative to one another is registered by the individual rotational position sensors, the measurement signals supplied by the rotational position sensors can be used to establish and/or take into account a translational movement (i.e. a movement of the two parts rotatable relative to one another in a direction transverse to the rotational axis). This will be explained in more detail below. In the same case, or else in the case of measurement systems with other sensors, a calibration of the sensor arrangement formed by the measuring body and the sensor may be required in order to be able to establish the position of the measuring body and/or the relative position of the first and second part during operation of the arrangement for measuring coordinates of a work piece. It is therefore preferable to calibrate the arrangement for measuring coordinates of a work piece in relation to determining the position of the measuring body and/or the relative position of the first and second part, i.e. to assign measurement signals from the sensor to corresponding values of the position or relative position. In the process, e.g. comparison measurements are performed and/or use is made of calibration standards which are known exactly in relation to the dimensions and shape and position thereof relative to the arrangement.

Form defects, i.e. a deviation of a measuring body from an ideal or predetermined form (e.g. spherical form or cylindrical form), can be determined and taken into account by calibration; in particular, they can be corrected by calculation. Furthermore, the sensors can be calibrated, for example due to nonlinearities in the relationship between the measurement signals of the sensor and the measurement variable registered by the sensor.

If provision is/will be made for more than one sensor and/or more than one measuring body in order to establish the position of the first or second part and, in particular, in order to establish the relative position of the first and second part, the same statements as already made above apply, in particular, to the features of the sensors and/or the measuring bodies. A plurality of sensors can be arranged either on the first part or on the second part. Alternatively, or in addition thereto, at least one sensor can in each case be arranged on both the first part and the second part, which is mobile relative to the first part. A corresponding statement applies to a plurality of measuring bodies. A plurality of sensors can together employ at least one measuring body on the other part for the purposes of signal generation. However, it is also possible that a separate measuring body is assigned to every one of the plurality of sensors. Furthermore, it is possible that a sensor component has more than one sensor. By way of example, one such sensor component can therefore supply information relating to the relative position of the first and second part in relation to more than one degree of freedom of the movement.

Supporting parts of the arrangement, which carry at least one sensor and/or one measuring body, are preferably manufactured from a material which has a low coefficient of thermal expansion or coefficient of contraction. Furthermore, it is preferable for such supporting parts to be embodied to be rigid against changes in shape. This also applies to an arrangement of a plurality of supporting parts. Therefore, external forces and temperature changes do not lead to an error or lead to a negligibly small error. If the arrangement has a base, on which all other parts or most parts of the arrangement are supported directly or indirectly, for example a base plate, at least some of the sensors and/or measuring bodies are preferably connected to the base, either directly or via such a supporting part. Exemplary embodiments will still be described, in which a supporting part is rod-shaped. In this case, one end of the rod is preferably attached to the base. In the case of a rotational device, part of the sensor system (i.e. part of the at least one sensor/measuring body pair), for example a sensor, is arranged on the stationary part of the rotational device. The corresponding associated part of the sensor system, for example an associated measuring body, is preferably attached directly to the rotatable part of the rotational device.

The invention renders it possible, for example in the case of rotational devices (first aspect of the present invention) which merely enable discrete rotational positions of the first part relative to the second part or vice versa, to establish the actual rotational position or to establish a corresponding correction value, which corresponds to a deviation of the actual rotational position from the expected discrete rotational position. However, as will still be explained in more detail, the invention even renders it possible to replace a rotational device with mechanical means for setting discrete rotational positions (e.g. with a so-called Hirth joint) with a rotational device, in which such mechanical means are no longer present. Nevertheless, one or more predetermined rotational positions can be set repeatedly by an appropriate control of the rotational device. In the case of an appropriate embodiment of the control, it is even possible to reproduce the rotational position exactly. To this end, the control can resort to the measurement signals of the at least one sensor, i.e. measurement signals or information obtained therefrom or signals are fed to the control which controls the rotational movement and, in particular, controls at least one drive device (e.g. motor) of the rotational device. If, for example, it is not only discrete rotational positions that can be set but it is also the case that the control does not enable an exact reproduction of the rotational position, the invention renders it possible to establish the actual rotational position or to establish the aforementioned corresponding correction value. Setting arbitrary rotational positions within a continuous range is not possible in the case of e.g. using a stepper motor which drives the rotational movement. Such a stepper motor does not render it possible to exactly reproduce specific rotational positions either, since the rotational positions that can be set may be dependent on external circumstances. In addition, the drive mechanism used for the drive (e.g. with toothed wheels for transmitting torques) may cause changes in the rotational positions that can be set.

In a more general case, at least one relative position is predetermined for the first part and the second part, which relative position is to be set during operation of the arrangement, wherein provision is made for an evaluation apparatus, which is configured to determine, using measurement signals of the sensor or of sensors of the arrangement, in which relative position the first part and the second part are in actual fact situated when the predetermined relative position was set. This arrangement can, in particular, also be provided for in an embodiment in accordance with the second aspect.

For each predetermined relative position, there may be a range of relative positions within which the predetermined relative position can vary, i.e. the relative position is not set exactly in accordance with the prescription. Here, these variation ranges of relative positions for the predetermined relative positions can, in particular, lie so far apart that they are uniquely assigned to one of the predetermined relative positions. By way of example, the variation ranges in respect of one degree of freedom of the movement can be separated by regions through which the parts can e.g. move through, but within which they do not come to rest. In particular, for each of a plurality of predetermined relative positions of the first and second part,
    provision can be made for at least one (individual) assigned sensor (which is assigned to the relative position), i.e. in the case of e.g. three predetermined relative positions, there are two additional sensors, i.e. three sensors. The measuring body, which is assigned to the additional sensor, is however also used for measuring the relative position in other relative positions. The measuring body is therefore arranged on one of the two parts in such a way that, in the case of the relative movement between the two parts, it reaches a position in which it, together with the at least one assigned sensor, enables the measurement of the relative position;
    or provision can be made for at least one (individual) assigned measuring body (which is assigned to the relative position or else provision can be made for a pair or group of measuring bodies), i.e. in the case of e.g. three predetermined relative positions, there are two additional measuring bodies (or pairs or groups of measuring bodies), i.e. three measuring bodies (or pairs or groups of measuring bodies). The sensor, which is assigned to the additional measuring body or bodies, is however also used for measuring the relative position in other relative positions. The sensor is therefore arranged on one of the two parts in such a way that, in the case of the relative movement between the two parts, it reaches a position in which it, together with the at least one assigned measuring body, enables the measurement of the relative position.

In particular, there can be a plurality of assigned sensors (or a plurality of assigned measuring bodies) for at least one of the predetermined relative positions, which plurality of assigned sensors (or plurality of associated measuring bodies) respectively render it possible to measure the relative position in respect of one (of a plurality of different) degrees of freedom of the movement together with the measuring body (or sensor). By way of example, there are two assigned sensors for one of the predetermined relative positions, which sensors measure the different degrees of freedom of the movement.

Another advantage of the present invention (second aspect of the present invention) consists of the fact that the actually set position and/or alignment of a probe for mechanically sensing a work piece can be established prior to the actual sensing process and/or appropriate correction information can be established in order to correct or take into account a position and/or alignment deviating from a prescription in respect of the effect thereof on the established coordinate measured value or values.

A further advantage of the present invention (third aspect of the present invention) consists of the fact that, in the case of inadvertent movements of the first and second part relative to one another, in particular due to mechanical forces and/or due to thermal expansion or contraction, the inadvertent, undesired movement can be established in respect of the effect thereof on the relative position of the first and second part and hence—in the case of a CMM—on the error or the result of the coordinate measurement. Like in the other aspects as well, it is possible, firstly, to undertake a correction and/or, secondly, to directly take into account the measurement signal from the at least one sensor when determining the coordinates of the work piece. In the case of a machine tool, the accuracy when machining a work piece is increased with there being little outlay for the design of the arm.

If, in accordance with the first aspect of the invention, a rotational device is present and/or, in accordance with the second aspect, a movement apparatus for setting the position and/or alignment of the probe is present, there can be a change in an elastic bending of the rotational device or of the movement apparatus due to the changing weight due to a movement relative to the Earth's gravitational field (or else due to other external influences, such as ground vibrations). In particular, bending can set in. It is preferable for such a change in the bending to be taken into account. In particular, a distinction can therefore be made between the alignment-independent and the alignment-dependent error. In order to correct this elastic deformation, use can, in particular, be made of a mathematical model which has at least one finite element. Such a mathematical model was already described in DE 100 06 753 A1 for correcting the elastic bending of rotation/pivot apparatuses. The same correction is also described in the corresponding English-language publication US 2001/0025427 A1. As described in paragraph 56 of this English-language document and as depicted in FIG. 9 of this publication, a finite element can be treated mathematically in such a way as if only one force vector and one torque vector acts in the center of such a finite element, with the force vector and the torque vector being generated by the external load, i.e. the weights and optional further external forces. This model assumes that the elastic center of the finite element, with its position and orientation in space and with its elastic parameters, contains the elastic properties of the deformed components (in this case of the elongate element). Moreover, the deformation must be linearly dependent on the loads and proportional to the forces and torques acting in the elastic center. Furthermore, the principle of superposition must hold. The finite element reacts to the force vector and the torque vector with a deformation correction vector, which is composed of a translation vector and a rotation vector. The corresponding deformation correction vector emerges from equation 7 in the document.

In accordance with the first aspect of the invention, the first part and the second part are parts of a rotational device, which has rotational mobility about at least one rotational axis, wherein the first part and the second part have rotational mobility relative to one another due to the rotational mobility of the rotational device and wherein the first or the second part is configured to hold either the work piece or a coordinate measuring machine, e.g. the probe or probe head, in order to enable a rotation of the work piece or of the coordinate measuring machine. The first aspect therefore also relates to rotational devices, which have rotational mobility about two rotational axes (e.g. a so-called rotation/pivot joint with two mutually perpendicular rotational axes), or about more than two rotational axes.

In a first embodiment, the first or the second part is configured to hold the work piece. The other part is, in particular, configured to be attached to a base of the arrangement and/or to be positioned on a base such that this part is immobile relative to the base and the work piece can be rotated relative to the base with the other part. By way of example, the first and second part can be parts of a so-called rotary table, at or on which the work piece is arranged in order to be able to be brought into various rotational positions and in order to measure the coordinates thereof in the various rotational positions.

In accordance with a second embodiment, the first or the second part is configured to hold a coordinate measuring machine. In this case, the first and second part enable a rotation of the coordinate measuring machine by a relative movement. By way of example, so-called rotation/pivot joints are known, which enable rotational mobility with respect to two transversely and in particular orthogonally extending rotational axes. However, rotational devices, which merely enable a rotational mobility in respect of a single rotational axis or enable rotations about more than two rotational axes, are also known.

The following refinements are possible in both embodiments:

The measuring body is configured as additional material region of the first or second part not required for the rotational function of the rotational device and/or the sensor is arranged on an additional material region of the second or first part not required for the rotational function of the rotational device.

Material regions required for the rotational function of the rotational device are, in particular, rotational bearings, material regions which hold or support the rotational bearings, and also material regions required for the stable rotational movement, such as e.g. a shaft or any other rotor whose rotational movement is mounted by the rotational bearings. Moreover, a material region which is often present and configured to carry and/or hold the work piece or the probe in such a way that the work piece or the probe is rotated in the case of a rotational movement of the part with rotational mobility, is part of the material regions required for the rotational function. This material region carries along the work piece or the probe in the case of the rotational movement of the part with rotational mobility. Furthermore, the material regions required for the rotational function of the rotational device include a possible material region configured to connect the rotational device to other parts of the arrangement. By way of example, a rotation/pivot joint is typically connected to an arm (e.g. a sleeve) of a coordinate measuring machine in order in turn to be able to pivot and rotate the probe attached to the rotation/pivot joint relative to the arm. In the case of a rotary table, a material region is typically configured such that the rotary table can be placed onto a base of the arrangement and/or attached thereto.

By contrast, an additional material region not required for the rotational function of the rotational device can form e.g. a spherical surface or the part of a spherical surface, a cylindrical external surface and/or a circular area, wherein the area formed is registered by the sensor in terms of its position relative to the sensor. It is preferable for the additional material region to be formed and arranged rotationally symmetrically relative to the rotational axis, at least over a predetermined angular range of rotational angles of the rotational movement about the rotational axis, as is the case, for example, with a semicircular disk in relation to the center of the circle. In the case of rotational movements in the predetermined rotational angle range, the sensor can therefore in each case register a portion of the surface of the measuring body or be influenced by the measuring body in accordance with the relative position of the aforementioned portion of the surface in such a way that the measurement signal generated by the sensor corresponds to the distance between the sensor and the portion of the surface. The rotationally symmetric embodiment of the measuring body surface leads to the sensor always generating the same measurement signal or the same sequence of measurement signals (e.g. in the case of measuring bodies with line gratings (see above)) in the ideal case, where the measuring body is shaped and arranged, without errors, rotationally symmetrically with respect to the rotational axis and where the rotational movement in respect of the rotational axis is performed without errors (e.g. wobble errors, axial run-out, radial run-out). Deviations from the ideal case of the rotationally symmetric embodiment of the additional material region which deviations, however, are not traced back to an error of the rotational axis, can be taken into account by calibration, and so a corresponding correction is possible during the evaluation of the measurement signals from the sensor, and/or said deviations can be kept so small that the deviations of the rotational movement from the ideal rotational movement bring about substantially larger changes in the measurement signal than the deviations of the measuring body from the ideal rotationally symmetric embodiment. By way of example, a sphere or a cylinder as measuring body can be produced rotationally symmetrically with such precision and can be adjusted and/or calibrated with respect to the rotational axis with such precision that the error is small for the purposes of determining the rotational movement error.

By way of example, the additional material region can be an elongate material region, which extends in the direction of the rotational axis and, in particular, is formed and arranged with rotational symmetry (that is to say e.g. cylindrically) with respect to the rotational axis.

The following refinement is based, in particular, on an embodiment of the rotational device, in which a rod-shaped shaft of the rotational device is required for the rotational function. In particular, the measuring body may have a greater distance from the rotational axis of the rotational device than a neighboring material region of the first or second part, which material region is required for the rotational function of the rotational device, and/or the additional material region, on which the sensor is arranged, may have a greater distance from the rotational axis of the rotational device than a neighboring region of the second or first part, which material region is required for the rotational function of the rotational device.

Thus, in this refinement, an additional material region, which forms the measuring body or on which the sensor is arranged, is arranged at a greater distance from the rotational axis than the neighboring region required for the rotational function of the rotational device. The additional material region is rotated by a rotational movement of the rotational device relative to the other part of the rotational device. As a result of the greater distance from the rotational axis, errors in the rotational movement (i.e. deviations from an ideal rotational movement about a rotational axis) have a greater effect on the measurement signal of the sensor because greater variations in the relative position of measuring body and sensor are generated at the greater distance from the rotational axis than in the case of smaller distances. It is therefore possible to register smaller errors in the rotational movement and/or use can be made of more cost-effective sensors with larger signal variations relative to the respective signal.

In view of a particularly stable design of the rotational device which is particularly insusceptible to errors, a different design of the rotational device is preferred than the design underlying the considerations in the two preceding paragraphs: at least one of the two parts of the rotational device rotatable against one another has a hollow cylindrical shape—or has a region with this shape. At an axial end on the face of the hollow cylindrical region, there can be, in particular, a rotational bearing, by means of which the other part of the rotational device is mounted in a rotatable fashion. The other part can have any design, e.g. the shape of a circular disk. In the interior of the hollow cylinder, in which there is no need for any parts required for the rotatable function of the rotational device, there is now space for the measurement system. Specific exemplary embodiments will still be discussed in the description of the figures.

In particular, the measuring body already mentioned above can be a first measuring body, which is arranged on a first axial position, wherein a second measuring body is arranged on the first or second part, at a second axial position which is at a distance from the first axial position. The sensor or at least a second sensor is in this case configured to generate a measurement signal corresponding to a position of the second measurement body and hence the relative position between the first and second part. The axial position can be an axial position with respect to the rotational axis or with respect to another axis or direction, which extends transversely or skew to the rotational axis.

By way of example, by measuring at various axial positions, it is possible to measure wobble error due to a deviation of the alignment of rotatable and/or rotationally symmetric parts of the rotational device from the expected or desired rotational axis. Thus, in the case of a wobble movement, at least one part or portion of the rotational device rotates about the ideal rotational axis, wherein the part or portion does not rotate rotationally symmetrically with respect to the expected or the ideal rotational axis as expected or as in the ideal case during the rotational movement. By way of example, in the case of a wobble movement, the axis of symmetry of a cylindrical rod-shaped shaft moves on an imaginary cone surface of a cone aligned rotationally symmetrically to the ideal rotational axis. In the case of additional deviations from the ideal rotational movement, further movements can be superimposed on this wobble movement. Naturally, further errors may occur in addition to a wobble error, and so the axis of symmetry can, in practice, also perform other movements. By way of example, a radial run-out can be added to the wobble error, and so an elliptic or circular movement not concentric with the rotational axis is superimposed on the wobble movement.

When measuring at the two different axial positions, an arrangement with at least two sensors is present at e.g. each of the two axial positions, which sensors each measure the relative position of the sensor and of the measuring body in various, preferably orthogonal directions, wherein the directions can, for example, be aligned perpendicular to the rotational axis.

Preferably, provision is additionally made for at least one sensor/measuring body pair (here it is possible e.g. for the same measuring body to interact with another sensor), which is configured to measure changes in the axial position between measuring body and sensor. If two such additional sensor/measuring body pairs are arranged at different axial positions, it follows that it is possible to register the corresponding two degrees of freedom of the movement and, for example, determine the wobble error or other errors from the totality of the present information. In so doing, there is no need for a separate measuring body to be available for each pair. Rather, the same measuring body can be used by e.g. two sensors, a plurality of sensors or all sensors.

For many applications, one additional sensor/measuring body pair suffices for determining the degree of freedom in the axial direction, for example if an axial relative movement of the parts overall is precluded with high accuracy due to an air bearing, but it is intended for e.g. tilting movements relative to the rotational axis or axial run-out to be registered.

It is preferable for measuring bodies and/or sensors, which are located at the various axial positions, to be connected to one another by means of an element extending in the axial direction. Due to its axial length, the element can perform mechanical vibrations. Therefore, it is preferable for provision additionally to be made for a damping apparatus for damping mechanical vibrations of the element. This damping apparatus is preferably arranged in at least one region approximately in the center of the axial extent of the element. For damping apparatuses, use can be made, in particular, of apparatuses in which damping is brought about due to the viscosity of a fluid. However, a damping apparatus, in which movements of the element generate Eddy currents such that the relative movement is braked due to the Eddy currents and hence the desired damping effect of the vibrations occurs, is particularly preferred. By way of example, a first part of the Eddy-current damping apparatus is attached to the element. This first part can, for example proceeding from the element, extend in the radial direction, i.e. transversely to the axial direction. A second part of the Eddy-current damping apparatus is situated at approximately the same axial position on the part of the arrangement movable relative to the element. Here, the first and the second part of the Eddy current damping apparatus are arranged relative to one another in such a way that movements of the element transversely to the axial direction lead to a relative movement of the first and of the second part of the Eddy current damping apparatus. The Eddy currents are generated during this relative movement and, as explained above, the damping effect is achieved. Alternatively, or in addition thereto, effects of vibrations of the element can be reduced or eliminated by application of a low-pass filter to the time sequence of repeatedly registered measured values of the sensors.

In particular, the aforementioned sensor can be a first sensor which is arranged at a first position in the circumferential direction in respect of the rotational axis, wherein a second sensor is arranged on the first or second part at a second position, at a distance from the first position, in the circumferential direction in relation to the rotational axis, wherein the second sensor is also configured to generate a measurement signal corresponding to a position of the measuring body or of a second measuring body and hence corresponding to the relative position of the first and second part.

Such an arrangement with two sensors, which are arranged at various positions in the circumferential direction with respect to the rotational axis, was already mentioned above in combination with determining the wobble error. However, the sensors distributed in the circumferential direction need not serve to determine the axial errors, i.e. they need not measure changes in the relative position in the axial direction. Rather, in the case of an appropriate embodiment of the sensors (e.g. as rotational angle sensors) and also of the at least one measuring body (e.g. with a plurality of markings which are distributed about the rotational axis), they can be configured to determine and/or take into account the rotational position of a rotational device and/or the translational relative position of two parts which have rotational mobility relative to one another. By way of example, the already mentioned grating disk, in which markings on the disk, which are registered by the sensors during a passing-by movement, are distributed on the disk in the circumferential direction with respect to the rotational axis, is a suitable measuring body. Thus, a ring which carries the markings can also be used instead of a disk. By way of example, the markings are line-shaped markings extending in the radial direction such that this can be referred to as a line grating extending in the circumferential direction. A specific exemplary embodiment will still be explained in more detail below.

In addition to taking account of the translational movement of parts of a rotational device which have rotational mobility relative to one another, as already mentioned above, a method is proposed, wherein rotational positions of the first part relative to the second part and/or rotational positions of the second part relative to the first part are registered using a plurality of sensors which are arranged distributed about the rotational axis and, in each case, one measurement signal corresponding to the registered rotational position is generated so that redundant information about the rotational positions of the first part and second part relative to one another is available. The redundant information about the rotational position(s) is evaluated in such a way that effects of a translational movement of the first and the second part relative to one another are corrected, wherein the translational movement extends transversely to the extent of the rotational axis.

The redundant information is redundant in respect of registering the rotational position. However, it also contains information about the translational movement transverse to the rotational axis of the rotational device.

An embodiment of a corresponding arrangement in particular comprises:

a plurality of the sensors which are arranged distributed about the rotational axis and configured to in each case register the rotational position of the first and second part relative to one another and generate a corresponding measurement signal, wherein, in particular, the sensors—in axial direction of the rotational axis—are arranged on the same side of the measuring body or on the axial position of the measuring body, an evaluation apparatus, which is connected to the sensors in order to receive measurement signals from the sensors and configured to evaluate rotational positions of the first and second part relative to one another, as registered by the sensors, in such a way that effects of a translational movement of the first and of the second part relative to one another are corrected, wherein the translational movement extends transversely to the extent of the rotational axis.

In particular, the arrangement renders it possible to take into account not only the translational movement of the first and second part relative to one another and, in particular, to correct this, but moreover also renders it possible to establish the rotational position of the first and second part relative to one another by evaluating the measurement signals of at least one of the sensors. Therefore, only little space is required for the measurement system of the arrangement.

Moreover, provision can be made for at least one sensor which is configured to register a distance of the measuring body from the other part in the axial direction of the rotational axis or, by observing the measuring body, an axial relative position between the first part and the second part.

As a result of the information relating to the axial distance or the axial relative position, it is possible to take into account further degrees of freedom of the movement of the rotational device and to establish and/or correct the corresponding errors (i.e. deviations of the movement from an ideal rotational movement). In particular, if two of the distance sensors or sensors for determining the axial relative position are available, which are directed to different regions of the measuring body, it is possible to establish, in particular, the wobble error of the rotational device taking further account of measurement signals from the rotational position sensors (i.e. using information about the rotational position and the translational position transverse to the rotational axis). Since the same measuring body serves to be observed by the rotational angle sensors for registering the rotational position and serves to be observed by the at least one distance sensor or sensor for determining the axial position, the embodiment of the measurement system of the arrangement is particularly space-saving. This applies in particular if the rotational position sensors and the at least one distance sensor or sensor for determining the axial position are situated on the same side (observed in the axial direction) of the measuring body. The measuring body can, in particular, be a disk-shaped measuring body, e.g. a circular disk-shaped measuring body or annular measuring body, which is preferably embodied and arranged in a rotationally symmetric manner with respect to the rotational axis.

In a further embodiment, at least one of the rotational angle sensors is spaced from the measuring body in the axial direction and configured to provide not only information in relation to the rotational position from the measurement signals thereof, but also information in respect of the axial distance between the sensor and the measuring body; this is in place of the distance sensor or sensor for determining the axial relative position or in place of at least one of these. This at least one rotational angle sensor therefore replaces the aforementioned additional sensor. Preferably, all of the additional sensors, which register the axial distance or the axial relative position, are replaced by at least two of the rotational angle sensors. This saves costs for additional sensors and even more space.

By way of example, the rotational angle sensors are embodied, as known per se, to generate a periodic signal during the course of a rotational movement of the rotational device, wherein the period duration corresponds to the time sequence of markings which reach or pass through the observation region or registration region of the sensor. In particular, it is also possible for a plurality of markings to be situated in the registration region at the same time. In this case, the period duration of the measurement signal corresponds to the time sequence of the markings on the measuring body entering the registration region or leaving the registration region.

Such a periodic measurement signal is typically sinusoidal. In place of the time period duration of the measurement signal, the periodic measurement signal can also be interpreted such that the period corresponds to a distance of the successive markings distributed about the rotational axis in the circumferential direction.

The period or the period duration is usually used to determine the rotational position or rotational speed. However, it is also possible to evaluate not only the period of the measurement signal but also the intensity of the measurement signal. In the case of optical sensors, the sensors register as primary measurement variable a radiation intensity of electromagnetic radiation (e.g. visible light or infrared radiation), which is reflected by the measuring body or passes through the measuring body. Here, the registered radiation intensity depends on the rotational position. In particular, it is known that, in certain rotational positions, the markings on the measuring body reduce the measured radiation intensity to virtually zero and, in other rotational positions, allow the measured radiation intensity to approach a maximum and, in this manner, generate the periodic measurement signal. However, corresponding effects can also be obtained using magnetic markings and magnetic sensors. In both cases, it is possible to observe that the amplitude of the periodic measurement signal generated during a rotational movement depends on the distance of the sensor from the measuring body in the axial direction. Therefore, it is possible to identify the distance between sensor and measuring body from the amplitude of the periodic measurement signal or else from the intensity of the measurement signal e.g. at rotational positions with maximum intensity, i.e. the distance can be determined from the amplitude or intensity of the measurement signal. Like when determining the rotational position, the axial relative position or the axial distance is naturally not determined by the sensor itself, but rather by an appropriate evaluation apparatus. This can be an individual evaluation apparatus of the sensor and/or a common evaluation apparatus of the sensors.

In order to be able to compensate for and/or correct errors of the measuring body or the measuring bodies, errors in the arrangement, positioning and/or alignment of the measuring body or of the sensor and/or optional additional systematic errors of the at least one sensor/measuring body pair, it is proposed to provide at least one additional sensor (and preferably two additional sensors) at another position, which at least one additional sensor generates a measurement signal at this other position, which measurement signal is redundant in relation to the measurement signal of the first sensor. This is understood to mean that, in principle, the same information is supplied, i.e. contained in the corresponding measurement signals, by both sensors in relation to the relative position of the first and second part of the rotational device. By way of example, both sensors measure the relative position in the axial direction parallel to the rotational axis and, in the process, use the same measuring body, e.g. a disk arranged rotationally symmetrically with respect to the rotational axis. Alternatively, e.g. both sensors generate a measurement signal, which corresponds to the relative position in a linear direction perpendicular to the rotational axis. To this end, the sensors are e.g. arranged opposite to one another in respect of the rotational axis.

In the case of the above-described markings distributed in the circumferential direction about the rotational axis on a measuring body, which extends about the rotational axis, the redundant information can also be obtained by virtue of the fact that respectively one sensor is arranged at at least three different positions in the circumferential direction with respect to the rotational axis, which sensor detects the markings moving past.

In any case, the redundant information can be used to reduce or even largely eliminate the systematic errors when measuring and evaluating the sensor signals.

In accordance with the second aspect of the invention, the first or the second part is configured to hold a coordinate measuring machine configured as probe for mechanical sensing of the work piece and/or as probe head for the probe in order to enable mobility of the probe and/or the probe head, wherein the sensor and/or the measuring body is, in addition to determining the relative mobility of the first and second part, also configured to measure a deflection of the probe from a neutral position during mechanical sensing of the work piece for the purposes of measuring the coordinates of the work piece.

The embodiment for holding a probe in particular consists of the fact that the part has an interface for attaching the probe. As known per se from the field of the present invention, this can be a so-called interchangeable interface, in which the probe can be released from the part again and another probe can be coupled thereto.

The second aspect of the invention is based on the problem that probes for mechanically sensing a work piece should have a mobile design for certain measurement problems in order to align and/or position the probe in different manners relative to the coordinate measuring machine. The movement, and hence alignment and/or positioning, should be performed prior to the actual probing of the work piece. In particular, a rotation of the probe about at least one rotational axis should be possible. To this end, it is known to couple the probe to the coordinate measuring machine by means of a rotation/pivot joint. In order to be able to determine errors such as wobble errors, radial run-out and axial run-out of the rotational device, it is possible, as described above, to use one or more sensors on the rotational device, which one or more sensors measure the relative position of parts of the rotational device mobile relative to one another in respect of at least one degree of freedom of the movement. As conventional in the prior art, the sensor system (at least one sensor/measuring body pair) can in this case be arranged on the probe side when viewed from the rotational device in order to measure the deflection of the probe when contacting the work piece, i.e. the probe is connected to the rotational device via the sensor system. The sensor system is e.g. a standard probe head, on which probes can be attached in an interchangeable manner (see above).

Rotational devices and sensor systems which are compact in terms of their dimensions are desirable; they should moreover altogether have a mass which is as small as possible and should be able to be produced in a cost-effective manner.

As a solution, it is proposed to use at least one sensor or at least one measuring body of the sensor system, which is configured to measure the movement of the probe during mechanical probing of the work piece, and also to measure the rotational movement of the rotational device, which is configured to rotate the probe relative to another part of the coordinate measuring machine.

This renders it possible to integrate sensor system and rotational device into a single common device. Hence, it is possible to save installation space and weight, in particular weight for housing parts and supporting parts, which carry the sensor or the measuring body. Furthermore, costs are saved for sensor and/or measuring body since sensor and/or measuring body can be used for various measurement problems. It is also possible to reduce the number of electrical connection lines for transmitting measurement signals.

The methodology when operating the arrangement is e.g. as follows: initially, a desired rotational position of the probe is set by means of the rotational device. At least one sensor is used to establish the actual rotational position of the probe and/or an error in the rotational device (e.g. wobble error, radial run-out or axial run-out). As a result, it is therefore possible to determine precisely in which rotational position the probe is situated relative to another part of the coordinate measuring machine. Alternatively, or in addition thereto, the information relating to the previously set rotational position and/or the error in the rotational device can be taken into account when evaluating the measurement signals which are obtained during the subsequent measurement of the work piece by mechanical sensing by means of the probe.

In principle, it is possible to use a device as an alternative or in addition to the rotational device, which device enables a linear movement of the probe such that, in respect of at least one linear degree of freedom of the movement of the probe, a position of the probe can be set. Once again, in accordance with the second aspect of the invention, it holds true that at least one sensor or at least one measuring body is used both for determining the set linear position and for measuring the movement of the probe during mechanical sensing of the work piece.

The rotational position or linear position of the probe is preferably fixedly set prior to sensing the work piece such that the rotational position and/or linear position no longer changes. To this end, use can be made of a separate locking apparatus, which e.g. causes mechanical locking of the probe in the set position. However, it is also possible to use merely the drive device (e.g. an electric motor), which drives the rotational movement or linear movement, for locking purposes (e.g. the electric motor prevents the movement when no current is flowing or provision is made for a brake, or a closed-loop control of the motor regulates the position by appropriate actuation of the motor). In this case, the rotational position and/or linear position can change while sensing the work piece. It is therefore preferable to check the set position of the probe after sensing the work piece, when no forces are transmitted between the probe and the work piece. To this end, use is made of the same sensor or the same sensors, which are also used prior to sensing the work piece for determining the position or determining the error. If the position of the probe has changed during sensing of the work piece, it is possible either to correct the result of sensing the work piece or the result can be discarded and sensing can take place again, for example with improved locking of the position. Alternatively, a change in the rotational position and/or the linear position can be measured during the sensing of the work piece and, in the process, it is possible to use the same sensor or the same sensors which were also used prior to sensing the work piece for determining the position or determining the error. In other words, if there is a sufficient number of sensors, the position of the probe can be determined independently of whether a drive device or whether external forces, which for example occur when probing the work piece, have led to the current position. In particular, in this case it is not mandatory either to register the position of the probe prior to probing the work piece. In a further alternative, the position of the probe can be registered in an ongoing manner, i.e. continuously or quasi-continuously (e.g. cyclically recurrently).

It is conventional to calibrate the probe while it is attached to the coordinate measuring machine. To this end, use is usually made of at least one calibration body, the dimensions of which are known precisely. The results of the calibration are used when determining the coordinates of the work piece from the measurement signals of the at least one sensor which measurement signals are generated during the sensing of the work piece. When operating rotational devices not integrated into the sensor system for measuring the deflection of the probe, it is furthermore known to also calibrate the rotational device and, in particular, also to calibrate the combination of rotational device and probe. As a result of this, a set of calibration data is created in each case e.g. for a plurality of rotational positions of the probe, which set is used for determining the coordinates of the work piece when the probe is situated in the corresponding rotational position.

By integrating the movement device and the sensor system for measuring the deflection of the probe into a common apparatus, the additional error sources for the exact reproduction of a rotational position or linear position of the probe prior to sensing the work piece are reduced. By way of example, it is possible to dispense with an interface between the rotational device and the sensor system. Furthermore, the number of signals to be transmitted can be reduced. Electrical interfaces are dispensed with or the number thereof is reduced. Moreover, it is preferably possible to measure with the aid of the sensor/measuring body combinations in which position the probe is situated prior to sensing the work piece. It is therefore even possible to measure whether a desired position of the probe has in fact been set or the extent to which the actually set position deviates from the intended position. It is therefore possible to correct or adapt the data set from the calibration using the measurement signals of the at least one sensor, which measures the actually set position of the probe prior to sensing the work piece. If such a correction or adaptation should lead to imprecise results of the coordinates to be determined, a decision could be made by evaluating the measurement signals of the at least one sensor prior to sensing the work piece, that a calibration in the set position of the probe is required. In any case, the outlay for the change when evaluating the measurement signals for the purposes of determining the coordinates is low compared to known arrangements. The known arrangements, e.g. as described above, comprise a rotational device and a probe coupled to the rotational device by means of an additional sensor system.

In accordance with the third aspect of the invention, the first part and the second part are regions of the same arm of a coordinate measuring machine or of a machine tool, which are situated at different axial positions in the direction of the longitudinal axis of the arm, wherein the relative mobility of the parts is a mobility due to mechanical bending and/or thermal expansion or contraction of the material of the arm. The measuring body or the sensor is attached to a first axial end of an elongate element extending in the direction of the longitudinal axis. The elongate element is connected to the first part at the second axial end thereof, which is opposite to the first end. The at least one sensor (if the measuring body is attached to the elongate element) or the measuring body (if the sensor is attached to the elongate element) is attached to the second part. If there are a plurality of sensors, the sensors are preferably arranged on the same part.

In particular, the arrangement in accordance with the third aspect of the invention can comprise the following further features or any combinations of these following further features:

- The elongate element can extend within the interior of the arm. The arm can therefore be referred to as hollow arm.
- The arm can be the sleeve of a coordinate measuring machine, e.g. of a coordinate measuring machine with a portal design or gantry design.
- Alternatively, the arm can be an arm of a machine tool, e.g. of a robot.
- The first axial end of the elongate element is situated in an axial position of the arm, at which the second part is also situated. Alternatively, the first axial end of the element can be situated at an axial position of the arm which merely has a small distance from an axial position of the second part. By way of example, such a small distance is a distance corresponding to the distance of a sensor from a measuring body assigned thereto, wherein the sensor is e.g. attached to the first axial end of the element and the measuring body is attached to the second part (or vice versa).
- The second part can comprise an interface for attaching and connecting a probe head, a rotational device, a sensor system with integrated rotational device in accordance with the second aspect of the invention, or a probe.
- The second axial end of the elongate element can be connected to the first part at an axial position of the arm at which a reference point of a scale for measuring the position of the arm is also situated. By way of example, in the case of a sleeve of a coordinate measuring machine, this position of the arm relative to a base of the coordinate measuring machine is displaceable, for example in the vertical direction.
- Alternatively, the elongate element can extend over the whole length of the arm or even beyond this in the axial direction. The at least one sensor/measuring body pair is therefore situated in the region of a first axial end of the arm and in the region of the first axial end of the elongate element. In this case, the second axial end of the elongate element is attached to the opposite second axial end of the arm, which forms the first part.
- In particular, if, as in the embodiment described above, the elongate element extends over the whole length of the arm or else, in the general case where the elongate element can perform mechanical vibrations due to its axial length, it is preferable for provision additionally to be made for a damping apparatus for damping mechanical vibrations of the elongate element. This damping apparatus is preferably arranged in at least one region approximately in the center of the axial extent of the elongate element. For damping apparatuses, use can be made, in particular, of apparatuses in which damping is brought about due to the viscosity of a fluid. However, a damping apparatus, in which movements of the elongate element relative to the arm generate Eddy currents such that the relative movement is braked due to the Eddy currents and hence the desired damping effect of the vibrations occurs, is particularly preferred. By way of example, a first part of the Eddy current damping apparatus is attached to the elongate element which extends in the interior of the arm. This first part can, for example proceeding from the elongate element, extend in the radial direction, i.e. transversely to the axial direction. A second part of the Eddy current damping apparatus is situated at approximately the same axial position on the arm, in particular on the inner side of the wall of the arm. Here, the first and the second part of the Eddy current damping apparatus are arranged relative to one another in such a way that movements of the elongate element transversely to the axial direction lead to a relative movement of the first and of the second part of the Eddy current damping apparatus. The Eddy currents are generated during this relative movement and, as explained above, the damping effect is achieved.
- Alternatively, or in addition thereto, effects of vibrations of the elongate element can be reduced or eliminated by application of a low-pass filter to the time sequence of repeatedly registered measured values of the sensors.
- The elongate element is preferably manufactured from a material which has a substantially smaller (in particular, smaller by at least a factor of 100) coefficient of thermal expansion or coefficient of thermal contraction than the material of the arm between the first part and the second part, and preferably also of the first and second part. Therefore, the elongate element can be considered to be temperature stable. For this reason, it is possible to measure the effects of the thermal expansion or contraction of the arm with the aid of the sensor or the sensors and the measurement body or the measurement bodies. However, a temperature-stable elongate element is also advantageous in that, in the case of different temperatures, the effects of the mechanical bending due to mechanical forces acting on the arm can be measured. Alternatively, or in addition thereto, the temperature of the elongate element or the temperature in the direct vicinity of the elongate element can be measured and the effect of the thermal expansion or contraction of the elongate element can be calculated in order to take the effect into account when evaluating the measurement signals from the at least one sensor.
- It is preferable for more than one sensor to be provided for determining the relative position of the first axial end of the elongate element and hence, indirectly, the relative position of the first part of the arm relative to the second part of the arm, and for said more than one sensor to be used to determine the relative position with respect to a plurality of the degrees of freedom of the movement. It is preferable, at least, to determine three degrees of freedom of the movement, namely two linear degrees of freedom in different, preferably orthogonal, directions, which each extend perpendicular to the longitudinal axis of the arm, and to the linear degree of freedom of the movement in the direction of the longitudinal axis of the arm. If these degrees of freedom are determined, it is possible, in particular, to measure at the axial position of the second part of the arm in which direction and around which path the second part has moved relative to an initial position or reference position due to mechanical forces and/or thermal effects. In many cases, arms of coordinate measuring machines are warp resistant, and so further degrees of freedom of the movement, namely rotational degrees of freedom of the movement, can be discarded. Alternatively, the effects of a small rotational movement of the second part can be taken into account in a different manner, for example by calibrating a probe, directly or indirectly attached to the second part, for mechanically sensing a work piece.

If there can be a change in the alignment of the arm relative to the Earth's gravitational field, this generally leads to a change in the elastic bending of the arm due to the change in direction of the acting weight. It is preferable for such a change in the bending to be taken into account. In particular, it is therefore possible to make a distinction between the alignment-dependent influence due to weight, and the influence due to other external forces and/or temperature differences. In order to correct this elastic bending, use can be made, in particular, of a mathematical model which has at least one finite element. Such a mathematical model was already described in DE 100 06 753 A1 for correcting the elastic bending of rotation/pivot apparatuses. The same correction is also described in the corresponding English-language publication US 2001/0025427 A1. As described in paragraph 56 of this English-language document and as depicted in FIG. 9 of this publication, a finite element can be treated mathematically in such a way as if only one force vector and one torque vector acts in the center of such a finite element, with the force vector and the torque vector being generated by the external load, i.e. the weight and optional further external forces. This model assumes that the elastic center of the finite element, with its position and orientation in space and with its elastic parameters, contains the elastic properties of the deformed components (in this case the elongate element). Moreover, the deformation must be linearly dependent on the loads and proportional to the forces and torques acting in the elastic center. Furthermore, the principle of superposition must hold. The finite element reacts to the force vector and the torque vector with a deformation correction vector, which is composed of a translation vector and a rotation vector. The corresponding deformation correction vector emerges from equation 7 in the document.

In particular if, as mentioned above, the second axial end of the elongate element is connected to the first part at the reference point of a scale or at least at the axial position of the reference point, it is possible to relate the measurement results of the at least one sensor to the reference point in a direct and simple manner. By way of example, this enables a correction when calculating coordinates of a work piece measured by a probe with little outlay since the coordinate system of the scale and the coordinate system of the second part are uniquely coupled to one another by means of the elongate element.

If the elongate element alternatively or additionally extends in the interior of the arm, the installation volume of the arm is not increased. Moreover, the measuring body and the sensor are preferably arranged within the arm in this case and therefore protected from external influences, without requiring an additional housing.

An advantage of the third aspect of the present invention is that the arm, e.g. the sleeve or the robot arm, does not have to be embodied to be resistant to changes in shape with much outlay and it is hence possible to reduce costs and weight. Rather, relative movements between the first and the second part which occur can be measured and taken into account. A corresponding statement applies to thermally caused changes in shape. The arm itself need not be manufactured from a material which has a low coefficient of thermal expansion or coefficient of thermal contraction.

Embodiments of the present invention are now described with reference to the attached drawing. In the individual figures of the drawing:

DESCRIPTION OF THE INVENTION

Figure 1:
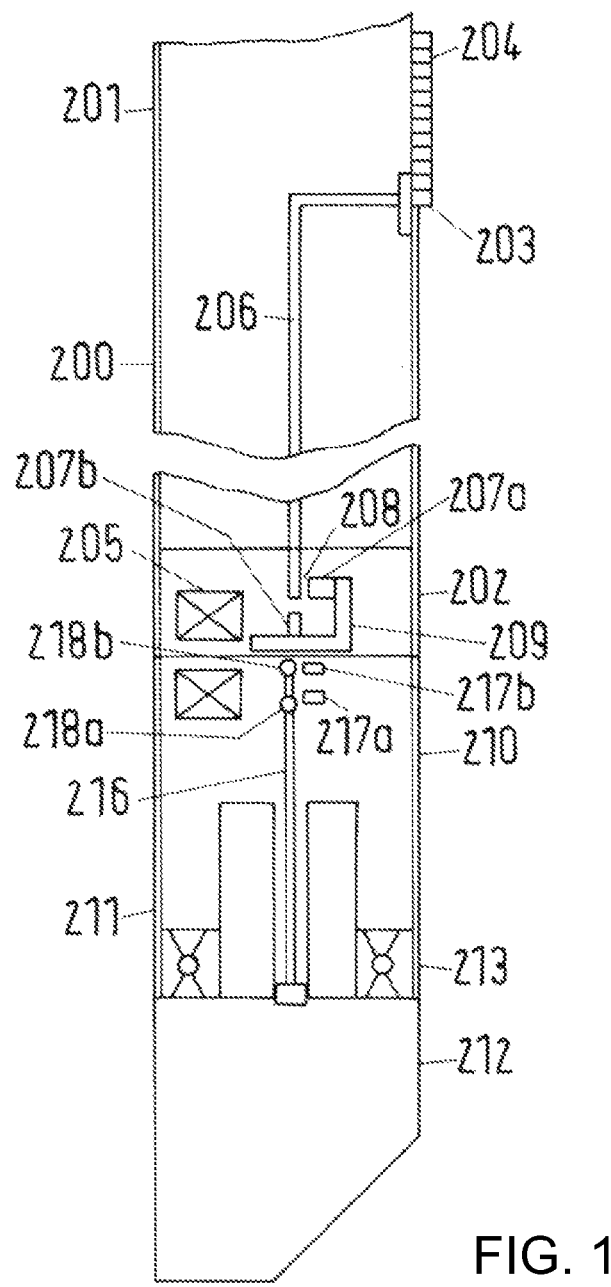
FIG. 1 schematically shows a longitudinal section through the end region of a sleeve of a coordinate measuring machine, wherein a rotational device for rotating a probe head (not depicted in the figure) is coupled to an end region.
Figure 1:
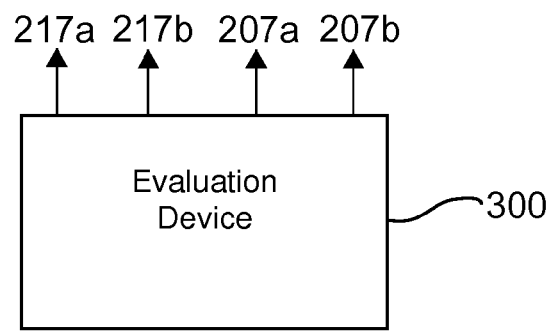

FIG. 1 shows a sleeve 200 of a coordinate measuring machine. As indicated by two curved lines extending approximately parallel to one another, the sleeve 200 can extend in the longitudinal direction thereof over a portion (not defined in any more detail). The longitudinal direction extends from top to bottom in FIG. 1. At the free end of the sleeve situated at the bottom of FIG. 1, which free end is formed by an end region 202, a rotational device 210 is coupled in a manner known per se. The interface can be a so-called interchangeable interface, which enables coupling of various modules, e.g., alternatively, a different rotational device or a probe head. Therefore, appropriate electronics 205 can be arranged in the end region 202, for example for identifying and/or operating the module connected by the interface.

In a central region 201 of the sleeve 200, a scale 204, for example in the form of a line grating which extends in the longitudinal direction of the sleeve 200, is arranged on the outside. A reference point 203 of the scale 204 is defined at the end of the scale 204 lying closest to the end region 202. At the reference point 203, a bent rod 206 made of a temperature-stable material is attached directly on the inside of the external wall of the sleeve 200 as elongate element. Proceeding from the reference point 203, the rod 206 initially extends into the interior of the sleeve 200 in a direction perpendicular to the longitudinal direction of the sleeve 200. In the further course, the rod 206 extends in the direction of the longitudinal axis of the sleeve 200 as far as into the end region 202. Arranged on the end region 202 is a plurality of sensors 207a, 207b, e.g. capacitive sensors, i.e. sensors, the capacitance of which depends on the relative position of a measuring body is measured electrically. By way of example, the measuring body has a dielectric material which is situated in the vicinity of or between electrodes of the capacitive sensor.

However, other sensors, in particular the aforementioned sensors can also be used in addition to capacitive sensors. The end region 208 at the free end of the rod 206 serves as a measuring body. This end region 208 is configured in accordance with the functional principle of the sensor 207. By way of example, in the case of a magnetic functional principle, as is the case in Hall sensors or magnetoresistive sensors, the free end 208 consists of a permanent magnetic material or carries a permanent magnetic material.

FIG. 1 schematically shows a holder 209, which is attached to the end of the end region 202 and carries and holds the sensors 207. In the shown exemplary embodiment, it is indicated schematically that a first sensor 207a is positioned radially outside of the end region 208 of the rod 206. This sensor 207a is therefore configured to measure the relative position of the end region 208 and of the sensor 207a in the radial direction. Preferably, a further sensor (not shown) positioned radially outside of the end region 208 is present, for example below or above the end region 208 in relation to the plane of the figure in FIG. 1. This sensor can therefore be used to measure the radial distance between sensor and end region 208 in another direction. It is optionally possible for further sensors to be arranged at different positions in the circumferential direction about the longitudinal axis and hence around the rod 206. As a result, it is possible to obtain redundant information in relation to the position of the end region 208 of the rod 206 in a plane perpendicular to the longitudinal axis of the sleeve 200 or of the rod 206. It is therefore possible to eliminate systematic errors.

A second sensor 207b is arranged at a distance from the end region 208 in the axial direction (with respect to the longitudinal axis of the sleeve 200). This sensor 207b therefore supplies measurement signals which contain information about the relative position of the sensor 207b in relation to the end region 208 of the rod 206 in the axial direction.

Instead of a sleeve, the arm depicted in FIG. 1 can also be a different arm of a coordinate measuring machine, for example a so-called horizontal arm of a horizontal-arm coordinate measuring machine. In this case, the longitudinal axis of the arm extends approximately in the horizontal direction. In the case of horizontal arms, the bending of the free end of the arm depends on the weight of the devices arranged at the free end. Using the proposed arrangement, it is possible to measure this bending during the operation of the CMM.

In the exemplary embodiment of FIG. 1, a rotational device 210 is, as mentioned, coupled to the end region 202 of the sleeve 200 or of the arm. The stator 211 of the rotational device 210 is attached to the end region 202 of the arm 200. By way of example, the rotor 212 of the rotational device 210, depicted schematically further down in FIG. 1, is rotatably mounted by means of an annular rotational bearing 213 which extends around the longitudinal axis of the stator 211. A temperature-stable rod 216 is connected to the rotor 212 in a rotationally secured manner and, in the longitudinal direction of the stator 211, extends into the interior thereof as far as into a region at the interface between the arm 200 and the rotational device 210. A plurality of sensors 217a, 217b is attached to the stator 211, wherein the corresponding attachment or holder is not depicted in FIG. 1. The end region of the temperature-stable rod 216 at the interface to the arm 200 is embodied as measuring body or carries at least one measuring body 218a, 218b. In the exemplary embodiment, these measuring bodies 218 are spheres or cylinders, which are arranged in rotationally symmetric manner in relation to the longitudinal axis of the rod 216 and hence in relation to the rotational axis of the rotational device 210 or of the rotor 212. The two sensors 217a, 217b, which are depicted in FIG. 1, are situated at different axial positions in relation to the rotational axis and are configured to measure the relative position of the respective measuring body and of the sensor in the radial direction. At least one further sensor is preferably arranged at each axial position, but at a different position in the circumferential direction about the rotational axis such that the radial distance between the sensor and the measuring body is measured in another direction which is preferably perpendicular to the radial direction of the sensor 217a or 217b. As already mentioned above, provision can be made for additional, redundant sensors. The measuring body is preferably used at the respective axial position as assigned measuring body by the plurality of sensors at this axial position.

In the exemplary embodiment of FIG. 1, the sensor is in each case, for both the sensors of the arm 200 and for the sensors of the rotational device 210, arranged radially outside of the measuring body provided this is the measurement of a radial distance. In the case of the axial distance in the direction of the longitudinal axis of the arm, the sensor is likewise, like in the case of the sensors for measuring the radial distance, arranged at the end region 202 of the arm and hence on the movable part of the arm 200. Although this arrangement has advantages, particularly in respect of the electrical connections of the sensors for the purposes of measurement signal transmission to an evaluation apparatus 300 since electrical connections are generally present in any case at the interface between the arm 200 and the rotational device 210. The sensor and the measuring body can be interchanged however, at least in the case of one of the sensor/measuring body pairs. By way of example, at least one sensor can be arranged at the end region 208 of the rod 206 or at the end region of the rod 216 in the proximity of the interface and a corresponding measuring body can be arranged approximately where the sensor is situated in the exemplary embodiment of FIG. 1. Alternatively, or in addition thereto, further modifications can be undertaken. By way of example, the temperature-stable rod 216 of the rotational device 210 can, at least in the end region thereof near the interface to the arm 200, be replaced by a hollow cylinder which forms the measuring body. In this case, the sensors can be situated in the interior of the hollow cylinder. Furthermore, alternatively or in addition thereto, it is also possible to measure the axial position of the rotor by measuring the axial position of the end region of the temperature-stable rod 216. To this end, a further sensor is situated within the rotational device 210, for example at a distance from the measuring body 218b in the axial direction.

Figure 2:
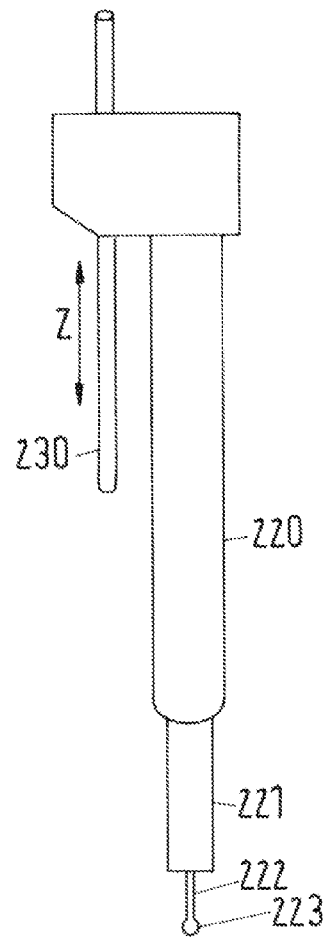
FIG. 2 shows a further embodiment of an arm of a CMM, FIG. 3 schematically shows a partial depiction of the arm as per FIG. 2, wherein sensor/measuring body pairs for measuring the bending of the arm are arranged in the interior of the arm.

FIG. 2 shows an arm 220 of a CMM, in particular a sleeve. This sleeve can be the sleeve 200 depicted in FIG. 1 if the probe head 221 depicted in FIG. 2 is arranged at the lower end of the sleeve and not, as depicted in FIG. 1, a rotational device. The probe head 221 carries a stylus 222 with a spherical probing element 223 at its lower end. As indicated by a double-headed arrow, which is denoted by Z, in FIG. 2, the arm 220 can be moved particularly in the Z-direction, i.e. in a vertical direction along a guide 230.

Figure 3:
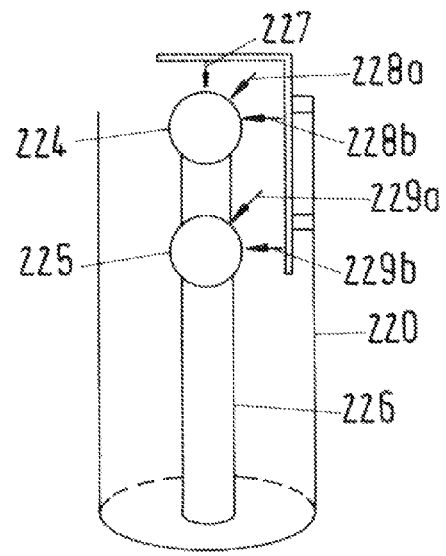

The measurement system depicted in FIG. 3, which is preferably arranged within the arm 220 but can also be arranged outside of the arm, is a variant of the measurement system already described on the basis of FIG. 1. The temperature-stable rod 226 extending in the longitudinal direction of the arm 220 is attached with its lower end to the lower end of the arm 220. In its upper end region, the rod 226 carries two spherical measuring bodies 224, 225, which are arranged at a distance from one another in the axial direction. In particular, the rod 226 with the upper end region thereof extends up to the upper end of the arm 220 or even beyond the latter. As a result of this, a possible deformation of the arm 220 can be measured over the whole longitudinal extent of the latter.

The upper sphere 224 is located, in particular, at the upper end of the rod 226. An arrangement of sensors 227, 228, 229 is attached to the arm 220 in the same axial region in which the upper end region of the rod 226 is also situated. A first sensor 227 is aligned with the upper sphere 224 in the axial direction in order to measure the relative position in the axial direction. A second and a third sensor 228a, 228b are aligned with the upper sphere 224 in the radial direction, wherein the sensors 228 are aligned in different (e.g. orthogonal) directions in order to measure the radial relative position in two different directions. A fourth and a fifth sensor 229a, 229b are likewise aligned in two orthogonal radial directions, but aligned with the lower sphere 225 in order to measure two mutually independent radial relative positions at another axial position. In FIG. 3, all sensors are merely depicted schematically by arrows which depict the alignment of the respective sensor. The length of the rod 226 and of the arm 220 is not depicted to scale and hence is depicted schematically in FIG. 3. Compared to the width of the arm, this length can be much longer than depicted.

Figure 4:
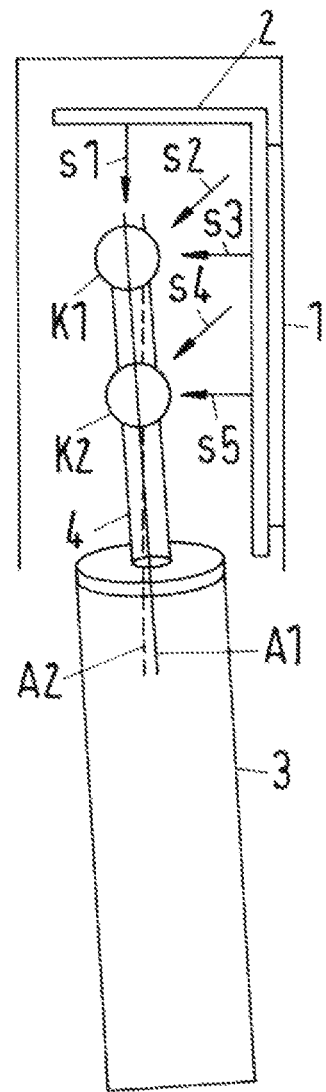
FIG. 4 shows an arrangement of two parts which are mobile relative to one another, wherein the arrangement comprises a measurement system for measuring the relative position and/or relative alignment of the two parts.

Similar to the case in FIG. 3 but schematically for a general case, FIG. 4 shows a measurement system with a plurality of sensors, namely five sensors in the exemplary embodiment, which in turn are depicted schematically by arrows. Here, the direction of the arrow reproduces the alignment of the sensor, i.e. a relative position, in particular a distance between sensor and measuring body, can be measured in the direction of the arrow. The sensors are denoted by the reference signs s1, s2, s3, s4, s5, wherein, in the subsequent equations, the same reference signs s1 . . . s5 are also used for the respective measured values of the sensors.

In the exemplary embodiment, provision is merely made for five sensors s1 . . . s5. Due to the design of the two parts 1, 3 mobile relative to one another and due to the connection thereof (not depicted in FIG. 4; this can be e.g. a rotatable connection or a connection which, although it is secure, may have a changing form due to forces and/or temperature changes), the information from a single sensor s1 suffices to determine the axial relative position of the parts 1, 3 in order to determine the relative position and alignment of the two parts 1, 3 with sufficient accuracy together with measurement results from the other sensors s2 . . . s5. In another case, there is a further sensor also aligned in the axial direction, wherein the two sensors aligned in the axial direction and spaced apart transversely to the axial direction are in this case preferably not arranged coaxially with respect to a possibly present rotational axis about which the two parts 1, 3 can be rotated relative to one another. However, such a rotational axis is not present in all cases. In particular, in the case of an arm of a coordinate measuring machine, in which the relative movement of two different axial regions of the arm is intended to be measured by the measurement system, no such rotational axis is present. Naturally, this does not preclude the case where the two parts or regions of the arm can be rotated relative to one another about an imaginary rotational axis due to thermal effects and/or due to mechanical forces. In this case, this is usually referred to as torsion. Using two such sensors aligned in the axial direction, it is possible, in particular, to directly measure the so-called axial run-out of a rotational axis or torsion axis. The sensors can be designed and can operate in different manners.

In the exemplary embodiment with merely five sensors s1 . . . s5 in accordance with FIG. 4, three of the sensors s1 . . . s3 are preferably aligned with a first measuring body K1, which is attached to the second part 3 of the arrangement and is spherical in the exemplary embodiment. The second part 3 carries an elongate element 4 (e.g. a cylindrical rod or a rod with a different form), on which in turn the first measuring body K1 is attached at the free end thereof. A second measuring body K2, which in turn is spherical in the exemplary embodiment, is arranged at another axial position of the elongate element 4 and hence at a distance from the first measuring body K1 in the axial direction. As an alternative to a single elongate element 4, the measuring bodies can be attached to the second part 3 via several different elements or directly to the second part. The fourth sensor s4 and the fifth sensor s5 are aligned with the second measuring body K2. Here, the second sensor s2 and the third sensor s3, and also the fourth sensor s4 and the fifth sensor s5 are aligned in the radial direction, perpendicular to the longitudinal axis of the elongate element 4. However, a precise perpendicular alignment is only present if the longitudinal axis A1 of the elongate element 4 (or, alternatively, a rotational axis about which the parts 1, 3 can be rotated relative to one another) coincides with or runs at least parallel to the longitudinal axis A2 of the first part 1. This is not the case in the exemplary embodiment depicted in FIG. 4. The two longitudinal axes A1, A2 extend skew with respect to one another or intersect. In any case, the sensors s2 . . . s5 are preferably aligned perpendicular to the longitudinal axis A2 of the first part 1. Furthermore, the pairs of sensors s2, s3 or s4, s5, which are aligned with the same measuring body K1 or K2, are preferably aligned in orthogonal directions.

All sensors are e.g. attached to a common support 2 which in turn is attached to the first part 1. However, the sensors can also be arranged on various supports and/or regions of the first part 1. Furthermore, there can be more than the two measuring bodies K1, K2 depicted in FIG. 4. By way of example, the first sensor s1 can be aligned with a different measuring body than the two sensors s2, s3 aligned in the radial direction. The two sensors s2, s3 and/or s4, s5 aligned in the radial direction can also be aligned with different assigned measuring bodies.

Figure 4A:
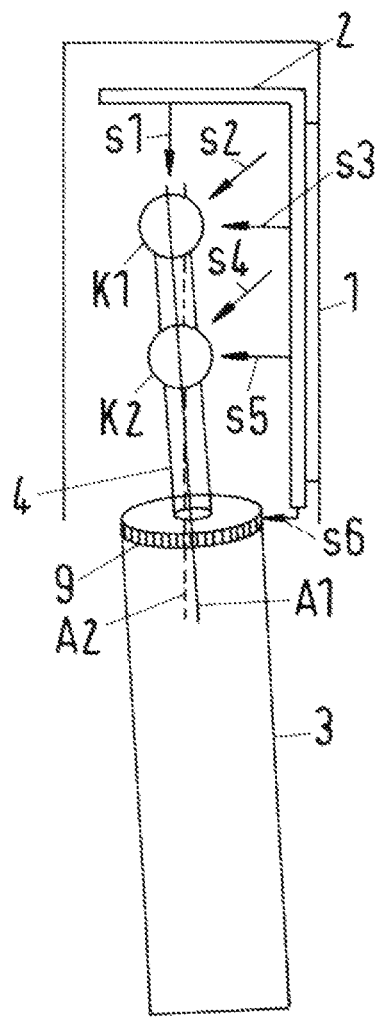
FIG. 4a shows an arrangement like in FIG. 4, wherein, however, provision is additionally made for a rotational position sensor.

FIG. 4a shows a variant of the arrangement shown in FIG. 4. In addition to the measurement system in FIG. 4, which enables the determination of the relative position of the rotatable parts in a radial position at various axial positions with respect to the rotational axis, provision is made for an additional measurement system which measures the rotational position of the two mutually rotatable parts 1, 3. By way of example, a multiplicity of markings are arranged on the second part 3, distributed about the longitudinal axis A1, such that a measuring body 9 is formed. A further sensor s6 registers the markings of the measuring body 9 when these enter a registration region of the sensor s6 or pass through the latter. Therefore, if e.g. the parts 1, 3 perform a complete rotation relative to one another about the rotational axis, the sensor s6 registers all markings of the measuring body 9. As known per se, the sensor s6 can in each case e.g. generate a pulse signal whenever a marking enters the registration region or reaches or passes a specific point in the registration region. Alternatively, the sensor s6, for example as likewise known per se, can in each case increase a meter reading of an incremental counter by the value 1 if it records a marking in its registration region. Other alternative embodiments of a rotational position sensor for measuring the relative rotational position of the two parts 1, 3 are likewise possible. Furthermore, there can also be another measurement system than the measurement system realized by the sensors s1 to s5, which other measurement system however likewise renders it possible to register the radial position of the two parts 1, 3 mobile relative to one another and preferably to register this at the axial position of the measurement system for the purposes of measuring the rotational position, at least to permit the determination of the radial relative position at the axial position of the rotational position measurement system. In the case of the measurement system depicted in FIG. 4 and FIG. 4a (and in FIG. 5), the radial relative position can be determined at the axial position of the rotational position measurement system since the measurement system measures the radial position at two different axial positions. In particular, it is not only the radial position that is determined in one direction, but also the relative position of the parts 1, 3 in a plane transverse to the rotational axis.

As a result, it is now possible to correct the following effect of the rotational position measurement system and thus enable a more precise determination of the rotational position: in the case of the rotational movement of the rotational device, movement components which can be referred to as translation (i.e. linear, straight-line movement) occur. Thus, there is not an ideal rotational movement about the rotational axis of the rotational device, but rather there are also movements transverse to the rotational axis and/or in the direction of the rotational axis (this includes movements parallel to the rotational axis), at least in portions of the rotational movement about the rotational axis. Such a translational movement is—depending on the direction of this translational movement—also measured by a sensor of a rotational position measurement system. If only one translational movement occurs, the sensor registers this movement in a manner leading to a measurement signal which appears to indicate a rotational movement in a direction about the rotational axis. If a rotational movement and a translational movement occur simultaneously, the sensor can generate a measurement signal which appears to indicate a faster rotational movement about the rotational axis. Conversely, rotational movement and translational movement can also wholly or partly compensate one another, and so the sensor appears not to register any or a modified (sloweddown or reversed) rotational movement.

It is now proposed to combine the first measurement system, which registers the translational position and/or translational movement of the first and second part relative to one another, with a second measurement system, which registers the rotational position of the first and second part relative to one another. At least one measurement signal or a measured value from the second measurement system derived therefrom is corrected from measurement signals and/or measured values from the first measurement system derived therefrom. The correction is performed in a manner such that portions of the translational movement of the measurement signals and/or measured values from the rotational position measurement system are reduced or eliminated.

Figure 5:
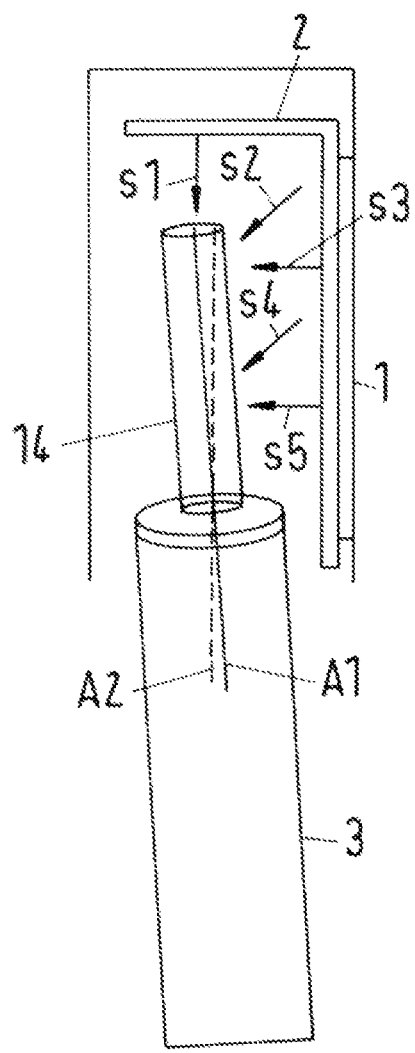
FIG. 5 shows an arrangement like in FIG. 4, wherein, however, the measurement system is modified in respect of the design of the measuring body or bodies, FIG. 6 schematically shows an axial longitudinal section through a first example of an arrangement with a first part and a second part which is mobile relative to the first part.

A variant of the arrangement as per FIG. 4 or FIG. 4a is depicted in FIG. 5. Here, the elongate element 4 with the measuring bodies K1, K2 arranged thereon is replaced by a cylindrical rod 14, which is arranged concentrically with the longitudinal axis A1 of the second part 3. The end face at the free end of the cylindrical rod 14 forms a measurement area for the first sensor s1. The cylindrical external surface of the rod 14 forms a measurement area for the further sensors s2 . . . s5.

Modifications of the measurement systems shown in FIG. 4 and FIG. 5 are possible. By way of example, the cylindrical rod 14 as per FIG. 5 need not have a cylinder surface, continuous in the axial direction, with a constant diameter. Rather, cylindrical regions of the rod can be formed on the axial positions at which the measuring bodies K1, K2 are situated as per FIG. 4, wherein the rod otherwise has a different shape, e.g. has a smaller external diameter.

The measurement signals from the sensors s1 . . . s5 can be taken into account as described below in order to establish the relative position and/or the alignment of the parts 1, 3 and/or to establish and/or correct a change in the relative position and/or alignment of the parts 1, 3. Here, reference is made to a Cartesian coordinate system. The sensors s2, s4 are aligned such that they measure the relative position with respect to the X-axis of the coordinate system; the sensors s3, s5 are aligned such that they measure the relative position with respect to the X-axis of the coordinate system, extending perpendicular to the Y-axis, and the sensor s1 is aligned such that it measures the relative position parallel or coaxially to the Z-axis of the coordinate system, with the Z-axis extending perpendicular to the Y-axis and to the X-axis. This coordinate system is therefore a coordinate system which is based on the second part 3. Conversely, this means that the first part 1 is mobile relative to the coordinate system and that this relative movement or the position and/or alignment relative to the coordinate system can be determined.

From the measured values of the sensors s2, s4, it is possible to calculate the rotational angle of the second part 3 about the X-axis (i.e. the rotational position of such a part in relation to the latter) in accordance with the following equation 1:

$$\tan r_x = \frac{s2 - s4}{d_{K1K2}} \quad (1)$$

Here, $\tan r_x$ is the tangent of the rotational angle about the X-axis. $d_{K1K2}$ is the distance between the sensors s2, s4 in the axial direction (Z-direction), which is approximately equal to the distance between the first measuring body K1 and the second measuring body K2 in the case of the exemplary embodiment in FIG. 4, provided the inclination of the two longitudinal axes A1, A2 is small relative to one another, for example less than three degrees. Accordingly, the rotational angle about the Y-axis can be calculated as follows from equation 2:

$$\tan r_y = \frac{s3 - s5}{d_{K1K2}} \quad (2)$$

Here, $\tan r_y$ is the tangent of the rotational angle about the Y-axis. $d_{K1K2}$ is the distance between the sensors s3, s5, which in turn approximately equals the distance between the two measuring bodies K1, K2 or to corresponding axial positions of the rod 14 as per FIG. 5, at which the sensors are directed. Moreover, the translational position of the part 3 in respect of the coordinate system can be calculated like in the following equation 3:

$$v_{A,B,C} = \begin{pmatrix} s5 + \tan r_y \cdot d_{K1K2} \\ s4 + \tan r_z \cdot d_{K1K2} \\ s1 \end{pmatrix} \quad (3)$$

Here, $v_{A,B,C}$ is the position vector, which can also be used as correction vector in the case of a change in the position of the part 3 relative to the part 1. The expression for calculating the X-component of the vector is found in the first row on the right-hand side of equation 3. The expression for calculating the Y-component is found in the second row on the right-hand side of equation 3. The measured value from the first sensor s1, which is the Z-component, is found directly in the third row on the right-hand side of equation 3.

In the following text, an example for an appropriate correction of the errors of the rotational device is described for the case that the parts 1, 3 which are e.g. depicted in FIG.

4 and FIG. 5 and are mobile relative to one another are parts of a rotational device, in which the parts can be rotated relative to one another about a rotational axis. As mentioned above, the error is, in particular, the wobble error, the axial run-out and/or the radial run-out. The correction establishes the corrected position of a predefined location, e.g. the location of the center of the sphere of a probing sphere of a coordinate measuring machine, with which the CMM mechanically probes a work piece for determining the coordinates of the latter, or the location of a probing point on the surface of a work piece, at which a CMM probes the work piece for determining the coordinates. The predefined location is described by an appropriate spatial vector, which extends from the origin of a laboratory coordinate system to the predefined location. The laboratory coordinate system is a coordinate system in which a base of the rotational device is at rest, i.e. the part of the rotational device with rotational mobility is rotated relative to the base when a rotational movement about the rotational axis of the rotational device occurs. The part of the rotational device without rotational mobility is at rest in the laboratory coordinate system, wherein, however, elastic bending of the part without rotational mobility is, in principle, also possible and can, optionally, be taken into account. In order to take account of the elastic deformation of parts of the rotational device or, preferably, of the whole rotational device, a mathematical model with at least one finite element (see above) can be applied. The result of the model is a corresponding vector which describes the bending in a coordinate system. The spatial vector p, which extends to the predefined location P, can be calculated as per the following equation 4:

$$p = T_P^{-1} T_A^{-1}(D_A t + v_A) + c_A + b_A \quad (4)$$

Here, $T_P^{-1}$ denotes the inverse matrix of the matrix $T_P$ which describes the inclination of the rotational device, in particular the inclination of the rotational axis of the rotational device, in the laboratory coordinate system.

$T_A^{-1}$ describes the inverse matrix of the matrix $T_A$ which describes the position of the rotational device, in particular of a reference point on the rotational axis of the rotational device, in the laboratory coordinate system. $D_A$ describes the matrix which contains the correction values due to the errors of the rotational device. A possible composition of this matrix, from which the components of the matrix arise, will also still be considered. t denotes a vector which extends from the aforementioned reference point of the rotational device to the predetermined location P. This vector t relates to a coordinate system in which the mobile part of the rotational device is at rest. This means that this coordinate system is rotated in the case of a rotational movement of the part with rotational mobility with respect to the laboratory coordinate system. This rotation is taken into account by the matrix $R_A$. $v_A$ describes a correction vector for correcting errors of the rotational device, namely for correcting the radial run-out. $c_A$ is a vector leading from the origin of the coordinate system to a reference point of the rotational device.

Finally, $b_A$ in equation (4) describes a vector by means of which the elastic bending of the rotational device is taken into account. This was already discussed above. This vector $b_A$ is e.g. the result of the above-described correction using a mathematical model with at least one finite element and e.g. described in equation 7 at the end of paragraph 56 in US 2001/0025427 A1.

The aforementioned matrix $D_A$, which is the rotation matrix for correcting the wobble error and the angle error of the rotational device, is described by the following equation 5 in one exemplary embodiment:

$$D_A = \begin{pmatrix} 1 & 0 & 0 \\ 0 & \cos r_x & \sin r_x \\ 0 & -\sin r_x & \cos r_x \end{pmatrix} \begin{pmatrix} \cos r_y & 0 & -\sin r_y \\ 0 & 1 & 0 \\ \sin r_y & 0 & \cos r_y \end{pmatrix} \begin{pmatrix} \cos r_z & \sin r_z & 0 \\ -\sin r_z & \cos r_z & 0 \\ 0 & 0 & 1 \end{pmatrix} \quad (5)$$

Here, "cos" denotes the cosine and "sin" denotes the sine of the respective angle r. As above, the label $r_y$ denotes the rotational angle about the Y-axis and the label $r_x$ denotes the rotational angle about the X-axis. The label $r_z$ denotes the rotational angle about the Z-axis. The correction matrix $D_A$ emerges by multiplying the three matrices on the right-hand side of equation 5.

The following equation 6 relates to the case where a probe of a CMM is arranged on the rotatable part of the rotational device:

$$p = T_P^{-1} T_A^{-1}(D_A(t+Su)+v_A) + c_A + b_A \quad (6)$$

Here, the labels already known from equation 5 have the same meaning. Equation 6 differs from equation 5 by an additional term Su, i.e. the product of a matrix S and a vector u. This term S is added to the vector t from equation 5. The vector u is a displacement vector which describes the deflection of the probe from its rest position. The matrix S is the transmission matrix of the probe which, in particular, takes into account the elastic and geometric properties of the probe and can be obtained by calibrating the probe.

If, like in the second aspect of the present invention, at least one sensor/measuring body pair is used both for determining the position and/or alignment of a probe prior to probing a work piece and for determining the deflection of the probe when probing the work piece, the weight of the probe also influences the position and/or alignment thereof. Here, the influence of the weight depends on the rotational position of a rotational device for setting the alignment of the probe and/or depends on a linear position of a linearly mobile device for setting the position of the probe. In particular, the influence of the weight can be taken into account by the aforementioned model with finite elements. However, it is also possible to measure the influence of the weight using the sensors. In accordance with one preferred embodiment, sensors are therefore available for determining at least five degrees of freedom of the movement of the probe and of the rotatable part of the rotational device relative to the non-rotatable part of the rotational device.

Figure 6:
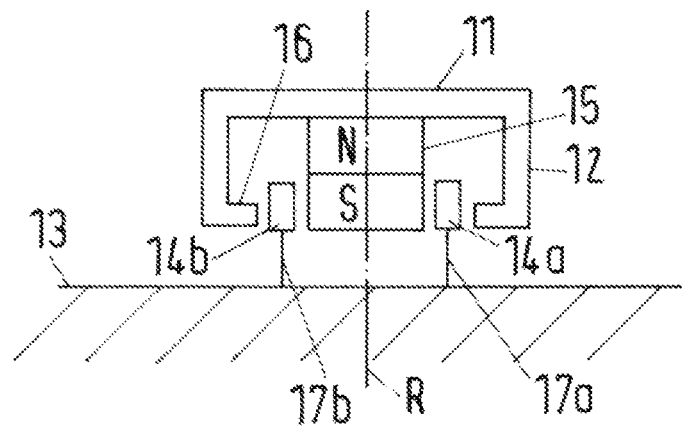

FIG. 6 schematically shows an axial longitudinal section through an arrangement with a first part 13 and a second part 11, which is mobile relative to the first part. In particular, the arrangement can be a rotational device, in which the second part 11 is rotatably mounted relative to the first part 13 about a rotational axis R extending in the vertical direction in FIG. 6.

FIG. 6 shows the measuring principle of a sensor system which comprises a magnet 15, which is attached to the second part 11 and is preferably arranged rotationally symmetrically with respect to the rotational axis R. Here, e.g. the north pole is situated at a higher axial position than the south pole with respect to the axis R. In general, it is preferable for the longitudinal axis of the magnet defined by the two opposite poles of the magnet to be aligned parallel to or preferably coaxially with the rotational axis R. In the exemplary embodiment, the second part 11 moreover has an element 12 made of a magnetizable material (e.g. made of ferromagnetic material such as e.g. ferrite), which is provided as element for guiding the magnetic field lines as desired. The element 12 is preferably formed and arranged rotationally symmetrically with respect to the rotational axis R. At the one pole of the magnet 15 (in this case the north pole), it has a disk-shaped region which extends in the radial direction with respect to the rotational axis R. At the external circumference thereof, a cylindrical region extends coaxially with respect to the rotational axis R in the axial direction, parallel to the longitudinal axis of the magnet 15 and hence in the direction of the axial position of the other magnetic pole (in this case the south pole) of the magnet 15. At the end of the cylindrical region, a further radially interior region of the element 12 may optionally be present (as depicted in FIG. 6), and so the remaining annular gap between the radially interior region 16 and the magnet 15 is smaller than between the cylindrical region and the magnet 15. At least one sensor 14—two sensors 14a, 14b in the exemplary embodiment—for measuring the radial position or relative position of the first part 13 and of the second part 11 is situated in this annular gap. The at least one sensor 14 is attached to the first part 13, for example by means of a support 17 extending parallel to the rotational axis R. In the exemplary embodiment, the two sensors 14a, 14b are arranged at radial positions which are opposite to one another with respect to the rotational axis R. Hence, these are sensors which supply redundant information in relation to the relative position of the first part 13 and of the second part 11; to be precise, in a direction which extends in the horizontal direction in the plane of the figure in FIG. 6.

A flux guiding part (e.g. made of ferrite) can optionally also be situated at the lower magnetic pole of the magnet. By way of example, the sensor can be a Hall sensor or a magnetoresistive sensor.

Figure 7:
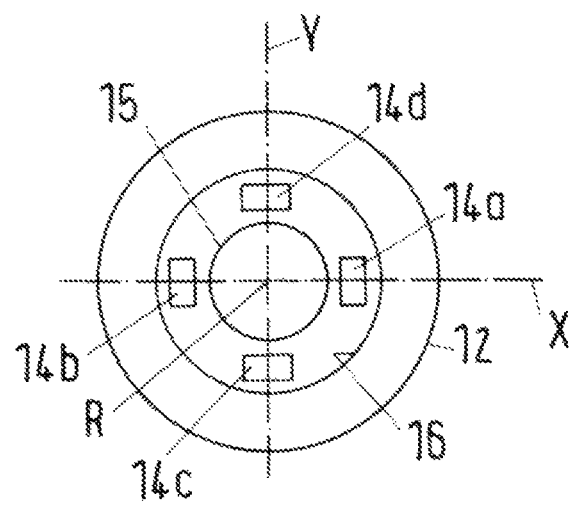
FIG. 7 shows a top view in the axial direction on a variant of the arrangement in FIG. 6.

FIG. 7 shows a variant of the arrangement of FIG. 6, with the view being directed in the axial direction of the rotational axis R from FIG. 6; to be precise, directed to the lower side of the magnet 15 and of the element 12. In the annular gap between the radially interior region 16 and the magnet 15, there are two additional magnetic sensors 14c, 14d in addition to the two sensors 14a, 14b depicted in FIG. 6. However, observed in the circumferential direction about the rotational axis R, these further sensors 14c, 14d are at a different position, and so they measure the relative position of the first part 13 (not shown in FIG. 7) and of the second part 11 in a different direction than the sensors 14a, 14b. In FIG. 7, the direction in which the sensors 14a, 14b measure the relative position is denoted by X since this may be e.g. the direction of the X-axis of a Cartesian coordinate system. The Y-direction extending perpendicular thereto is the direction in which the sensors 14c, 14d measure. In FIG. 6, the X-direction extends from right to left.

Figure 8:
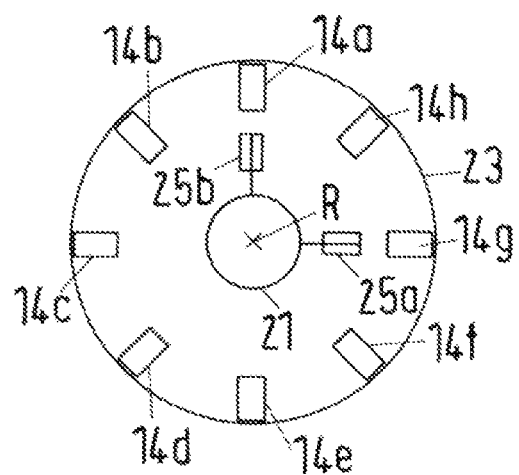
FIG. 8 shows a top view in the axial direction on a further arrangement for measuring the position of a first part relative to a second part, FIG. 9 schematically shows the integration of an arrangement as per FIG. 4 in a rotary table, FIG. 10 schematically shows an axial longitudinal section through a second example of an arrangement with a first part and a second part mobile relative thereto, wherein the arrangement has a measurement system like in FIG. 6 and/or FIG. 7, FIG. 11 schematically shows an axial longitudinal section through a third example of an arrangement with a first part and a second part mobile relative thereto, wherein the arrangement in each case has a measurement system like in FIG. 6 and/or FIG. 7 at various axial positions, FIG. 12 schematically shows an axial longitudinal section through a fourth example of an arrangement with a first part and a second part mobile relative thereto, wherein the arrangement in each case has a different measurement system than in FIG. 12 at various axial positions, FIG. 13 schematically shows an axial longitudinal section through a fifth example of an arrangement with a first part and a second part mobile relative thereto, wherein the arrangement in each case has another different measurement system than in FIG. 12 or FIG. 13, at various axial positions.

FIG. 8 shows a variant of an arrangement for measuring the position of a first part 23 relative to a second part 21. The figure shows a section through the arrangement transversely to a rotational axis R, about which the parts 21, 23 have rotational mobility relative to one another. From the view of the rotational axis R, magnets 25a, 25b are arranged on the first part 21 in different, preferably orthogonally extending radial directions. Contrary to what is depicted in FIG. 8, the magnets 25 can alternatively be arranged at a relatively large distance from the rotational axis R, namely at a distance which approximately equals the distance of sensors 14 which sensors are attached to the second part 21. Overall, eight sensors 14 are arranged on the first part 23, which sensors are assigned to the magnets 25a, 25b; i.e., the sensors 14 can in any case measure the position of said magnets in the radial direction, i.e. perpendicular to the rotational axis R, when the magnets 25a, 25b are in the vicinity thereof. The magnets 25a, 25b therefore exert the function of measuring bodies which are assigned to the sensors 14a to 14h. These sensors 14 are distributed over the circumference of the first part 23 with the same angular distances in relation to the rotational axis R. Thus, in the case of eight sensors 14, a sensor is situated every 45° in the circumferential direction. If the sensors 14 and the magnets 25 are situated at the same distance from the rotational axis R, the sensors and magnets are offset from one another in the axial direction, i.e. parallel to the axis R, so that the rotational movement about the rotational axis R is possible.

The arrangements in accordance with FIG. 8 are an alternative realization of a sensor system to the measurement system depicted in FIG. 4 and FIG. 5. In particular, the sensors s2, s3 or the sensors s4, s5 can through it, s5 with the respective assigned measuring body can be replaced by the arrangement in accordance with FIG. 8. This also means that, in each case, an arrangement in accordance with FIG. 8 can replace the arrangement of the sensors s2, s3 or s4, s5 with the assigned measuring body. In this case, the two arrangements in accordance with FIG. 8 are situated at different axial positions with respect to the rotational axis R. It is additionally possible, as shown in FIG. 4 and FIG. 5, for e.g. at least one sensor s1 to be present, which measures the axial relative position of the parts mobile relative to one another.

The arrangement in FIG. 8 can be modified, in particular by virtue of the two magnets 25a, 25b being replaced by one sensor in each case and, accordingly, the eight sensors each being replaced by one magnet. Furthermore, it is possible to use other sensors than magnetic sensors, e.g. capacitive or inductive sensors with appropriate assigned measuring bodies. Alternatively, or in addition thereto, it is possible to vary the number of sensors 14. By way of example, it is possible that merely four sensors, or else sixteen sensors, are distributed over the circumference.

The embodiment as per FIG. 8 renders it possible, particularly in the case of specific rotational positions of the first part 23 relative to the second part 21, to measure the two radial positions. In these specific rotational positions, the magnets 25 are each situated in the vicinity of one of the sensors 14 such that the measurement of the radial relative position succeeds with high accuracy. Thus, the arrangement in accordance with FIG. 8 renders it possible to establish the errors of the rotational device (in particular wobble error) at these specific rotational positions. In particular, in the case of coordinate measuring machines with probes or probe heads which are rotatable with respect to an arm of the CMM, a plurality of discrete rotational positions are often sufficient to satisfy the measuring problems in a suitable manner, and a corresponding statement applies to a rotary table on which a work piece can be arranged in a rotatable manner relative to a base of the rotary table. In the case of a plurality of discrete rotational positions of the work piece relative to the base, e.g. the eight different rotational positions in accordance with the arrangement from FIG. 8, the work piece can be machined and/or measured as desired.

The principle of the arrangement in accordance with FIG. 8 can also be applied to an arrangement similar to the one as per FIG. 6, i.e. the sensors being arranged in a gap between a permanent magnet and another permanent magnet or in a gap between a permanent magnet and an element for magnetic flux guidance or in a gap between two elements for magnetic flux guidance.

In particular, it is possible to successively query the signals from the plurality of sensors 14 as per FIG. 8 (or another number of a plurality of sensors) in a cyclic or other manner by means of a multiplexer and hence register these. By way of example, in the angular position shown in FIG. 8 between the two parts 21, 23 which are rotatable with respect to one another, only the measurement signals from the sensors 14a, 14g would assume values providing information about the radial relative position.

It applies in general and not only in the embodiment of FIG. 8 that e.g. analog electrical signals from a sensor can be digitized by an analog/digital converter and that the signals can subsequently be processed digitally, in particular by using a computer.

The principle explained on the basis of FIG. 4, according to which the error of the rotational device can only be measured at specific discrete angular positions (or in narrow ranges about these discrete angular positions) is however also advantageous in that these discrete angular positions can be determined by means of the same sensors that are also used to determine the error of the rotational device. As mentioned previously, e.g. only the sensors 14a, 14g emit measurement signals which make it possible to deduce the vicinity of a magnet 25 in the rotational position depicted in FIG. 8. Hence, the left-hand position can be established uniquely from the signals of the sensors. The exact position and alignment can then be established by means of sensors 14a, 14g (or by other sensors 14 in the case of other angular positions or rotational positions) and optionally by further sensors for determining the radial relative position at a different axial position and optionally by at least one additional sensor for determining the axial position. If the angular position is not or cannot be established using the same sensors as for determining the errors of the rotational device, use is preferably additionally made of a further measurement system, which is configured to establish the angular position or rotational position. Such systems are known from the prior art and will not be described in any more detail herein.

Figure 9:
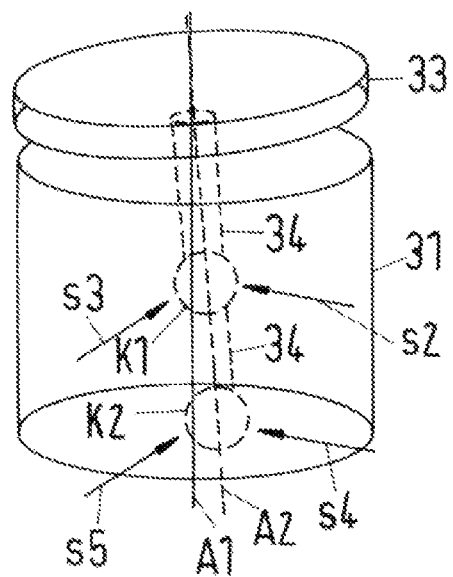

FIG. 9 schematically shows the integration of an arrangement as per FIG. 4 into a rotary table. The rotatable part 33 of the rotary table serves, in particular, to arrange a work piece on the rotary table 33. The base of the rotary table is connected to or formed by the non-rotatable part 31. The part of the measurement system which carries the measuring bodies K1, K2, e.g. like in FIG. 4 on a rod 34, is attached to the lower side of the rotatable part 33 and is also moved in the case of a rotational movement of the rotatable part 33. The rod 34 with the measuring bodies K1, K2 extends from top to bottom in the interior of the non-rotatable part 31. Like in FIG. 4, the sensors s2, s3, s4, s5 are indicated schematically by arrows and are attached to the non-rotatable part 31.

In place of the measurement system in accordance with FIG. 4 and FIG. 9, it is also possible for a different measurement system to be integrated into the rotary table with the parts 31, 33 that are rotatable with respect to one another. In particular, the sensors can co-rotate with the rotatable part 33 and the measuring bodies can be arranged on the non-rotatable part 31. Furthermore, it is possible to use other measuring bodies than the spherical measuring bodies K1, K2. By way of example, the measurement system in accordance with FIG. 8 can also be integrated into the rotary table in accordance with FIG. 9. Furthermore, it is possible that, in a similar manner, a measurement system is not integrated into a rotary table but rather into a rotational device for rotating a probe of a CMM or for rotating a tool of a machine tool. In this case, the measurement system, as depicted in FIG. 9, is likewise situated within one of the two parts that are rotatable with respect to one another.

Figure 10:
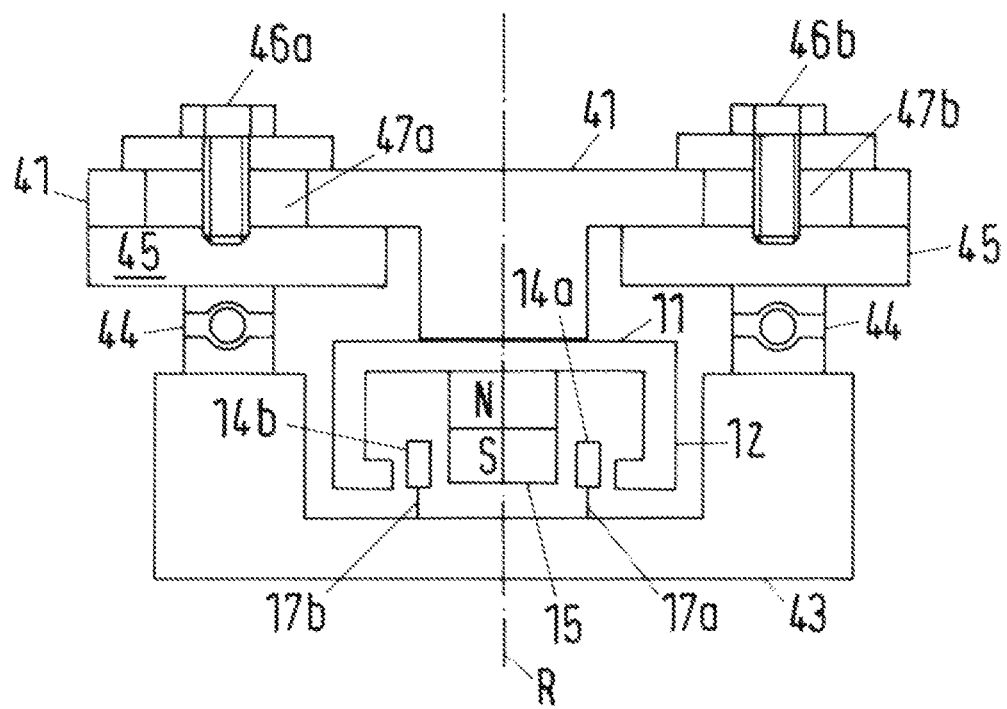

FIG. 10 shows a measurement system as in FIG. 6 and/or FIG. 7. For the corresponding parts of the measurement system, use is made of the same reference signs as in FIG. 6 and FIG. 7. However, alternatively, use can also be made of a different measurement system, for example similar to one schematically depicted in FIG. 4 and FIG. 5. This also applies to the embodiments depicted in the following figures.

The embodiment as per FIG. 10 has a rotatable part 41, which is securely connected to the part 11 of the measurement system. The sensors 14a, 14b of the measurement system are connected to a non-rotatable part 43, i.e. the rotatable part 41 can be rotated relative to the non-rotatable part 43 about the rotational axis R, wherein the rotation also results in a different rotational position of the element 12 of the measurement system relative to the sensors 14. However, these sensors 14 are not configured to establish the rotational position. However, this would be the case e.g. when using a measurement system in accordance with FIG. 8 (see above).

The arrangement in accordance with FIG. 10 enables the calibration of the measurement system since the position of the rotatable part 41, and hence of the parts of the measurement system connected to the part 41, can be changed in the radial direction relative to the rotational axis R. To this end, the rotatable part 41 is attached to an intermediate part 45 by means of attachment means, screws 46a, 46b in the exemplary embodiment. This intermediate part 45 is rotatable about the rotational axis R and, for this purpose, is mounted on the non-rotatable part 43 by means of a rotational bearing 44. Stated more generally, the non-rotatable part 43 is rotatably coupled to a first rotatable part 45 by means of a rotational bearing 44 such that the first rotatable part and the stationary part 43 can perform a rotational movement relative to one another about a rotational axis R. A second rotatable part 41 is securely but detachably connected to the first rotatable part 45 such that the relative position of the first rotatable part 45 and of the second rotatable part 41 can be set.

In respect of the calibration of the sensors 14, which enable a measurement of the relative position of the stationary part 43 and of the rotatable part 41, the second rotatable part 41 is affixed in various relative positions in the radial direction relative to the first rotatable part 45 (in particular by detaching and re-affixing the fixation means, changing the relative position and re-affixing the fixation means). In all these relative positions of the parts 45, 41, measured values of the corresponding sensors assigned to this degree of freedom of the movement or measured values of the sensor are established and calibration information is obtained therefrom. If the relative position of the non-movable part 43 subsequently changes relative to the second movable part 41 due to errors (in particular wobble errors) of the rotational device, it is possible to establish in which relative position the parts 41, 43 are situated by means of the obtained calibration information. In particular, nonlinearities between the relative position and the sensor signal of the respective sensor are established by the calibration.

For other degrees of freedom of the movement, it is also possible that there is a corresponding movement possibility between a first and a second rotatable part such that these two rotatable parts can be affixed with respect to the degree of freedom of the movement in different relative positions.

As an alternative or in addition to calibration by means of a change in the relative position of two parts with rotational mobility, the sensors can be calibrated in a special measurement arrangement, i.e. the sensors are then not situated in the rotational device but rather in a reference rotational device or in another special design for calibration. After the calibration values have been obtained, the sensors are inserted into the rotational device and supply measured values during the operation of the rotational device. A corresponding statement also applies e.g. if the sensors are not inserted into a rotational device but rather into the above-described arm of a CMM or of a machine tool in accordance with the third aspect of the present invention.

If at least two measurement systems or partial measurement systems are arranged for registering the radial relative position at different axial positions in respect of the rotational axis, a non-parallel alignment of the two measurement systems or partial measurement systems is preferably also established and/or corrected by calibration. The eccentricity of the measurement systems or partial measurement systems with respect to the rotational movement about the rotational axis is preferably also established and/or corrected by calibration. Once again, it is possible to establish the error of the whole measurement system or of both measurement systems in a separate calibration arrangement. To this end, the two measurement systems or partial measurement systems are securely connected to one another and operated in a reference rotational device, which has a negligibly small or exactly known error of the rotational movement; i.e., appropriate measured values of the sensors are recorded in various rotational positions of the reference rotational device. Subsequently, the arrangement of the measurement systems or partial measurement systems is inserted into the rotational device, in which the sensors are to continuously supply signals during operation. Here, the secure connection between the two measurement systems or partial measurement systems is not modified relative to the use in the reference rotational device.

Figure 11:
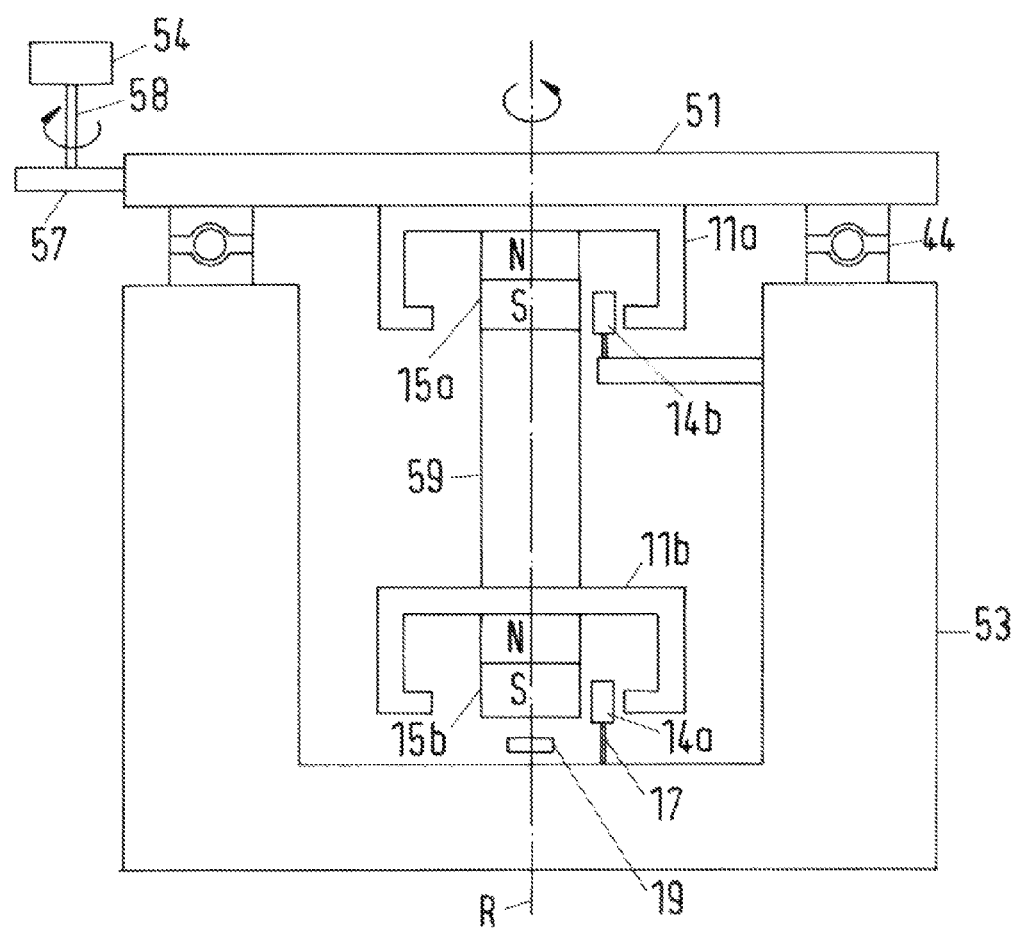

FIG. 11 shows two of the measurement systems in accordance with FIG. 6 and FIG. 7, wherein the measurement systems can once again be replaced by other measurement systems. However, in the special exemplary embodiment, merely one sensor is depicted for determining the radial relative position of the part 51 with rotational mobility relative to the part 53 without rotational mobility. In the bottom one of the two depicted measurement systems, there is additionally also a sensor 19 for measuring the axial relative position of the parts 51, 53, wherein this sensor 19 is arranged at a small distance from the lower magnetic pole (in this case south pole) of the measurement system depicted further down.

In the exemplary embodiment, the stationary part 53 (the stator) is U-shaped in the depicted longitudinal section and contains in the interior thereof the lower measurement system and a connection 59 between the lower and the upper measurement system. As a result of this, both measurement systems are co-rotated in the case of a rotational movement of the rotatable part 51. However, the parts of the measurement system connected to the stator 53 (in this case the sensors) are naturally not co-rotated. The stator 53 and the movable part 51 are in turn mounted on one another in a rotatable manner by means of a rotational bearing 44. A drive for a rotational movement of the rotatable part 51 is depicted schematically top-left in FIG. 11. A motor 54 drives a rotational movement of a drive shaft 58, by means of which a drive wheel (e.g. a friction wheel or toothed wheel 57) is rotated, which transmits a corresponding torque to the rotatable part 51. FIG. 11 does not, for each of the two measurement systems, depict in each case a preferably additionally present second sensor for measuring a radial relative position of the part 51 with rotational mobility and of the stator 53 in a direction extending perpendicular to the first radial direction, in which the sensors 14a and 14b depicted in FIG. 11 measure the radial relative position.

Figure 12:
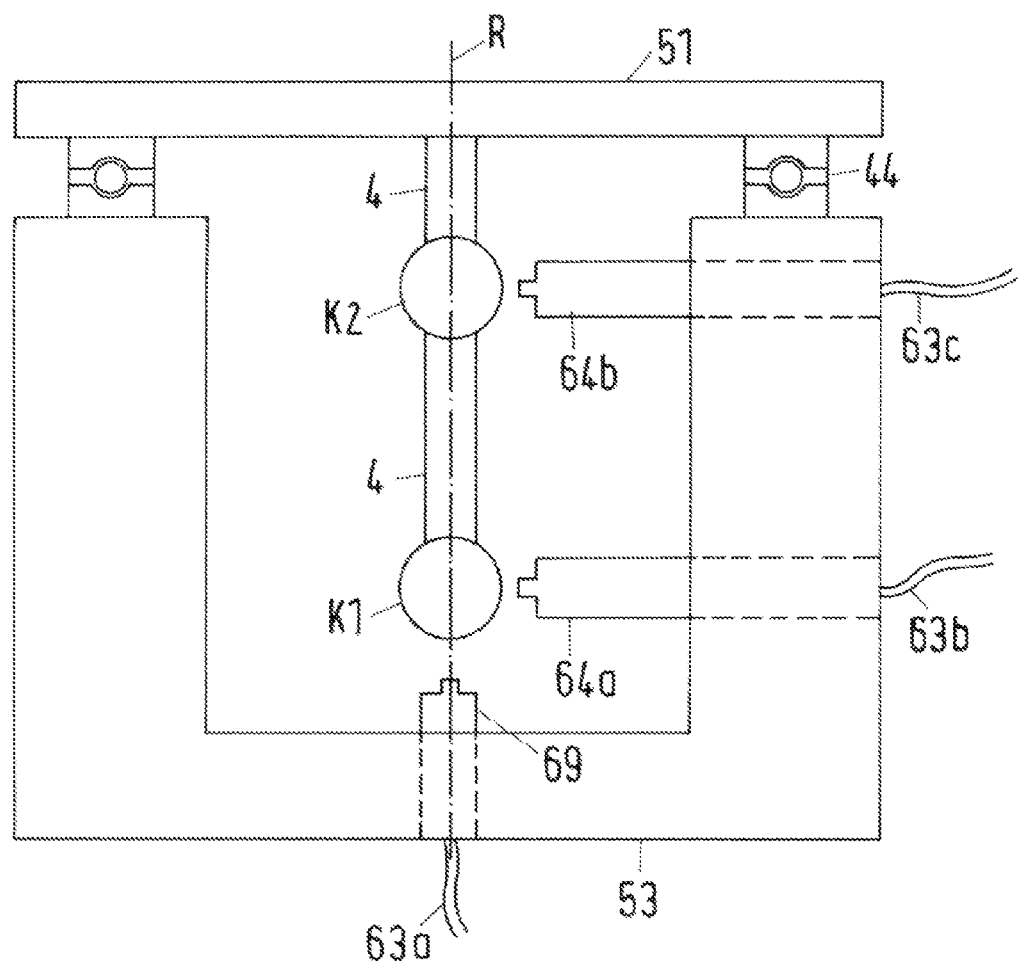

FIG. 12 shows an arrangement like in FIG. 11, wherein, however, the two measurement systems are replaced by another measurement system which corresponds to the embodiment described on the basis of FIG. 4. Attached to the rotatable part 51 is a rod-shaped support 4, which extends rotationally symmetrically with respect to the rotational axis R from top to bottom in the interior of the stator 53. The rod-shaped support 4 carries two spherical regions K1, K2 as measuring bodies at an axial distance with respect to the rotational axis R. Directed on the stator 53 are the sensors 64a, 64b, 69 and two additional sensors for determining the radial distance in a different direction than the sensors 64a, 64b. Here, the sensor 69 for determining the axial distance of the stator 53 from the spherical measuring body K1 is carried by the base of the stator 53 situated at the bottom. A connection cable 63a of the sensor 69 is passed from top to bottom through the base of the stator 53. By means of the cable 63, the sensor signal from the sensor is fed to an evaluation apparatus (not depicted here). The two sensors 64a, 64b, which are directed to the first spherical measuring body K1 or the second spherical measuring body K2, are attached to a sidewall (i.e. a longitudinal limb of the U-profile in the depicted longitudinal section). In each case, a connection cable 63b, 63c is again passed through the sidewall of the stator 53, wherein the cables 63 are likewise connected to the evaluation apparatus. The sensors 64, 69 are e.g. optical sensors. Alternatively, these can be e.g. capacitive sensors. In this case, the measuring bodies K1, K2 are made of e.g. electrically conductive material, e.g. steel.

Figure 13:
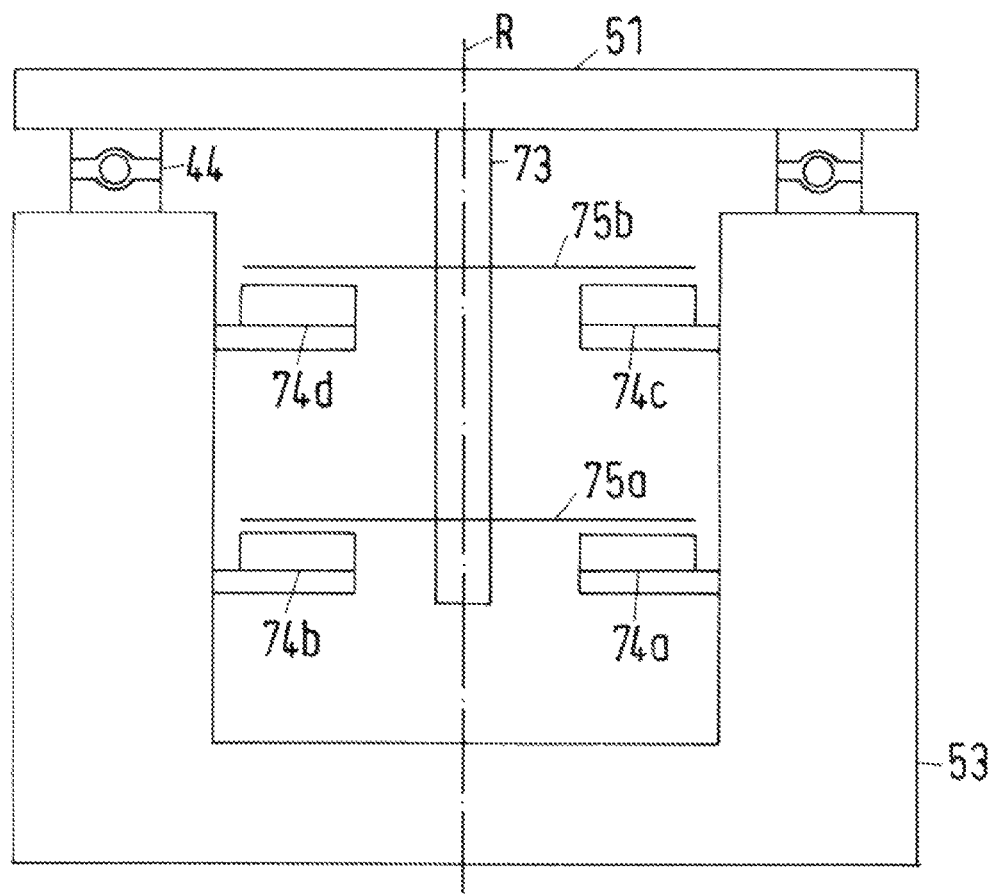
Figure 14:
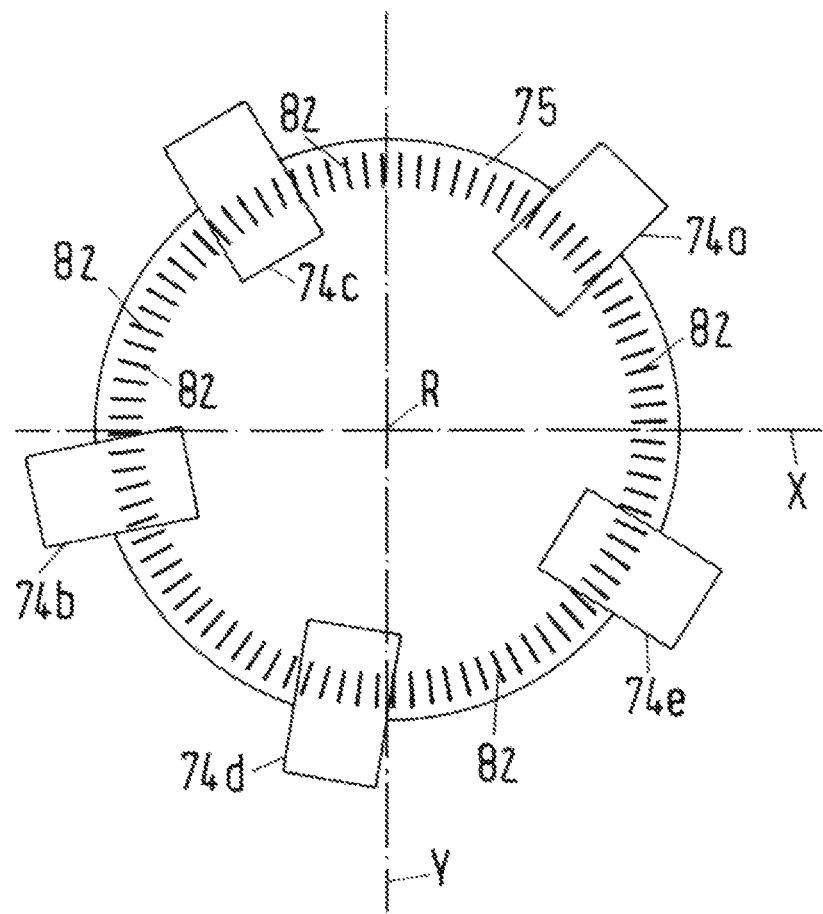
FIG. 14 shows a top view in the axial direction on one of the measurement systems from the arrangement in FIG. 13, wherein the measurement system comprises a plurality of rotational position sensors for measuring the relative rotational position of the two parts, FIG. 15 schematically shows an axial longitudinal section through a sixth example of an arrangement with a first part and a second part mobile relative thereto, wherein the arrangement comprises a measurement system for determining the axial relative position of the parts, FIG. 16 schematically shows an axial longitudinal section through a seventh example of an arrangement with a first part and a second part mobile relative thereto, wherein the arrangement, in addition to the arrangement in FIG. 15, comprises a measurement system for determining the radial position or radial positions of the parts, FIG. 17 schematically shows an axial longitudinal section through an eighth example of an arrangement with a first part and a second part mobile relative thereto, wherein the arrangement comprises a combination of a measurement system of the arrangement as per FIG. 13 with a measurement system of the arrangement as per FIG. 12, FIG. 18 schematically shows an axial longitudinal section through a ninth example of an arrangement with a first part and a second part mobile relative thereto, wherein the arrangement comprises a further combination of two different measurement systems, FIG. 19 schematically shows an axial longitudinal section through a tenth example of an arrangement with a first part and a second part mobile relative thereto, wherein the arrangement has two different measurement systems like in FIG. 18, but these use a common measuring body.

FIG. 13 shows a stator 53 and a rotor (rotatable part) 51 like in FIG. 11 and FIG. 12, which are likewise rotatably mounted by means of a rotational bearing 44. However, the measurement systems from FIG. 11 and the measurement system from FIG. 12 have been replaced by another measurement system. A rod-shaped support 73 protrudes downward from the rotor 51 into the cavity of the stator 53, wherein the rod-shaped support 73 is attached to the rotor 51 in a rotationally secured manner and arranged coaxially with respect to the rotational axis R. At different axial positions in relation to the rotational axis R, the rod 73 respectively carries a disk 75a, 75b, which, e.g. as shown in FIG. 14, has a structure with a multiplicity of markings which are arranged at a distance from one another on the disk or by the disk. These markings spaced apart from one another can therefore be referred to as a grating and, in the case of line-shaped markings, as a line grating. Here, the markings, of which some are labeled with the reference sign 82 in FIG. 14, preferably extend along a circular line, i.e. the distance from one another corresponds to the corresponding section of the circular line between the markings. Here, the circular line extends around the rotational axis R. Like FIG. 7, FIG. 14 also depicts the transversely and respectively orthogonally extending X- and Y-axes, in the direction of which the relative positions of the stator and of the rotor are to be determined.

While the sensors 74a, 74b and 74c, 74d for measuring the radial relative position are arranged opposite to one another with respect to the rotational axis R in the radial direction or diameter direction, the arrangement of the sensors 74a, 74b, 74c, 74d, 74e which is shown in FIG. 14 has a different design. The top view of FIG. 14 shows that a total of five sensors 74 are distributed approximately uniformly over the circumference. Hence, none of the sensors 74 in FIG. 14 lie directly opposite another sensor with respect to the rotational axis R.

In any case, the sensors 74 in accordance with FIGS. 13 and 14 are designed to establish not only the rotational position or change in rotational position of the disk 75 with respect to the rotational axis R, but also the radial position of the disk 75 relative to the sensors and hence the radial position of the rotor 51 relative to the stator 53. Here, it is not mandatory for the signals of the individual sensors to be evaluated and a radial position to be established therefrom in each case in relation to the connection line between the sensor and the rotational axis R. Rather, the position of the disk 75 and hence of the rotor 51 within the plane which extends perpendicular to the rotational axis R and is defined by the disk can be determined from the totality of the signals from more than one of the sensors 74. In order to determine this position in the plane or the individual radial relative position, use is made of the effect that the distance between linear markings 82, which extend in the radial direction and therefore perpendicular to the aforementioned circular line, increases with increasing distance from the rotational axis R and becomes smaller in the opposite direction. As a result, this also changes the measurement signal from the sensors 74, which sensors simultaneously register a plurality of markings.

As shown in FIG. 13, the sensors 74 are once again attached to the inner side of the sidewall of the stator 53. Suitable sensors are described in e.g. EP 1 923 670 A1.

FIG. 15 shows a variant of a partial measurement system for determining the axial relative position with respect to the rotational axis R. The arrangement of stator 53, rotational bearing 44 and rotor 51 is embodied as in FIG. 11 to FIG. 13. However, the height of the sidewalls of the stator 53 and hence the height of the interior thereof can vary. This also applies to embodiments other than the one depicted in FIG. 15. A magnetic sensor 89 is securely connected to a sidewall of the stator 53 by means of a support 87. Said sensor is situated in the region of the rotational axis R, i.e. it is pierced by the imaginary rotational axis R. A first magnet 85b, which is securely arranged on the underside of the rotor 51 by means of a rod-shaped support 84, is situated at an axial distance above the sensor 89. A second magnet 85a is arranged at an axial distance below the sensor 89 and likewise attached to the stator 53, like the sensor 89. Due to the two magnets 85, a particularly strong magnetic field is generated at the location of the sensor 89, such that the spatial resolution is particularly high when measuring the axial position. However, the lower magnet 85a is not mandatory. By way of example, in the embodiment of FIG. 11, which was described above, the sensor can be attached directly to the lower part of the stator 53 and the lower magnet 85a in accordance with FIG. 15 can be dispensed with.

A similar design to FIG. 15 is shown in FIG. 16, wherein, however, provision is additionally made for a measurement system for determining the radial position or radial positions of the rotor 51 relative to the stator 53. By way of example, the additional measurement system is embodied as already described on the basis of FIG. 13 and FIG. 14. A disk 75 with a multiplicity of spaced-apart markings is arranged on a rod-shaped support 84, rotationally secured with respect to the rotor 51. At least two sensors 74a, 74b for registering the spaced-apart markings by or on the disk 75 are fixedly connected to the sidewalls of the stator 53. The overall arrangement of the sensors of the embodiment in FIG. 16 serves to establish three degrees of freedom of the movement, with it not being possible to record drum errors. The arrangement is therefore suitable for rotational devices, in which wobble errors are negligibly small, for example due to the design. The advantage of the arrangement as per FIG. 14 lies in the small installation height, i.e. in the small extent along the rotational axis R.

Figure 17:
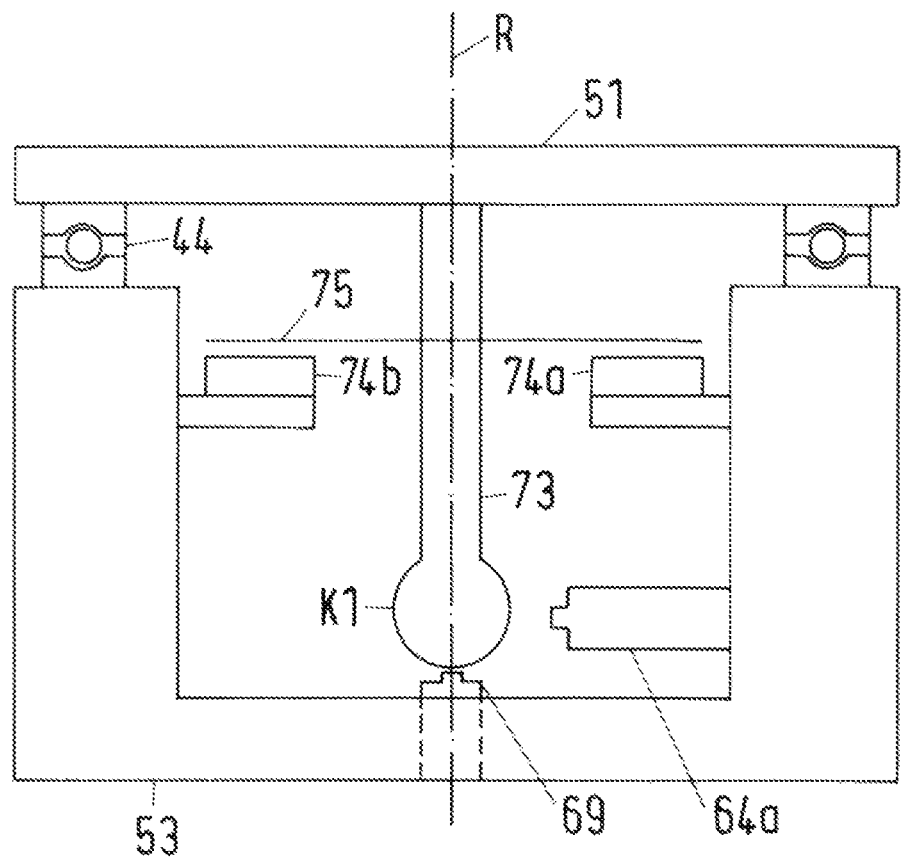

FIG. 17 shows a combination of the upper measurement system from the arrangement in accordance with FIG. 13 with the lower measurement system from the arrangement in accordance with FIG. 12. The same reference signs as in FIG. 12 and FIG. 13 have the same meaning in FIG. 17. It is possible to establish linearly mutually independent radial relative positions of the rotor 51 and of the stator 53 at a first axial position with respect to the rotational axis R using the two sensors 74a, 74b and the disk 75. It is possible to establish two radial, mutually independent radial relative positions of the stator 53 and of the rotor 51 at a second axial position of the rotational axis R using the sensor 64a and a further sensor (not depicted here), which are aligned with the measuring body K1, which is arranged on the rod-shaped support 73 in the lower end region thereof. An axial relative position of the sphere K1 and of the sensor 69, which is attached at the bottom to the stator 53, can additionally be established.

Figure 18:
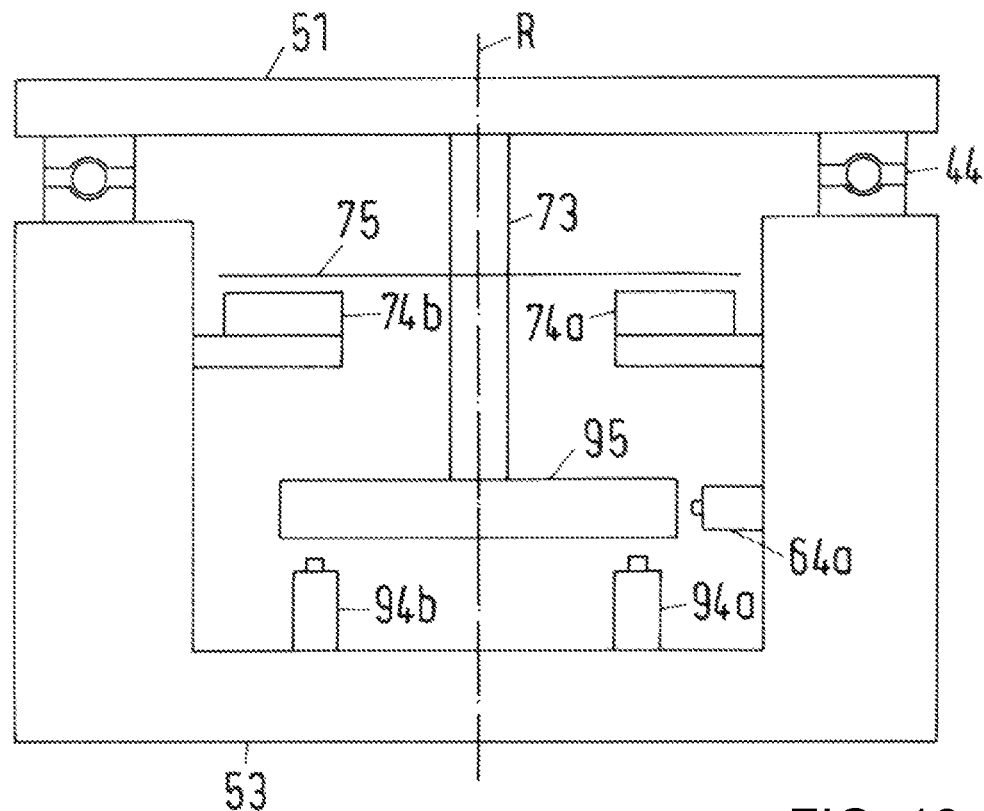

FIG. 18 shows a further combination of two different measurement systems or partial measurement systems. The stator 53, the rotational bearing 44, the rotor 51 together with the downwardly protruding rod-shaped support 73 and the upper partial measurement system with the disk 75 are embodied as in FIG. 17 or as in FIG. 13 and FIG. 14. The lower second partial measurement system, arranged at a different axial position of the rotational axis R, however has a different design than in FIG. 13 and FIG. 17. It has a cylindrical disk 95, on the outer edge of which extending in the circumferential direction a first sensor 64a is aligned for establishing the radial relative position between the cylinder disk 95 and the stator 53. Furthermore, two sensors 94a, 94b aligned in the axial direction, i.e. parallel to the direction of the rotational axis R, to a planar surface of the cylinder disk 95 are connected to the stator 53. These two sensors 94 enable not only the determination of the axial relative position between the cylinder disk 95 and hence, firstly, the rotor 51 and, secondly, the stator 53, but also the determination of the wobble error. This embodiment is advantageous in that only a small number of sensors 74 is required on the upper partial measurement system. However, in order to register the position of the disk 75 in the plane extending perpendicular to the axis R, the information of at least two sensors 74 which do not lie opposite to one another with respect to the rotational axis R is required.

Figure 19:
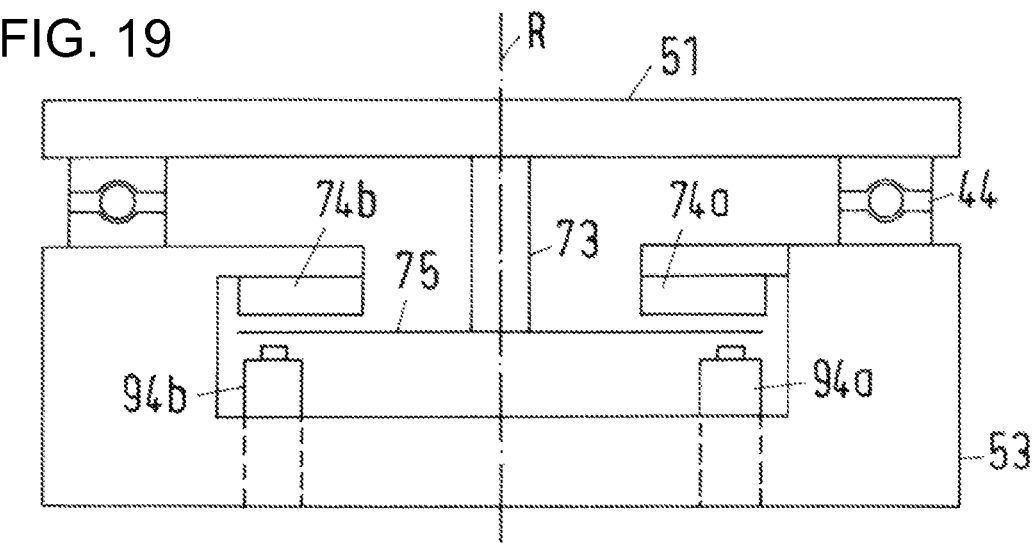

An embodiment with a particularly low installation height, i.e. the extent along the rotational axis R is particularly small, is depicted in FIG. 19. Once again, there is a measurement system with a disk 75 arranged on the rod-shaped support 73 of the rotor 51, which disk carries a multiplicity of markings. However, the assigned sensors 74, which measure the relative position of the disk 75 with respect to two mutually independent radial relative positions, are arranged on the one axial side (namely the top in FIG. 19) of the disk 75. On the opposite axial side of the disk 75, namely the bottom in FIG. 19, two sensors 94a, 94b are arranged in the lower partial measurement system, like in FIG. 18. These sensors 94 are aligned parallel to the rotational axis R. Once again, these two sensors 94 enable the determination of the axial relative position of stator 53 and rotor 51, and also the determination of the axial run-out.

In particular, the sensors 74 can, as described above, also be used to determine the translation movement or the translational position transversely to the direction of the rotational axis R. In this case, the arrangement can also determine the wobble error.

In the case of a variant not depicted in FIG. 19, the sensors 94 can be dispensed with and the rotational angle sensors 74 are moreover configured to measure the axial relative position between the measuring body 75 and the sensors 74. The sensors 74 therefore assume the function of the sensors 94. This variant can have an even lower installation height since e.g. the measuring body 75 can be positioned even closer to the floor of the stator 53. However, they can also have an installation height that is just as low (in the axial direction) if the sensors 94 are situated on the same axial side of the disk 75 as the sensors 74.

Figure 20:
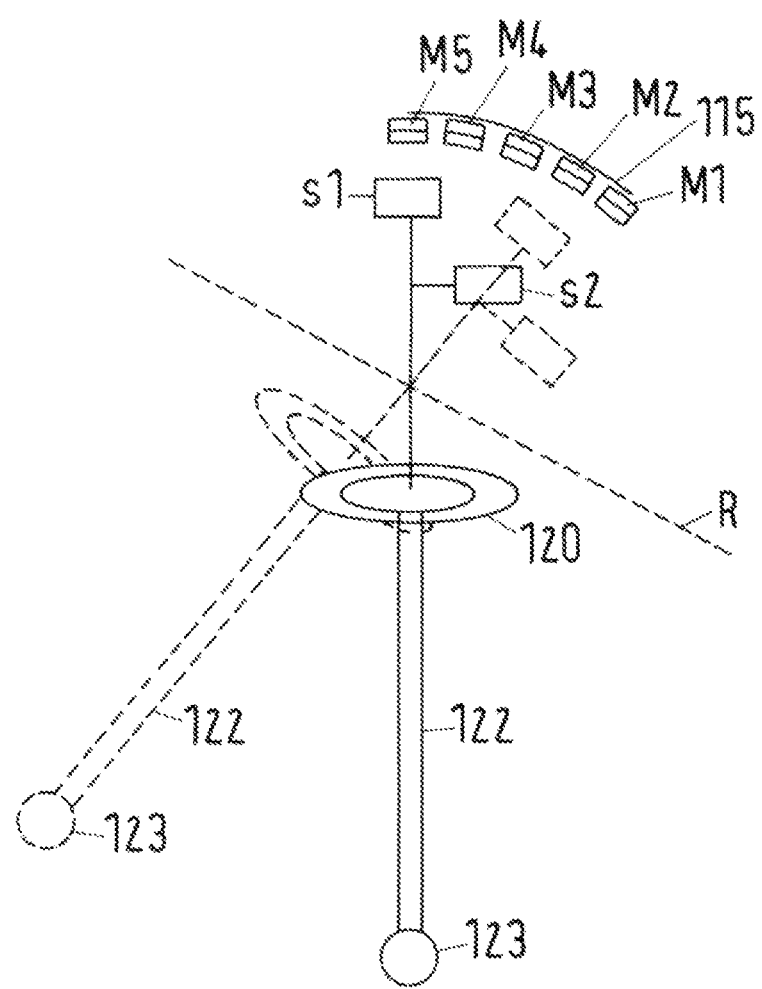
FIG. 20 shows a probe with a movement apparatus for setting the position and/or alignment of the probe, FIG. 21 schematically shows a perspective illustration of a probe arranged on a probe head, which probe can be deflected from a rest position when probing a work piece, wherein the probe head with the probe can be rotated about a rotational axis relative to an arm of a coordinate measuring machine and wherein both the deflection and the rotation of the probe together with the probe head can be measured by the same sensors.

The embodiment schematically depicted in FIG. 20 is configured in accordance with the second aspect of the present invention. Depicted is a stylus 122 for mechanically sensing a work piece, the coordinates of which are to be determined. The stylus 122 has a probing sphere 123 or another probing element at the free end thereof. As indicated by two concentric circles, the stylus 122 is movably mounted (bearing 120), in order to be able to be deflected from its rest position when sensing the work piece. This deflection is measured in a conventional manner and the coordinates of the respective probed point on the surface of the work piece are determined therefrom. To this end, the stylus is combined with a sensor system which is depicted schematically in FIG. 20 by two sensors s1, s2. In the exemplary embodiment, the sensors s1, s2 are rigidly (i.e. without the option of a relevant relative movement) connected to the stylus 122, while the associated measuring bodies are connected rigidly to the holder of the stylus or of the probe head, in particular to an arm of a CMM. Both when deflecting the stylus 122 when probing a work piece and when setting the position and/or alignment of the stylus prior to or during the probing of a work piece, there is a relative movement between the stylus 122 and a support 115 of the measuring bodies, and hence also a relative movement between the sensors and the measuring bodies.

In FIG. 20, a plurality of measuring bodies M1 to M5 are depicted on the support 115 or on the non-movable part. This will be discussed in more detail below. This plurality of measuring bodies M1 to M5 is assigned to merely one of the sensors, namely the sensor s1. Corresponding measuring bodies assigned to the other sensor s2 or optional further sensors are not depicted in FIG. 20 since this is a schematic illustration. However, it is also possible that at least one measuring body is arranged on the stylus and a plurality of sensors is arranged on the non-movable part of the arrangement.

In addition to the mobility due to the bearing 120, the stylus 122 can be rotated about a rotational axis R together with the sensors (or measuring bodies) securely connected thereto. This occurs in particular for the purpose that the stylus 122 is to be aligned differently prior to probing a point on a surface of the work piece. The dashed lines depict a different rotational position of the stylus and of the sensors, into which position the stylus 122 has been brought by rotation about the rotational axis R. It is possible to identify that, with this, the bearing 120 has also rotated. Subsequently, a work piece can be probed in this modified alignment of the stylus 122. However, the position or alignment of the non-movable part 115 of the arrangement with the measuring bodies M1 to M5 attached thereto is not changed by the rotation about the rotational axis R. Other than depicted in FIG. 20, the rotational axis R preferably intersects a fixed point of the bearing 120.

The sensors and the associated measuring bodies of the arrangement are, in accordance with the second aspect of the invention, arranged in such a way that it is possible to establish firstly the change in the alignment of the stylus 122 due to the rotation about the rotational axis R (or the rotational position about the rotational axis R) from the sensor signals, and secondly the deflection of the stylus 122 when sensing or probing a work piece in the respective alignment. An arrangement with a plurality of measuring bodies and a common sensor assigned to the measuring bodies or, conversely, with a plurality of sensors and a common measuring body assigned to the sensors can, however, also occur in other cases, in which merely the relative position of the first and second part of the arrangement is intended to be measured, but no additional mobility of a stylus or another probe.

By way of example, the measuring bodies M1 to M5 can be magnets and the sensor S1 can be a magnetic sensor, e.g. a magneto resistive sensor or a Hall sensor. When carrying out the rotational movement about the rotational axis R, the measurement signal of the sensor s1 can be recorded continuously and/or repeatedly. From this, it is possible to establish the covered rotational angle with respect to the rotational axis R or at least one component of the rotational angle since, when the sensor s1 moves along the various measuring bodies M1 to M5, the measurement signal is changed in a characteristic manner; in particular, the magnetic field at the location of the sensor s1 becomes stronger and weaker in a cyclical manner.

When the stylus 122 is deflected, the sensors s1 in turn moves relative to at least one assigned measuring body, wherein the relative movement of the sensor s1 relative to the measuring body in general proceeds differently than in the case of a rotational movement of the stylus 122 about the rotational axis R. This means that, optionally, even more measuring bodies can be assigned to the respective sensor s1, s2, which are not required when following the movement about the rotational axis R. However, the signals of the various sensors s1, s2 during the deflection of the stylus 122 are used in any case to establish the direction and the path by which the stylus 122 was deflected from its rest position.

In any case, it is an advantage of the depicted arrangement that at least part of the sensor system can be used both for following the movement or determining the rotational position of the stylus with respect to a rotation about the rotational axis R, and also for determining the deflection of the stylus when probing a work piece.

FIG. 20 merely serves for visualizing the principle. Therefore, variations are possible. By way of example, this need not be a stylus, but rather it is possible to provide a different probe for mechanically probing a work piece. In addition, other movement options of the probe may be given, e.g. merely a linear movement option, or the probe can have two or more rotational degrees of freedom of the movement. There can also be an additional linear movement option. This plurality of degrees of freedom of the movement can, in part or wholly, be measurable by the measurement system, at least in portions of the totality of possible relative positions.

Figure 21:
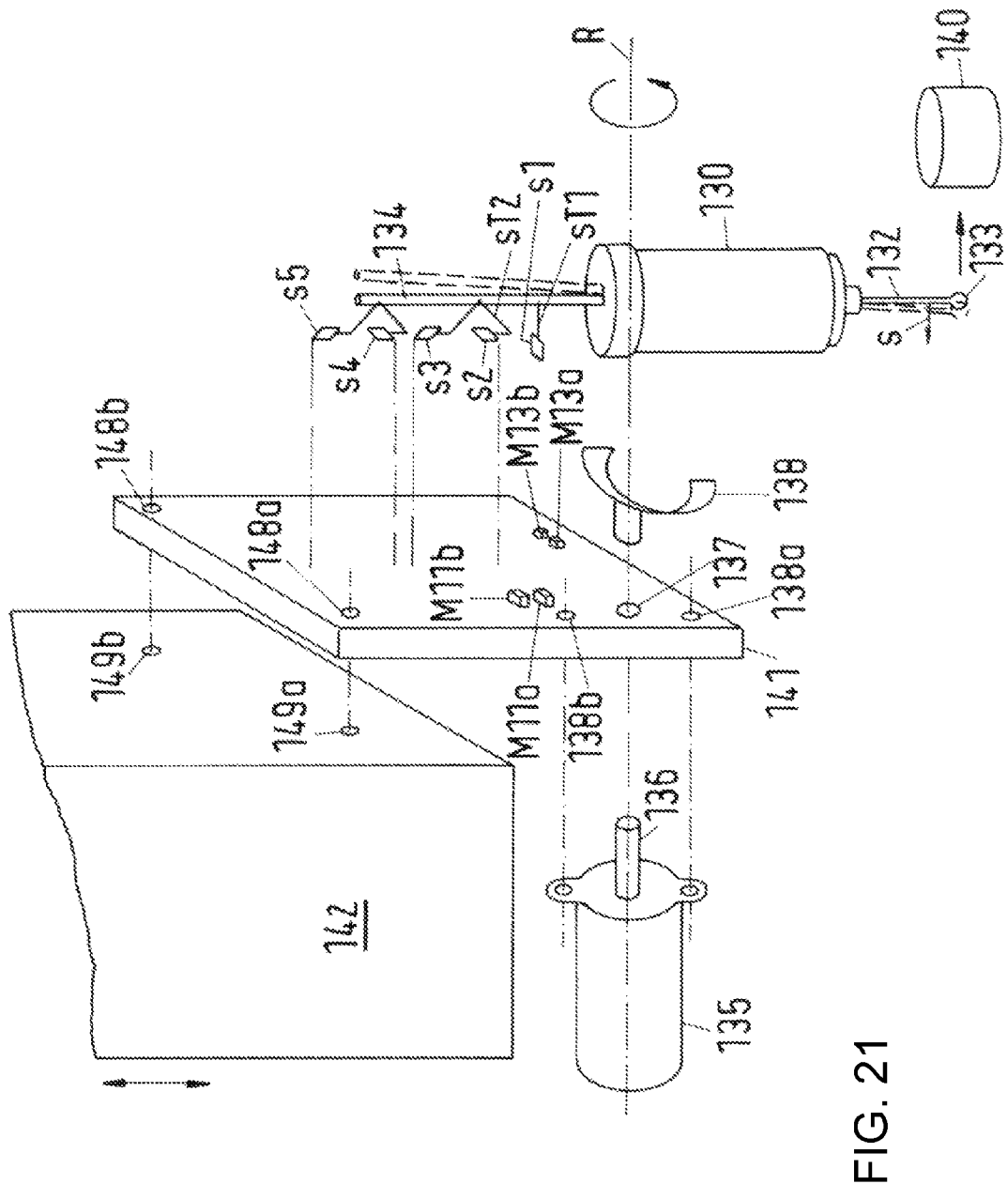

FIG. 21 schematically shows an exploded view of an exemplary embodiment for using a sensor system both for measuring the deflection of a probe when probing a work piece and for determining the position and/or alignment of the probe or of a probe head during and/or after setting the position and/or alignment. In the depicted exemplary embodiment, the probe head (also referred to as measuring head), on which the probe is attached, is rotatable about a rotational axis. In other embodiments, other and/or additional degrees of freedom of the movement may exist for the probe head and hence for the probe; i.e., the probe head can, in particular, be moved in accordance with the degrees of freedom of the movement prior to probing a work piece by the probe. These degrees of freedom relate to movements of the probe head and hence of the probe relative to an arm of a coordinate measuring machine or relative to another part of a coordinate measuring machine on which the probe head is arranged. This arm or part of the CMM can, in turn, be movable with respect to a base of the CMM. By way of example, in the case of a CMM with a portal design or gantry design, the probe head can be attached to a sleeve of the CMM and can be movable relative to the sleeve.

In the exemplary embodiment, which will now be described on the basis of FIGS. 21 to 24, a probe head 130 is connected with rotational mobility to a sleeve 142 (or with another in turn movable part) of a CMM by means of e.g. a support plate 141 (or by means of a different attachment and support element). In particular, the support plate 141 can be affixed to the sleeve 142 by means of passage bores 148*a*, 148*b* in the support plate 141 and by means of bores 149*a*, 149*b* in the sleeve 142 and by means of attachment means (e.g. attachment screws) (not depicted in any more detail). A drive motor 135 for generating a rotational movement of the probe head 130 about a rotational axis R is attached to the support plate 141, for example by means of passage bores 138*a*, 138*b* in the support plate 141 and further attachment means (e.g. screws and nuts) (not described in any more detail). In the illustration of FIG. 21, the rotational axis R extends in the horizontal direction. In particular, this direction can extend parallel to the X-axis of a Cartesian coordinate system or coincide with this coordinate axis. By means of a drive shaft 136 of the drive motor 135, which, in the assembled state of the arrangement (e.g. FIG. 23), extends through a passage bore 137 in the support plate 141, a rotational movement of a holder 138, which holds the probe head 130, is generated when the drive motor 135 is in operation. To this end, the free end region of the drive shaft 136 can be connected in a rotationally secured manner to the holder 138. In the case of a rotational movement of the drive shaft 136 about the rotational axis R, the holder 138 and the probe head 130 held by the holder 138 are therefore rotated about the rotational axis R.

The drive motor 135 can be e.g. a stepper motor, which can be controlled in such a way that the probe head 130 can be brought into specific, predetermined rotational positions with respect to the rotational axis R and relative to the support plate 141. In order to bring the probe head 130 into these predetermined rotational positions, use may however also be made of a different drive. In particular, the rotational movement of the probe head can be performed manually. However, in this case, it is preferable that the respective set rotational position can be secured by appropriate means (e.g. a clamping device) such that it remains in the rotational position, even if external forces act, which forces are transmitted to the rotation mechanism e.g. when probing a work piece 140 by means of the probe 132 attached to the probe head 130.

FIG. 21 shows the probe 132 attached to the bottom of the probe head 130, which probe is configured as a pin-shaped probe with a probing element embodied as a probing sphere 133. However, use can also be made of other probes. In particular, the probe 132 can be attached in a replaceable manner to the probe head 130. If the probe 132 or a different probe is attached to the probe head 130, the probe 132 can be deflected from the neutral position shown in FIG. 21 using full lines, particularly when the work piece 140 is probed. The deflection is indicated by a small arrow pointing to the left, which is labeled with the reference sign s. As a result of the deflection from the neutral position, the probe performs a movement relative to the probe head 130.

Similar to as depicted in the principle sketch of FIG. 20, the probe is connected to at least one sensor and/or one measuring body of a measurement system. In the exemplary embodiment, five sensors s1 to s5 are connected to a rod 134 of the probe head 130, wherein the rod 134 is securely connected to the probe 132 such that, when the probe 132 is deflected, the rod with the sensors is also deflected from a neutral position. The position corresponding to the deflection of the probe 132 is depicted by dashed lines. As a result of the secure connection between rod 134 and probe 132, the position of the rod 134 deflected out of the neutral position is also depicted. However, the sensors s1 to s5 attached to the rod 134 have not been depicted again for the deflected position for reasons of improved recognizability.

The sensors, together with the rod 134 and the probe head 130, are not only moved in the case of a deflection of the probe 132 relative to the support plate 141, but also in the case of a rotational movement of the probe head 130 driven by the drive motor 135 or in any other way.

Figure 22:
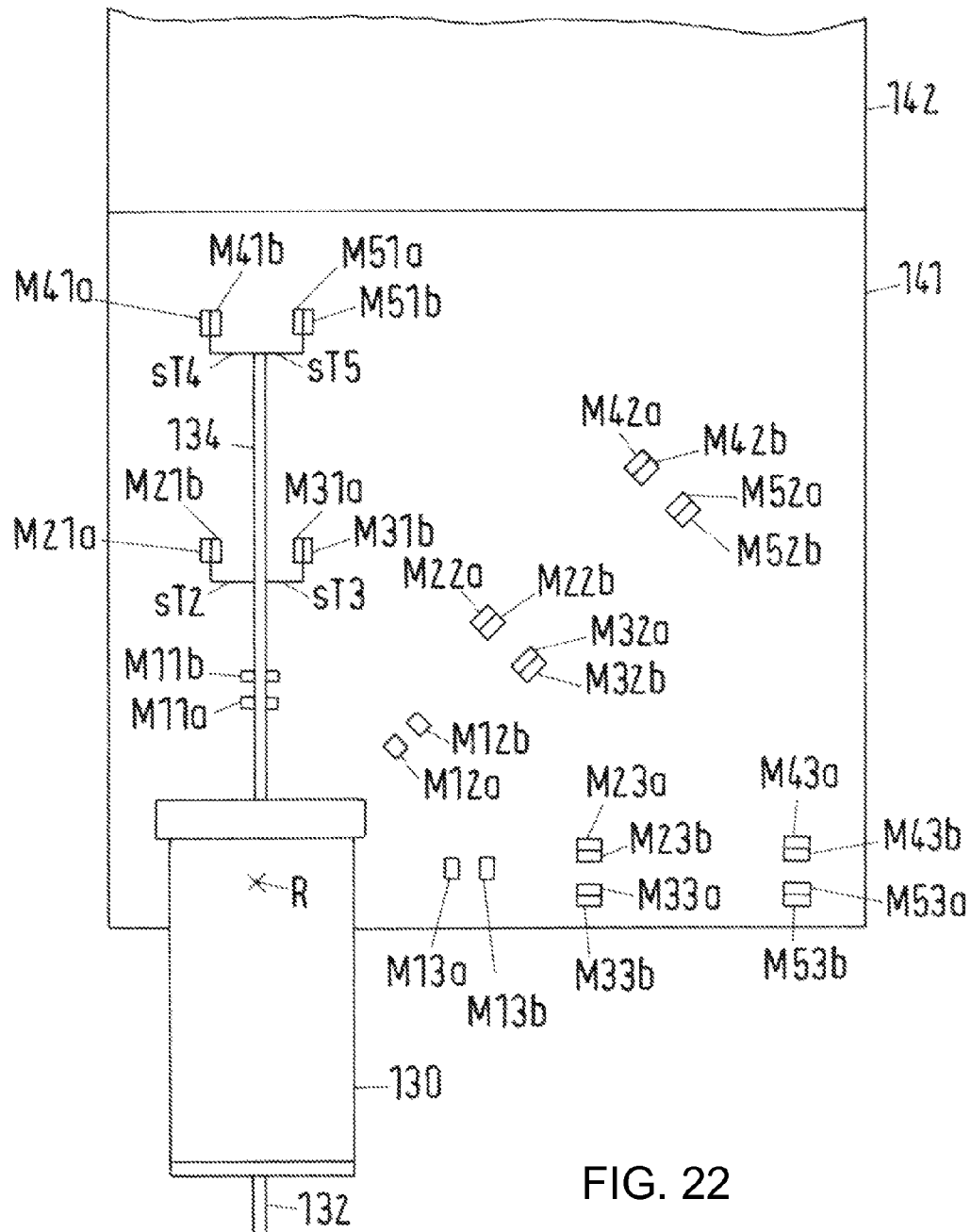
FIG. 22 shows a top view on an attachment plate of the arrangement shown in FIG. 21, wherein the attachment plate has a plurality of pairs of magnets in order to enable the sensors to determine the respective position in respect of a specific degree of freedom of the movement.

As shown in FIG. 22 in particular, but as can also be identified from FIG. 21, two sensors s2, s3; s4, s5 are in each case arranged at the same distance from the rotational axis R or, expressed differently, are arranged at the same axial position in the longitudinal direction of the rod 134. Furthermore, the sensors s1, s2; s3, s4 which are situated at the same axial position are respectively configured to determine the position of a different linear degree of freedom of the movement. As shown, in particular, in the top view of FIG. 24 for the sensors s4, s5, the sensors are arranged offset from one another by 90° with respect to the longitudinal axis of the rod 134. Furthermore, the assigned measuring bodies M of the sensors s4, s5 are also arranged angled by 90° with respect to one another. Here, the sensors s1 to s5 are situated in each of the predetermined rotational positions in accordance with the exemplary embodiment between two magnets of a magnet pair and are configured to measure the magnetic field strength. Here, the magnetic field strength varies along an imaginary connecting line between the magnets of the magnetic field pair and it is therefore possible to determine the position on the imagined connecting line between the two magnets of the magnet pair using the magnetic field strength measured by the sensor. Alternatively, the sensors and magnet pairs can be configured in such a way that the sensor measures a movement transversely to the imagined connecting line of the magnets of the magnetic field pair. It is possible to identify for the two sensors s4 and s5 shown in FIG. 24 that they are each carried by a sensor support sT4, sT5 connected to the rod 134.

In FIGS. 21 to 24, the magnets, which, as measuring bodies, are assigned to the sensors, are respectively denoted by the capital letter M, followed by the number of the sensor (1 to 5) and in turn followed by the number of the predetermined rotational position (1 to 3 in the exemplary embodiment). In the case of three rotational positions and five sensors, fifteen pairs of magnets are therefore provided, as shown in FIG. 22. The position of the rod 134 shown in FIG. 22 is the first predetermined rotational position, which also corresponds to the positions depicted in FIGS. 21, 23 and 24. In the second predetermined rotational position, the longitudinal axis of the rod 134 would extend rotated by 45° about the rotational axis R in the clockwise direction in the top view of FIG. 22. In the third predetermined rotational position, the longitudinal axis of the rod 134 would extend by 90° with respect to the shown position about the rotational axis R in the clockwise direction. Naturally, other variations of this embodiment are possible. By way of example, rotational positions can be predetermined at other inclinations of the longitudinal axis of the rod. In the case of an appropriate arrangement or embodiment of the support plate or of a different support unit for carrying the measuring bodies, there could also be a distribution of the predetermined rotational positions over an angular range that is greater than 90°. It is also possible that measuring bodies and sensors are interchanged for at least some of the measuring body/sensor combinations. By way of example, the sensors could be attached to the support plate 141 and the measuring bodies (e.g. the magnet pairs) could be attached to the support rod 134.

In the exemplary embodiment of FIG. 21 to FIG. 24, the sensor s1 is configured to measure the exact position of the rod 134, and hence of the probe 132, in the direction of the longitudinal axis of the rod in the predetermined rotational positions. As can be gathered from FIG. 24 in particular, the fourth sensor s4 is able, in the predetermined rotational positions, to measure the exact position of the rod 134 in a direction extending in a plane, which intersects the longitudinal axis of the rod 134. The sensor s5 is able, in the predetermined rotational positions, to measure the exact position with respect to a movement direction, which likewise extends in the plane, which intersects the longitudinal axis of the rod 134. Here, the plane, in particular, extends perpendicular to the longitudinal axis of the rod if small deviations from this ideal profile of the plane due to manufacturing tolerances and inexact reproduction of the predetermined rotational position are ignored. Such deviations can be taken into account, e.g. corrected, by calibration. However, precisely these deviations can be determined due to the measurement system with the measuring bodies M and the sensors s1 to s5. In accordance with the arrangement of the sensors s4, s5 shown in FIG. 24, the sensors s2, s3 are able to determine the exact position of the rod 134 in respect of two further directions extending parallel to the directions with respect to which the sensors s4, s5 determine the exact position of the rod. Here, the measuring directions of the sensors s2, s3 are situated in a common plane, which intersects the longitudinal axis of the rod 134 at a different axial position of the rod and which extends parallel to the plane of the measuring directions of the sensors s4, s5.

Overall, the sensors s1 to s5 are therefore able to determine the exact position of the rod 134 and hence of the probe 132 in respect of five degrees of freedom of the movement. In the case of an appropriate embodiment of the arrangement and by calibration, it is possible to ignore the remaining sixth degree of freedom of the movement (of the probe 132 with respect to the sleeve 142) or the latter does not change during operation of the coordinate measuring machine. Hence, the same sensors (or alternatively, the same measuring bodies if the measuring bodies were to be attached to the rod 134) can determine the exact position of the probe and hence, in particular, of the center of the probing sphere 133 of the probe relative to the sleeve or relative to another reference point, in any case with respect to specific predetermined rotational positions of the probe head.

Figure 23:
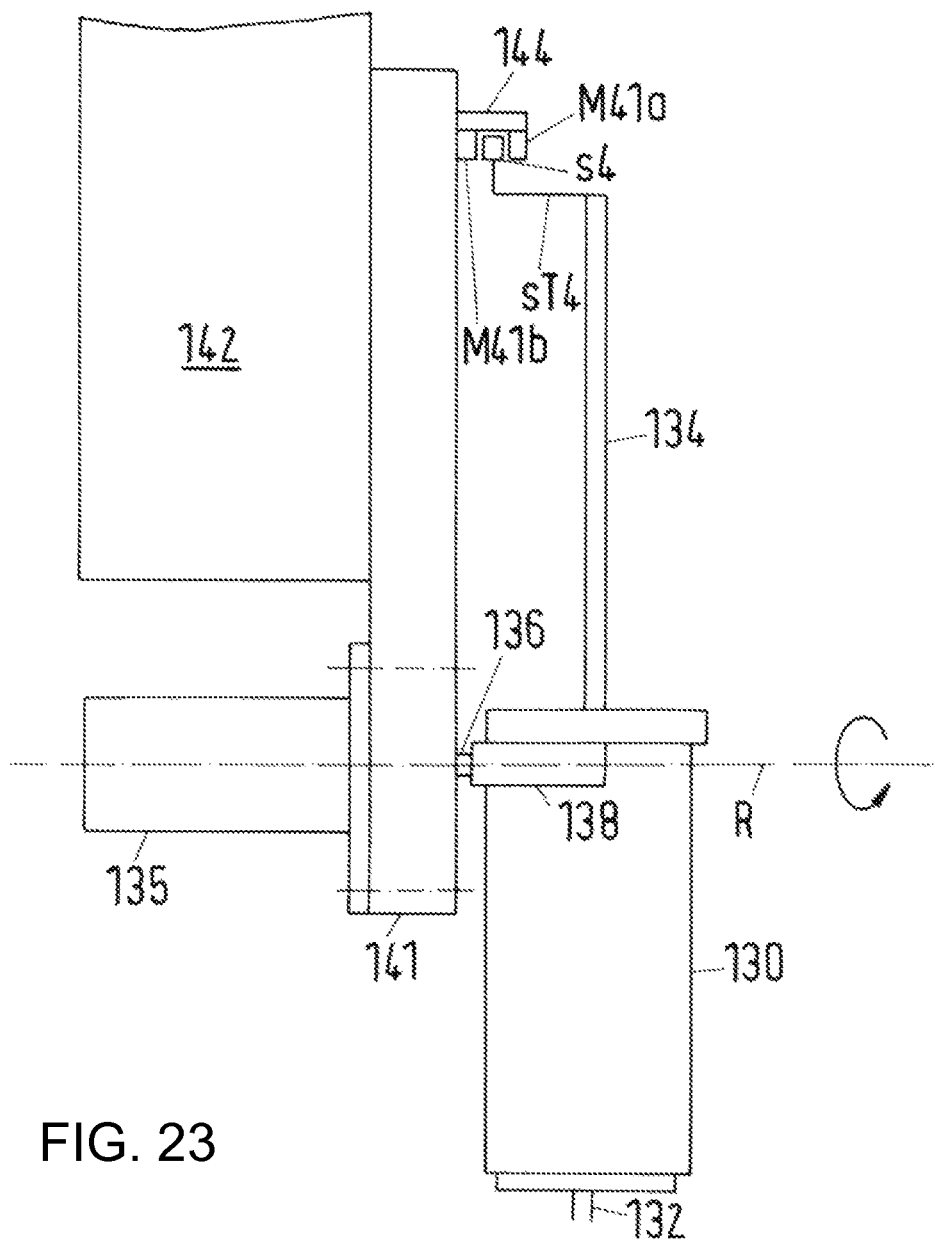
FIG. 23 shows a side view of the arrangement as per FIG. 21 in the assembled state.
Figure 24:
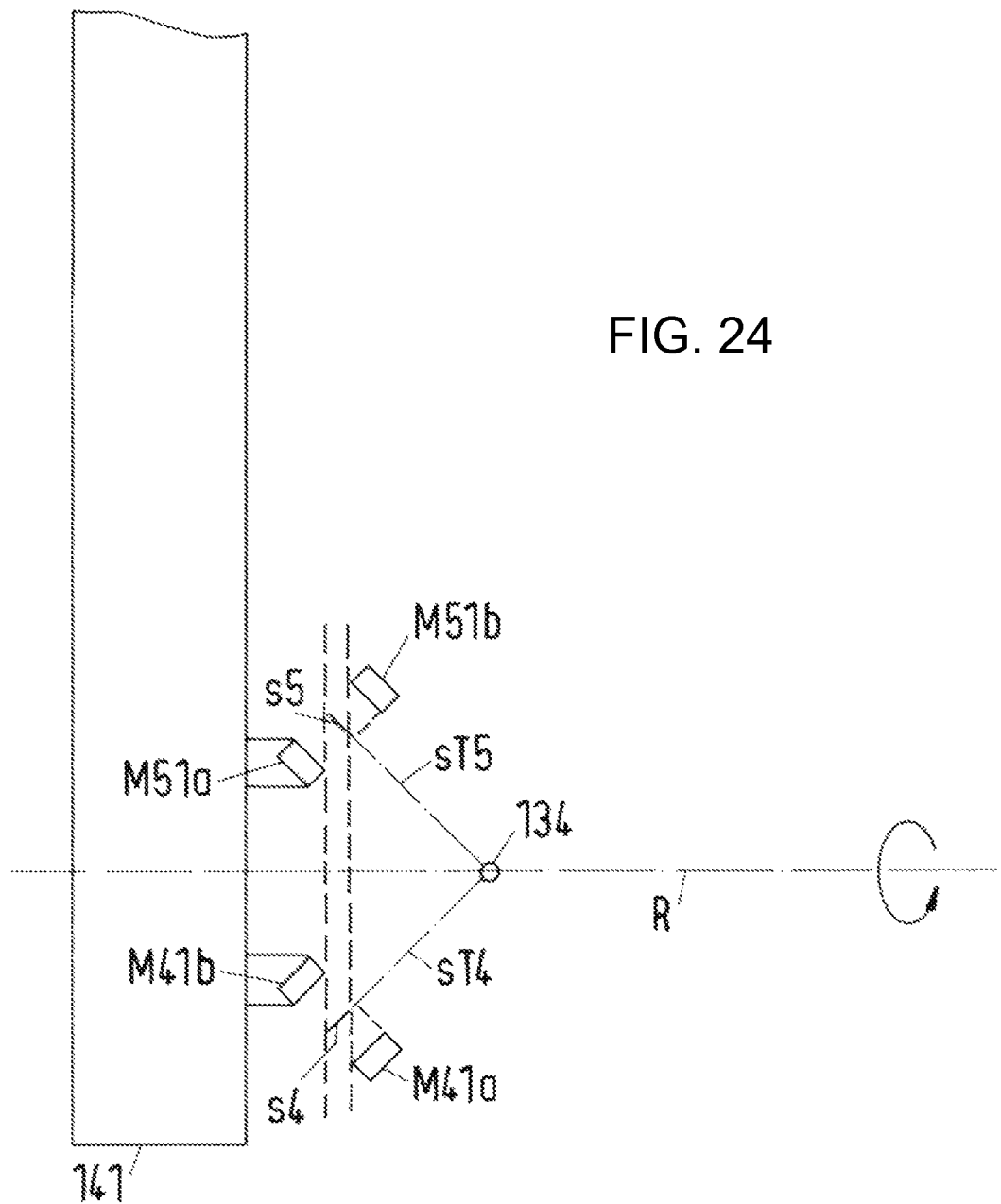
FIG. 24 shows a top view on part of the attachment plate of the arrangement as per FIG. 21 to FIG. 23, wherein it is possible to identify two pairs of magnets which are each assigned to one sensor of the probe head.

In the side view of FIG. 23, merely one of the sensors, namely sensor s4, can be identified in order to keep the depiction simple. The probe head 130 with the probe 134 is situated in the first predetermined rotational position, which is also shown in FIG. 22. Therefore, the sensor s4 is arranged between the magnets M4a and M4b. It is also possible to identify from the side view that the distance between the magnets M41 allows a rotational movement about the rotational axis R into another predetermined rotational position. To this end, FIG. 24 shows two dashed lines extending from top to bottom in the plane of the figure, which dashed lines mark the edges of the region in which a sensor can be moved between the magnet pairs M41, M51. Furthermore, the distance between the magnet pairs is selected to be so large that the sensors s1 to s5 do not impact on one of the magnets when the probe 132 is deflected (as shown in FIG. 21).

Figure 25:
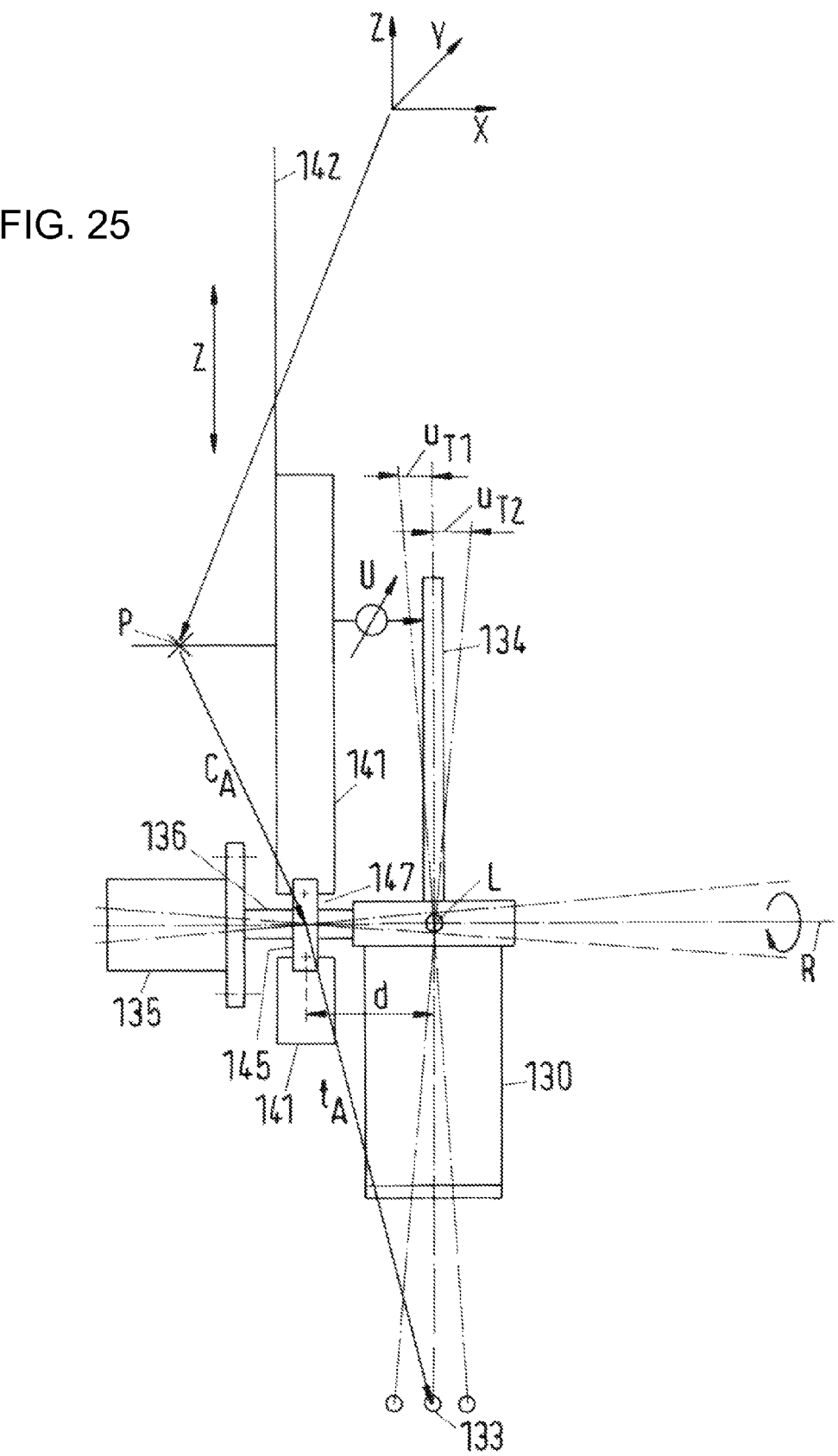
FIG. 25 shows a side view of an arrangement similar to the one in FIG. 23, wherein the measurement of the relative position of the mobile part of the probe head and of the attachment plate is depicted for a single or a selected degree of freedom of the movement, wherein this degree of freedom of the movement is relevant, particularly in the case of a wobble movement about the rotational axis.
Figure 26:
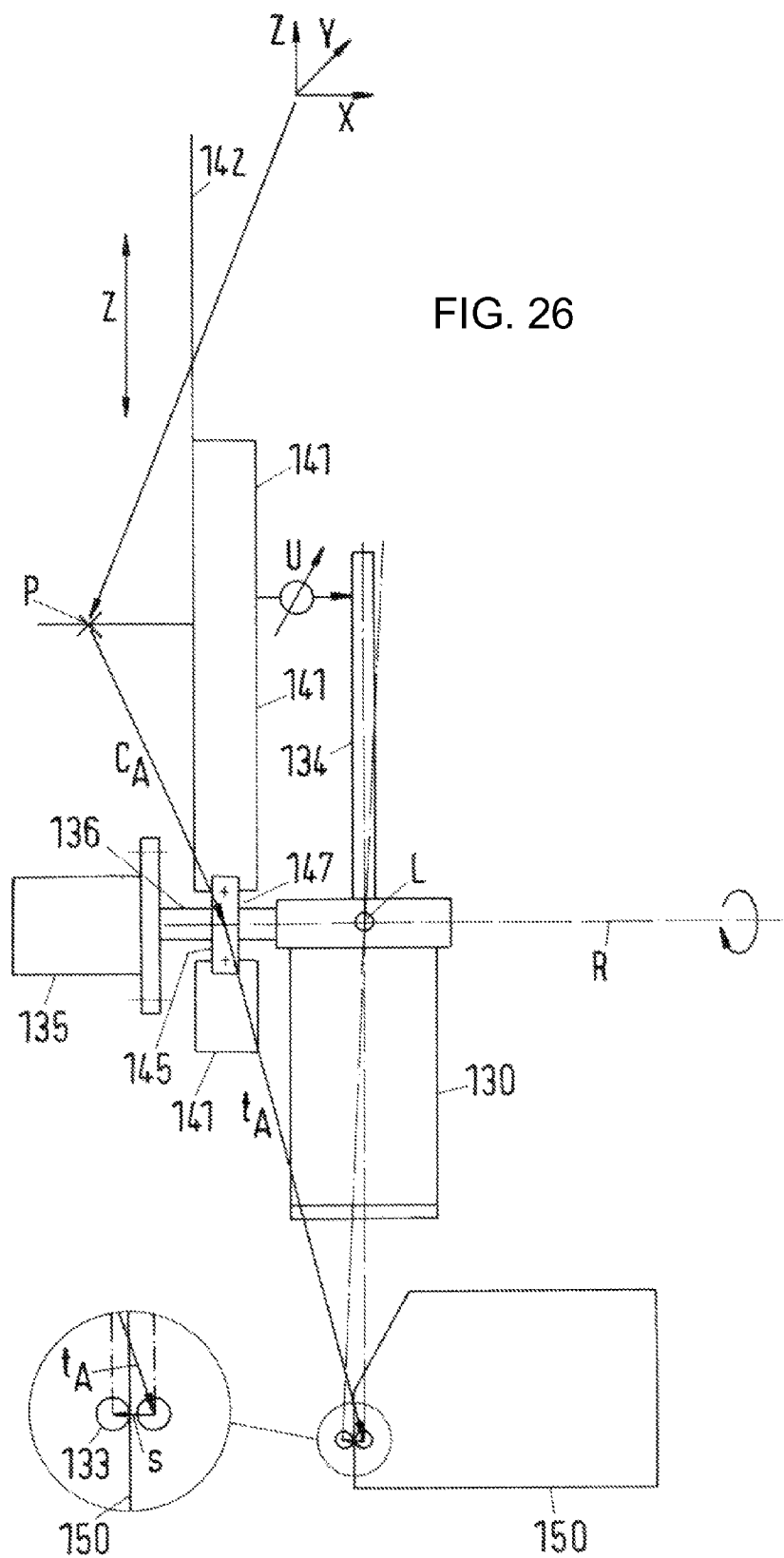
FIG. 26 shows a depiction of the arrangement as per FIG. 25, likewise in a side view, wherein a deflection of the probe due to probing of a work piece is depicted.

FIG. 25 and FIG. 26 show a variant of the exemplary embodiment depicted in FIG. 21 to FIG. 24. The same reference signs denote the same or functionally equivalent elements. The exemplary embodiments have the following differences: in one passage opening 147 of the support plate 141, there is a bearing 145 which enables a rotational movement of the drive shaft 136 of the drive motor 135, i.e. the drive shaft 136 is mounted with rotational mobility. Here, the bearing 145 is configured in such a way that axial run-out and the radial run-out are negligibly small. By way of example, antifriction bearings (e.g. ball bearings or bearings containing cylindrical or spherical bearing elements) can be manufactured and dimensioned in such a way that the radial run-out and the axial run-out are negligibly small compared to the wobble error. The measurement arrangement shown in FIG. 25 and FIG. 26 therefore serves to determine the wobble error. To this end, it is merely necessary to measure the distance of the rod 134 (or of a different part of the probe head 130) from the support plate 141 or from a different part securely connected to the sleeve 142. Here, this distance measurement in a direction extending approximately parallel to the rotational axis should be performed with the greatest possible distance from the rotational axis R. In FIG. 25 and FIG. 26, a circle with an inclined arrow and a further arrow extending in the distance measurement direction indicate schematically that provision is made for a corresponding distance sensor. By way of example, the distance sensor can be a capacitive sensor. However, other sensor types or measurement systems can also be used.

If a wobble movement now occurs during a rotational movement of the probe head 130 (as indicated by dash-dotted lines extending obliquely to the rotational axis R and crossing at a fixed point of the bearing 145), there is a change in the distance between the rod 134 and the support plate 141. Corresponding distances, which can occur in the case of the indicated wobble movement, are denoted by $U_{T1}$ and $U_{T2}$. In the case of the wobble movement, there is also a change in the position of the probing sphere 133 of the stylus in a direction parallel to the rotational axis R. FIG. 26 shows that a movement of the probing sphere 133 in the same direction parallel to the rotational axis R can also occur when probing a work piece 150. In a circular, magnified region, it is possible to identify that the probing sphere 133 is no longer in the neutral position due to the presence of the work piece 150, but rather has been deflected by the magnitude s. This deflection can in turn be measured by the distance measurement between the rod 134 and the support plate 141.

FIG. 25 and FIG. 26 moreover show that a reference point P can be selected e.g. at the lower end of the sleeve 142. It is indicated that a Cartesian coordinate system X, Y, Z can be defined for this point P, wherein the X-axis extends parallel to the rotational axis R and wherein the longitudinal axis of the rod 134 extends parallel to the Z-axis. The probe and the rod 134 of the probe head 130 connected thereto are rotatably mounted at a position L, at which the longitudinal axis of the rod 134 intersects the rotational axis R, in order to enable the deflection of the probe when probing the work piece 150. An axis extending perpendicular to the plane of the figure running through this position L extends parallel to the Y-direction of the Cartesian coordinate system at the point P. The following will now discuss how the measured distance between the support plate 141 and the rod 134 is used to calculate the position of the probe and, in particular, the center of the probing sphere 133 of the probe. In the process, use is made of a vector $c_A$, which leads from the reference point P to the center of the rotational bearing 145, and a vector $t_A$, which leads from the center of the rotational bearing 145 to the center of the probing sphere 133. The following depiction of the correction using the distance value u is however more general and also applies to other specific embodiments than the ones depicted in FIG. 25 and FIG. 26. The correction makes the following assumptions:

The rotational axis has negligibly small axial and radial run-outs.

The rotational axis leads to significant wobble errors, which are to be corrected.

After a rotational movement, the rotational axis can be fixed in its rotational position, e.g. clamped, or has a self-locking property due to its design (e.g. as a result of the drive motor).

As mentioned, the first two assumptions can be satisfied using commercially available precision antifriction bearings, which bear the rotational movement. Furthermore, the assumption is made that the rotational axis intersects the probe head at the point about which the stylus is mounted in a rotatable manner (bearing point L in FIG. 25 and FIG. 26). This bearing at the point L can, for example, be achieved by a spring parallelogram, as is the case in probe heads known per se.

The following illustration of the correction, like in the exemplary embodiment in FIG. 25 and FIG. 26, only relates to one degree of freedom of the movement, which corresponds to the distance or to the position in a direction parallel to the rotational axis R and, under the made assumptions, renders it possible to determine the wobble error. Taking into consideration the Cartesian coordinate system at the reference point P, indicated in FIG. 25 and FIG. 26, the measurement system supplies a measured value in relation to the X-axis.

When probing a work piece (like the depicted probing of the work piece 150 in the exemplary embodiment in accordance with FIG. 26), the measured value u changes from when the work piece is touched by the probing element of the probe, to be precise continuously with increasing deflection of the probe from the neutral position thereof. It is known that a calibration for different deflections of the probe from the neutral position thereof renders it possible to establish a transmission function or a transmission matrix, which, when probing a work piece to be measured, renders it possible to calculate the coordinates of the probed point on the work piece surface from the measured value u. In the following text, the transmission function is denoted by $f_K(u)$. In the general case, not depicted here, it is possible that there are not only positions or measured values u in the X-direction, but that there are correspondingly also positions in the Y-direction and/or Z-direction of the Cartesian coordinate system of the reference point P, and it is also possible to establish a transmission function or transmission matrix for this case by calibration. In a manner known per se, this function in particular contains a correction due to the deformation of the probe head and of the components thereof, occurring when probing the work piece.

In the following text, further consideration is given to the fact that the probe head is movable relative to the reference point P and, particularly in the exemplary embodiment of FIG. 25 and FIG. 26, has rotational mobility about the rotational axis R. The calibration must therefore result in appropriate corrections for all admissible rotational positions of the probe head relative to the reference point (in particular of the sleeve). Therefore, a complete correction function for the position of the probing element of the probe is sought after:

$$p = P + t + f_K(u)$$

Here, P is the spatial vector of the reference point, which can be set to equal zero if the reference point lies at the origin of the observed coordinate system, t denotes the vector leading from the reference point P to the probing element, in particular to the center of the probing sphere 133, and $f_K(u)$ is the aforementioned transmission function or transmission matrix.

In the simplified case for the assumptions made above, a first measurement signal $u_{T1}$ (as e.g. depicted in FIG. 25) emerges after a first rotational movement of the probe head about the rotational axis R. This measurement signal or the corresponding measured value, which is related to the X-axis, can be considered to be the neutral position of the calibration. In a manner known per se, it is now possible to establish the parameters for the correction function and, at the same time, the vector t without further rotational movement of the probe head. In order also to obtain a transmission function $f_K$ for other rotational positions of the probe head, it is possible, in the further admissible rotational positions of the probe head, to use in each case the difference between the measured value u measured there and the corresponding measured value $u_{T1}$ in the neutral position. By repeating the calibration for the further admissible rotational positions and by using the aforementioned difference between the measured value u and the measured value $u_{T1}$ in the neutral position, a further parameter of the calibration is available, which, under the assumptions made above, corresponds to the wobble error of the rotational device. In this case, it is also not mandatory to perform an independent calibration, e.g. by sensing a reference object, for each possible rotational position at which a work piece is subsequently intended to be sensed by the probe. If such a calibration is performed at a sufficient number of rotational positions, calibration values for other rotational positions can be obtained e.g. by interpolation.

Expediently, the vector t can be related to the wobble point, i.e. to the point on the rotational axis R which does not change due to a wobble movement. In the case of FIG. 25 and FIG. 26, this is the center of the rotational bearing 145. In the equation specified above for the correction function p, the vector t can therefore be replaced by the sum of the vectors $c_A + t_A$. Hence, the extended equation for the transmission function or correction function p emerges:

$$p = P + c_A + t_A + f_K(u - u_{T1})$$

The equation initially applies to merely a single rotational position. After a rotational movement into another rotational position of the probe head, there is in general a different measured value u due to the wobble movement and hence a different neutral position $U_{T2}$ for the deflection of the probe when probing a work piece. It is now possible to once again carry out a calibration process, i.e. the correction function $f_K$ can be established for the modified neutral position.

As described in the following, the wobble error can be taken into account by its own associated correction component in the correction function. Under the assumption that the wobble error only leads to small angles of the longitudinal axis of the rod 134 with respect to the perpendicular to the rotational axis R, the rotational angle $r_y$ of the rotational movement of the longitudinal axis of the rod 134 due to the wobble movement can be calculated to a good approximation. The rotational angle $r_y$ emerges from the equation $$\tan r_y = (u - u_T)/d$$

Here, $u - u_T$ is the difference between the measured value and the measured value for the neutral position. The wobble angle $r_y$ can be used to determine a corresponding rotation matrix in equation (5) specified above. Here, d denotes the distance between the wobble point and the bearing point L (see FIG. 25). The rotation matrix was labeled $D_A$ above. Overall, the following correction function p therefore emerges:

$$p = P + c_A + D_A(t_A + f_K(u - u_{T1}))$$

In other words, the rotation matrix $D_A$ for correcting the wobble error acts on the sum of the vector $t_A$ and of the calibration function $f_K$ in respect of a difference between the respective measurement signal or measured value and the measured value from the neutral position in the first rotational position. In the case of relatively large wobble errors which lead to it no longer being possible to consider the wobble angle $r_y$ as being small, it is additionally possible to take account of the corresponding displacement of the bearing point L in the equation.

A measurement system was described on the basis of FIGS. 21 to 24, which can in each case determine the exact position of the sensor support (the rod 134 in the exemplary embodiment) for discrete predetermined rotational positions. This concept can be transferred to other applications. By way of example, the sensors and/or measuring bodies need not be used both for exactly determining the support or the parts connected thereto and for determining a deflection of a probe when probing a work piece. By way of example, this principle can also be used in the other embodiments of a rotational device already mentioned above or in the aforementioned other uses of a rotational device. By way of example, a holder or support, which is rotatable due to a rotational device, of a work piece (e.g. a rotary table) can have discrete, predetermined rotational positions and the exact rotational position, which can vary e.g. due to the load of the rotational device as a result of the work piece or which can vary due to other influences, can be measured and corrected with the aid of the measurement system.

The invention claimed is:

1. A configuration, comprising:
a rotational device for measuring coordinates of a workpiece via a coordinate measuring machine and/or for machining the workpiece, said rotational device containing a first part and a second part having rotational mobility about a rotational axis relative to said first part, one of said first part or said second part configured either to hold the workpiece or to hold a probe for sensing the workpiece, a probe head of the coordinate measuring machine, a coordinate measuring apparatus of the coordinate measuring machine, or a machine tool for machining the workpiece;
a plurality of sensors;
a measuring body assigned to each of said sensors and being defined as an assigned measuring body, wherein what applies to each of said sensors and to said assigned measuring body is that said assigned measuring body is disposed on one of said first part or said second part and said sensors are disposed on the other of said first part or said second part, each of said sensors generating a measurement signal corresponding to a position of said assigned measuring body and hence corresponding to a relative position of said first part and said second part;
an evaluation apparatus, said plurality of sensors disposed in such a way and said evaluation apparatus being configured in such a way that said evaluation apparatus determining deviations from an ideal rotational movement of said first part and of said second part relative to one another about the rotational axis from measured values of said plurality of sensors when said rotational device is in operation, namely when the workpiece or the probe, the probe head, the coordinate measuring apparatus or the machine tool is rotated by said rotational device about the rotational axis, to be precise determining the deviations in respect of at least two different degrees of freedom of movement, namely two rotational degrees of freedom about mutually perpendicular directions, which each extend perpendicular to the rotational axis;
the configuration being configured to correct the deviations when said rotational device is in operation; and
said measuring body is configured as an additional material region of said first part or said second part not required for a rotational function of said rotational device and/or at least one of said sensors is disposed on said additional material region of said second part or said first part not required for the rotational function of said rotational device.

2. The configuration according to claim 1, wherein said plurality of sensors are disposed in such a way and said evaluation apparatus is configured so that said evaluation apparatus determines deviations from the ideal rotational movement of said first part and of said second part relative to one another about the rotational axis from the measured values of said plurality of sensors when said rotational device is in operation, to be precise in respect of at least four degrees of freedom of the movement, namely the two rotational degrees of freedom and two linear degrees of freedom in the mutually perpendicular directions, which each extend perpendicular to the rotational axis.

3. The configuration according to claim 1, wherein said additional material region of said first part or of said second part is an elongate material region, which extends in a direction of the rotational axis.

4. The configuration according to claim 1, wherein said measuring body includes a first measuring body, which is disposed at a first axial position, and a second measuring body disposed on said first part or said second part, at a second axial position which is at a distance from the first axial position, wherein at least one of said sensors is configured to generate the measurement signal corresponding to the position and alignment of said second measuring body and hence corresponding to the relative position and alignment of said first part and said second part.

5. The configuration according to claim 1, wherein at least one relative position is predetermined for said first part and said second part, the relative position is to be set when the configuration is in operation, and wherein said evaluation apparatus is configured to determine, using the measurement signals of said sensors, in which the relative position of said first part and of said second part are in actual fact situated when the predetermined relative position was set.

6. A configuration, comprising:
a rotational device for measuring coordinates of a workpiece via a coordinate measuring machine and/or for machining the workpiece, said rotational device containing a first part and a second part having rotational mobility about a rotational axis relative to said first part, one of said first part or said second part configured either to hold the workpiece or to hold a probe for sensing the workpiece, a probe head of the coordinate measuring machine, a coordinate measuring apparatus of the coordinate measuring machine, or a machine tool for machining the workpiece;
a plurality of sensors;
a measuring body assigned to each of said sensors and being defined as an assigned measuring body, wherein what applies to each of said sensors and to said assigned measuring body is that said assigned measuring body is disposed on one of said first part or said second part and said sensors are disposed on the other of said first part or said second part, each of said sensors generating a measurement signal corresponding to a position of said assigned measuring body and hence corresponding to a relative position of said first part and said second part;
an evaluation apparatus, said plurality of sensors disposed in such a way and said evaluation apparatus being configured in such a way that said evaluation apparatus determining deviations from an ideal rotational movement of said first part and of said second part relative to one another about the rotational axis from measured values of said plurality of sensors when said rotational device is in operation, namely when the workpiece or the probe, the probe head, the coordinate measuring apparatus or the machine tool is rotated by said rotational device about the rotational axis, to be precise determining the deviations in respect of at least two different degrees of freedom of movement, namely two rotational degrees of freedom about mutually perpendicular directions, which each extend perpendicular to the rotational axis;
the configuration being configured to correct the deviations when said rotational device is in operation; and
said measuring body is one of at least two measuring bodies including a first measuring body and a second measuring body disposed at a distance from one another in an axial direction of the rotational axis, wherein four of said sensors are configured for determining a radial relative position of said first part relative to said second part and wherein two of said four sensors are assigned to said first measuring body and two of said four sensors are assigned to said second measuring body.

7. The configuration according to claim 6, wherein said first and second measuring bodies are formed as a common elongate element, a longitudinal axis of said common elongate element extends in the direction of the rotational axis, parallel to the rotational axis or skew with respect to the rotational axis.

8. The configuration according to claim 7, wherein said common elongate element is disposed on said first part and extends along the longitudinal axis thereof into a receptacle space of said second part.

9. A configuration, comprising:
a rotational device for measuring coordinates of a workpiece via a coordinate measuring machine and/or for machining the workpiece, said rotational device containing a first part and a second part having rotational mobility about a rotational axis relative to said first part, one of said first part or said second part configured either to hold the workpiece or to hold a probe for sensing the workpiece, a probe head of the coordinate measuring machine, a coordinate measuring apparatus of the coordinate measuring machine, or a machine tool for machining the workpiece;
a plurality of sensors;
a measuring body assigned to each of said sensors and being defined as an assigned measuring body, wherein what applies to each of said sensors and to said assigned measuring body is that said assigned measuring body is disposed on one of said first part or said second part and said sensors are disposed on the other of said first part or said second part, each of said sensors generating a measurement signal corresponding to a position of said assigned measuring body and hence corresponding to a relative position of said first part and said second part;
an evaluation apparatus, said plurality of sensors disposed in such a way and said evaluation apparatus being configured in such a way that said evaluation apparatus determining deviations from an ideal rotational movement of said first part and of said second part relative to one another about the rotational axis from measured values of said plurality of sensors when said rotational device is in operation, namely when the workpiece or the probe, the probe head, the coordinate measuring apparatus or the machine tool is rotated by said rotational device about the rotational axis, to be precise determining the deviations in respect of at least two different degrees of freedom of movement, namely two rotational degrees of freedom about mutually perpendicular directions, which each extend perpendicular to the rotational axis;
the configuration being configured to correct the deviations when said rotational device is in operation; and
said measuring body is a common measuring body, wherein two of said sensors are configured for determining an axial relative position of said first part relative to said second part and said common measuring body assigned to said two sensors for determining the axial relative position.

10. The configuration according to claim 9, wherein one of said sensors establishes a radial relative position of said first part relative to said second part and is aligned with an outer edge, extending in a circumferential direction, of said common measuring body.

11. A configuration, comprising:
a rotational device for measuring coordinates of a workpiece via a coordinate measuring machine and/or for machining the workpiece, said rotational device containing a first part and a second part having rotational mobility about a rotational axis relative to said first part, one of said first part or said second part configured either to hold the workpiece or to hold a probe for sensing the workpiece, a probe head of the coordinate measuring machine, a coordinate measuring apparatus of the coordinate measuring machine, or a machine tool for machining the workpiece;
a plurality of sensors;
a measuring body assigned to each of said sensors and being defined as an assigned measuring body, wherein what applies to each of said sensors and to said assigned measuring body is that said assigned measuring body is disposed on one of said first part or said second part and said sensors are disposed on the other of said first part or said second part, each of said sensors generating a measurement signal corresponding to a position of said assigned measuring body and hence corresponding to a relative position of said first part and said second part;

an evaluation apparatus, said plurality of sensors disposed in such a way and said evaluation apparatus being configured in such a way that said evaluation apparatus determining deviations from an ideal rotational movement of said first part and of said second part relative to one another about the rotational axis from measured values of said plurality of sensors when said rotational device is in operation, namely when the workpiece or the probe, the probe head, the coordinate measuring apparatus or the machine tool is rotated by said rotational device about the rotational axis, to be precise determining the deviations in respect of at least two different degrees of freedom of movement, namely two rotational degrees of freedom about mutually perpendicular directions, which each extend perpendicular to the rotational axis;

the configuration being configured to correct the deviations when said rotational device is in operation;

a magnet attached to said second part;

said second part having an element made of a magnetizable material such that an annular gap extending about the rotational axis remains between a region of said element and said magnet; and at least one of said sensors for measuring a radial relative position of said first part and of said second part is disposed in said annular gap.

12. A configuration, comprising:

a rotational device for measuring coordinates of a workpiece via a coordinate measuring machine and/or for machining the workpiece, said rotational device containing a first part and a second part having rotational mobility about a rotational axis relative to said first part, one of said first part or said second part configured either to hold the workpiece or to hold a probe for sensing the workpiece, a probe head of the coordinate measuring machine, a coordinate measuring apparatus of the coordinate measuring machine, or a machine tool for machining the workpiece;

a plurality of sensors;

a measuring body assigned to each of said sensors and being defined as an assigned measuring body, wherein what applies to each of said sensors and to said assigned measuring body is that said assigned measuring body is disposed on one of said first part or said second part and said sensors are disposed on the other of said first part or said second part, each of said sensors generating a measurement signal corresponding to a position of said assigned measuring body and hence corresponding to a relative position of said first part and said second part;

an evaluation apparatus, said plurality of sensors disposed in such a way and said evaluation apparatus being configured in such a way that said evaluation apparatus determining deviations from an ideal rotational movement of said first part and of said second part relative to one another about the rotational axis from measured values of said plurality of sensors when said rotational device is in operation, namely when the workpiece or the probe, the probe head, the coordinate measuring apparatus or the machine tool is rotated by said rotational device about the rotational axis, to be precise determining the deviations in respect of at least two different degrees of freedom of movement, namely two rotational degrees of freedom about mutually perpendicular directions, which each extend perpendicular to the rotational axis;

the configuration being configured to correct the deviations when said rotational device is in operation; and said measuring body is assigned to a plurality of said sensors and functions as a common measuring body.

13. A method for producing a configuration having a rotational device for measuring coordinates of a workpiece by a coordinate measuring machine, which comprises the steps of:

providing a first part of the rotational device and a second part of the rotational device and the first part and the second part configured to have rotational mobility relative to one another;

providing a plurality of sensors;

assigning a measuring body to each of the sensors being an assigned measuring body, in respect of each of the sensors, the assigned measuring body being disposed on the first part or the second part and the sensors are disposed on the other of the second part or the first part, such that each of the sensors is configured to generate a measurement signal corresponding to a position and alignment of the assigned measuring body and therefore corresponding to a relative position and alignment of the first part and the second part when the configuration is in operation, wherein the measuring body is assigned to a plurality of the sensors as a common measuring body;

providing an evaluation device, and disposing the plurality of sensors in such a way and the evaluation apparatus is configured in such a way that the evaluation apparatus determining deviations from an ideal rotational movement of the first part and of the second part relative to one another about a rotational axis from measured values of the plurality of sensors when the rotational device is in operation, namely when the workpiece or a probe, a probe head, the coordinate measuring apparatus or a machine tool is rotated by the rotational device about the rotational axis, to be precise determining the deviations in respect of at least two different degrees of freedom of a movement, namely two rotational degrees of freedom about mutually perpendicular directions, which each extend perpendicular to the rotational axis; and configuring the configuration to correct the deviations when the rotational device is in operation.

14. The method according to claim 13, which further comprises disposing the plurality of sensors in such a way and the evaluation apparatus is configured so that the evaluation apparatus determines the deviations from the ideal rotational movement of the first part and of the second part relative to one another about the rotational axis from the measured values of the plurality of sensors when the rotational device is in operation, to be precise in respect of at least four degrees of freedom of the movement, namely the two rotational degrees of freedom and two linear degrees of freedom in the mutually perpendicular directions, which each extend perpendicular to the rotational axis.

15. The method according to claim 13, which further comprises:

configuring the evaluation apparatus to receive at least one coordinate measurement signal of a coordinate measuring apparatus for determining coordinates of the workpiece and to calculate the coordinates of the workpiece from the at least one coordinate measurement signal; and correcting the coordinates in respect of the deviations by using the measurement signals of the sensors in respect of the relative position of the first part and the second part.

16. A method for operating a configuration having a rotational device for measuring coordinates of a workpiece, which comprises the steps of;

providing the rotational device with a first part and a second part having rotational mobility about a rotational axis relative to the first part, with the first part or the second part, either holding the workpiece or holding one of a probe for sensing the workpiece, a probe head of a coordinate measuring machine, a coordinate measuring apparatus of the coordinate measuring machine, or a machine tool for machining the workpiece;

providing a plurality of sensors;

assigning a measuring body to each of the sensors, wherein what applies to each of the sensors and to an assigned measuring body is that the assigned measuring body is operated disposed on the first part or the second part and a sensor is operated disposed on the other of the first part or the second part, wherein the sensor generates a measurement signal corresponding to a position of the assigned measuring body and hence corresponding to a relative position of the first part and the second part, wherein the measuring body includes a first measuring body and a second measuring body, which are disposed at a distance from one another in an axial direction of the rotational axis, four of the sensors are operated in an assigned manner for determining a radial relative position of the first part relative to the second part and wherein two of the four sensors are operated assigned to the first measuring body and two of the four sensors are operated assigned to the second measuring body;

determining deviations from an ideal rotational movement of the first part and of the second part relative to one another about the rotational axis from measured values of the plurality of sensors when the rotational device is in operation, namely when the workpiece or the probe, the probe head, the coordinate measuring apparatus or the machine tool is rotated by the rotational device about the rotational axis, to be precise determining the deviations in respect of at least two different degrees of freedom of the movement, namely two rotational degrees of freedom about mutually perpendicular directions, which each extend perpendicular to the rotational axis; and correcting the deviations when the rotational device is in operation.

17. The method according to claim 16, which further comprises determining the deviations from the ideal rotational movement of the first part and of the second part relative to one another about the rotational axis from the measured values of the plurality of sensors when the rotational device is in operation, to be precise in respect of at least four degrees of freedom of the movement, namely the two rotational degrees of freedom and two linear degrees of freedom in the mutually perpendicular directions, which each extend perpendicular to the rotational axis.

18. The method according to claim 16, which further comprises operating the first measuring body and the second measuring body on a common elongate element, a longitudinal axis of the common elongate element extending in a direction of the rotational axis, parallel to the rotational axis or skew with respect to the rotational axis.

19. The method according to claim 18, which further comprises operating the common elongate element disposed on the first part such that the common elongate element extends along the longitudinal axis thereof into a receptacle space of the second part.

20. A method for operating a configuration having a rotational device for measuring coordinates of a workpiece, which comprises the steps of;

providing the rotational device with a first part and a second part having rotational mobility about a rotational axis relative to the first part, with the first part or the second part, either holding the workpiece or holding one of a probe for sensing the workpiece, a probe head of a coordinate measuring machine, a coordinate measuring apparatus of the coordinate measuring machine, or a machine tool for machining the workpiece;

providing a plurality of sensors;

assigning a measuring body to each of the sensors, wherein what applies to each of the sensors and to an assigned measuring body is that the assigned measuring body is operated disposed on the first part or the second part and a sensor is operated disposed on the other of the first part or the second part, wherein the sensor generates a measurement signal corresponding to a position of the assigned measuring body and hence corresponding to a relative position of the first part and the second part, wherein the measuring body being assigned to a plurality of the sensors as a common measuring body;

determining deviations from an ideal rotational movement of the first part and of the second part relative to one another about the rotational axis from measured values of the plurality of sensors when the rotational device is in operation, namely when the workpiece or the probe, the probe head, the coordinate measuring apparatus or the machine tool is rotated by the rotational device about the rotational axis, to be precise determining the deviations in respect of at least two different degrees of freedom of the movement, namely two rotational degrees of freedom about mutually perpendicular directions, which each extend perpendicular to the rotational axis; and correcting the deviations when the rotational device is in operation.

* * * * *